US010471829B2

(12) United States Patent
Yellambalase et al.

(10) Patent No.: US 10,471,829 B2
(45) Date of Patent: Nov. 12, 2019

(54) SELF-DESTRUCT ZONE AND AUTONOMOUS VEHICLE NAVIGATION

(71) Applicant: NextEV USA, Inc., San Jose, CA (US)

(72) Inventors: Yadunandana Yellambalase, Mountain View, CA (US); Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 221 days.

(21) Appl. No.: 15/407,066

(22) Filed: Jan. 16, 2017

(65) Prior Publication Data

US 2018/0201138 A1 Jul. 19, 2018

(51) Int. Cl.
*B60L 3/00* (2019.01)
*B60W 20/50* (2016.01)

(52) U.S. Cl.
CPC .......... *B60L 3/0046* (2013.01); *B60W 20/50* (2013.01); *B60W 2420/42* (2013.01); *B60W 2420/52* (2013.01); *B60W 2510/244* (2013.01); *B60W 2550/10* (2013.01); *B60W 2710/18* (2013.01); *B60W 2710/20* (2013.01); *B60W 2720/106* (2013.01); *B60Y 2300/91* (2013.01); *B60Y 2306/13* (2013.01); *G05D 2201/0213* (2013.01)

(58) Field of Classification Search
CPC combination set(s) only.
See application file for complete search history.

(56) References Cited

U.S. PATENT DOCUMENTS

| 4,361,202 | A | 11/1982 | Minovitch |
| 4,476,954 | A | 10/1984 | Johnson et al. |
| 4,754,255 | A | 6/1988 | Sanders et al. |
| 4,875,391 | A | 10/1989 | Leising et al. |
| 5,035,302 | A | 7/1991 | Thangavelu |
| 5,136,498 | A | 8/1992 | McLaughlin et al. |
| 5,204,817 | A | 4/1993 | Yoshida |
| 5,363,306 | A | 11/1994 | Kuwahara et al. |

(Continued)

FOREIGN PATENT DOCUMENTS

| CN | 1417755 | 5/2003 |
| CN | 1847817 | 10/2006 |

(Continued)

OTHER PUBLICATIONS

Engel et al., "LSD-SLAM: Large-Scale Direct Monocular SLAM," Springer, Cham., European Conference, 2014, Computer Vision, pp. 834-849, 16 pages.

(Continued)

*Primary Examiner* — Redhwan K Mawari

(74) *Attorney, Agent, or Firm* — Sheridan Ross P.C.

(57) ABSTRACT

Methods and systems of an electrical vehicle are provided that recognize a power system fault with the vehicle and in response autonomously drive the vehicle to an identified safe location to self-destruct. Upon reaching the location, the vehicle can evaluate the location using imaging sensors to determine whether the location is free of objects, animals, or people. If not, the vehicle may autonomously drive to another safe location. Prior to destruction, the vehicle sends messages, including information about the power system fault, to at least one device or third party. The messages include location information for the vehicle or information about the power system fault.

20 Claims, 24 Drawing Sheets

(56) References Cited

U.S. PATENT DOCUMENTS

| | | | |
|---|---|---|---|
| 5,508,689 A | 4/1996 | Rado et al. | |
| 5,521,815 A | 5/1996 | Rose | |
| 5,529,138 A | 6/1996 | Shaw et al. | |
| 5,531,122 A | 7/1996 | Chatham et al. | |
| 5,572,450 A | 11/1996 | Worthy | |
| 5,610,821 A | 3/1997 | Gazis et al. | |
| 5,648,769 A | 7/1997 | Sato et al. | |
| 5,710,702 A | 1/1998 | Hayashi et al. | |
| 5,794,164 A | 8/1998 | Beckert et al. | |
| 5,797,134 A | 8/1998 | McMillan et al. | |
| 5,812,067 A | 9/1998 | Bergholz et al. | |
| 5,825,283 A | 10/1998 | Camhi | |
| 5,838,251 A | 11/1998 | Brinkmeyer et al. | |
| 5,847,661 A | 12/1998 | Ricci | |
| 5,890,080 A | 3/1999 | Coverdill et al. | |
| 5,928,294 A | 7/1999 | Zelinkovsky | |
| 5,949,345 A | 9/1999 | Beckert et al. | |
| 5,983,161 A | 11/1999 | Lemelson et al. | |
| 5,986,575 A | 11/1999 | Jones et al. | |
| 6,038,426 A | 3/2000 | Williams, Jr. | |
| 6,081,756 A | 6/2000 | Mio et al. | |
| D429,684 S | 8/2000 | Johnson | |
| 6,128,003 A | 10/2000 | Smith et al. | |
| 6,137,425 A | 10/2000 | Oster et al. | |
| 6,141,620 A | 10/2000 | Zyburt et al. | |
| 6,148,261 A | 11/2000 | Obradovich et al. | |
| 6,152,514 A | 11/2000 | McLellen | |
| 6,157,321 A | 12/2000 | Ricci | |
| 6,198,996 B1 | 3/2001 | Berstis | |
| 6,199,001 B1 | 3/2001 | Ohta et al. | |
| 6,202,008 B1 | 3/2001 | Beckert et al. | |
| 6,252,544 B1 | 6/2001 | Hoffberg | |
| 6,253,161 B1 | 6/2001 | Arias-Estrada | |
| 6,267,428 B1 | 7/2001 | Baldas et al. | |
| 6,302,438 B1 | 10/2001 | Stopper, Jr. et al. | |
| 6,310,542 B1 | 10/2001 | Gehlot | |
| 6,317,058 B1 | 11/2001 | Lemelson et al. | |
| 6,339,826 B2 | 1/2002 | Hayes, Jr. et al. | |
| 6,356,838 B1 | 3/2002 | Paul | |
| 6,388,579 B1 | 5/2002 | Adcox et al. | |
| 6,480,224 B1 | 11/2002 | Brown | |
| 6,480,762 B1 | 11/2002 | Uchikubo et al. | |
| 6,502,022 B1 | 12/2002 | Chastain et al. | |
| 6,519,519 B1 | 2/2003 | Stopczynski | |
| 6,557,752 B1 | 5/2003 | Yacoob | |
| 6,563,910 B2 | 5/2003 | Menard et al. | |
| 6,587,739 B1 | 7/2003 | Abrams et al. | |
| 6,598,227 B1 | 7/2003 | Berry et al. | |
| 6,607,212 B1 | 8/2003 | Reimer et al. | |
| 6,617,981 B2 | 9/2003 | Basinger | |
| 6,633,800 B1 * | 10/2003 | Ward | B60W 50/02 180/167 |
| 6,662,077 B2 | 12/2003 | Haag | |
| 6,675,081 B2 | 1/2004 | Shuman et al. | |
| 6,678,747 B2 | 1/2004 | Goossen et al. | |
| 6,681,176 B2 | 1/2004 | Funk et al. | |
| 6,690,260 B1 | 2/2004 | Ashihara | |
| 6,690,940 B1 | 2/2004 | Brown et al. | |
| 6,724,920 B1 | 4/2004 | Berenz et al. | |
| 6,754,580 B1 | 6/2004 | Ask et al. | |
| 6,757,593 B2 | 6/2004 | Mori et al. | |
| 6,762,684 B1 | 7/2004 | Camhi | |
| 6,765,495 B1 | 7/2004 | Dunning et al. | |
| 6,778,888 B2 | 8/2004 | Cataldo et al. | |
| 6,782,240 B1 | 8/2004 | Tabe | |
| 6,785,531 B2 | 8/2004 | Lepley et al. | |
| 6,816,783 B2 | 11/2004 | Hashima et al. | |
| 6,820,259 B1 | 11/2004 | Kawamata et al. | |
| 6,944,533 B2 | 9/2005 | Obradovich et al. | |
| 6,950,022 B2 | 9/2005 | Breed | |
| 6,958,707 B1 | 10/2005 | Siegel | |
| 6,992,580 B2 | 1/2006 | Kotzin et al. | |
| 7,019,641 B1 | 3/2006 | Lakshmanan et al. | |
| 7,020,544 B2 | 3/2006 | Shinada et al. | |
| 7,021,691 B1 | 4/2006 | Schmidt et al. | |
| 7,042,345 B2 | 5/2006 | Ellis | |
| 7,047,129 B2 | 5/2006 | Uotani | |
| 7,058,898 B2 | 6/2006 | McWalter et al. | |
| 7,096,431 B2 | 8/2006 | Tambata et al. | |
| 7,142,696 B1 | 11/2006 | Engelsberg et al. | |
| 7,164,117 B2 | 1/2007 | Breed et al. | |
| 7,187,947 B1 | 3/2007 | White et al. | |
| 7,203,598 B1 | 4/2007 | Whitsell | |
| 7,233,861 B2 | 6/2007 | Van Buer et al. | |
| 7,239,960 B2 | 7/2007 | Yokota et al. | |
| 7,277,454 B2 | 10/2007 | Mocek et al. | |
| 7,284,769 B2 | 10/2007 | Breed | |
| 7,289,645 B2 | 10/2007 | Yamamoto et al. | |
| 7,295,921 B2 | 11/2007 | Spencer et al. | |
| 7,313,547 B2 | 12/2007 | Mocek et al. | |
| 7,333,012 B1 | 2/2008 | Nguyen | |
| 7,343,148 B1 | 3/2008 | O'Neil | |
| 7,386,376 B2 | 6/2008 | Basir et al. | |
| 7,386,799 B1 | 6/2008 | Clanton et al. | |
| 7,432,829 B2 | 10/2008 | Poltorak | |
| 7,474,264 B2 | 1/2009 | Bolduc et al. | |
| 7,493,140 B2 | 2/2009 | Michmerhuizen et al. | |
| 7,526,539 B1 | 4/2009 | Hsu | |
| 7,548,815 B2 | 6/2009 | Watkins et al. | |
| 7,566,083 B2 | 7/2009 | Vitito | |
| 7,606,660 B2 | 10/2009 | Diaz et al. | |
| 7,606,867 B1 | 10/2009 | Singhal et al. | |
| 7,643,913 B2 | 1/2010 | Taki et al. | |
| 7,650,234 B2 | 1/2010 | Obradovich et al. | |
| 7,671,764 B2 | 3/2010 | Uyeki et al. | |
| 7,680,596 B2 | 3/2010 | Uyeki et al. | |
| 7,683,771 B1 | 3/2010 | Loeb | |
| 7,711,468 B1 | 5/2010 | Levy | |
| 7,734,315 B2 | 6/2010 | Rathus et al. | |
| 7,748,021 B2 | 6/2010 | Obradovich et al. | |
| RE41,449 E | 7/2010 | Krahnstoever et al. | |
| 7,791,499 B2 | 9/2010 | Mohan et al. | |
| 7,796,190 B2 | 9/2010 | Basso et al. | |
| 7,802,832 B2 | 9/2010 | Carnevali | |
| 7,821,421 B2 | 10/2010 | Tamir et al. | |
| 7,832,762 B2 | 11/2010 | Breed | |
| 7,864,073 B2 | 1/2011 | Lee et al. | |
| 7,872,591 B2 | 1/2011 | Kane et al. | |
| 7,873,471 B2 | 1/2011 | Gieseke | |
| 7,881,703 B2 | 2/2011 | Roundtree et al. | |
| 7,891,004 B1 | 2/2011 | Gelvin et al. | |
| 7,891,719 B2 | 2/2011 | Carnevali | |
| 7,894,951 B2 | 2/2011 | Norris et al. | |
| 7,899,610 B2 | 3/2011 | McClellan | |
| 7,966,678 B2 | 6/2011 | Ten Eyck et al. | |
| 7,969,290 B2 | 6/2011 | Waeller et al. | |
| 7,969,324 B2 | 6/2011 | Chevion et al. | |
| 8,060,631 B2 | 11/2011 | Collart et al. | |
| 8,064,925 B1 | 11/2011 | Sun et al. | |
| 8,066,313 B2 | 11/2011 | Carnevali | |
| 8,098,170 B1 | 1/2012 | Szczerba et al. | |
| 8,113,564 B2 | 2/2012 | Carnevali | |
| 8,131,419 B2 | 3/2012 | Ampunan et al. | |
| 8,157,310 B2 | 4/2012 | Carnevali | |
| 8,162,368 B2 | 4/2012 | Carnevali | |
| 8,175,802 B2 | 5/2012 | Forstall et al. | |
| 8,233,919 B2 | 7/2012 | Haag et al. | |
| 8,245,609 B1 | 8/2012 | Greenwald et al. | |
| 8,306,514 B1 | 11/2012 | Nunally | |
| 8,334,847 B2 | 12/2012 | Tomkins | |
| 8,346,233 B2 | 1/2013 | Aaron et al. | |
| 8,346,432 B2 | 1/2013 | Van Wiemeersch et al. | |
| 8,350,721 B2 | 1/2013 | Carr | |
| 8,352,282 B2 | 1/2013 | Jensen et al. | |
| 8,369,263 B2 | 2/2013 | Dowling et al. | |
| 8,391,554 B2 | 3/2013 | Lee et al. | |
| 8,417,449 B1 | 4/2013 | Denise | |
| 8,428,843 B2 | 4/2013 | Lee et al. | |
| 8,432,260 B2 | 4/2013 | Talty et al. | |
| 8,442,389 B2 | 5/2013 | Kashima et al. | |
| 8,442,758 B1 | 5/2013 | Rovik et al. | |
| 8,467,965 B2 | 6/2013 | Chang | |
| 8,497,842 B2 | 7/2013 | Tomkins et al. | |
| 8,498,809 B2 | 7/2013 | Bill | |

(56) References Cited

U.S. PATENT DOCUMENTS

| | | |
|---|---|---|
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,980 B1 * | 1/2014 | Urmson .................. G06T 7/223 701/23 |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harber et al. |
| 8,688,372 B2 | 4/2014 | Bhogal et al. |
| 8,698,639 B2 * | 4/2014 | Fung ..................... B60K 28/06 340/576 |
| 8,705,527 B1 | 4/2014 | Addepalli et al. |
| 8,706,143 B1 | 4/2014 | Elias |
| 8,718,797 B1 | 5/2014 | Addepalli et al. |
| 8,718,910 B2 | 5/2014 | Gueziec |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Fillev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand Ag et al. |
| 8,838,088 B1 | 9/2014 | Henn et al. |
| 8,862,317 B2 | 10/2014 | Shin et al. |
| 8,972,090 B2 | 3/2015 | Weslati et al. |
| 8,977,408 B1 | 3/2015 | Cazanas et al. |
| 9,043,016 B2 | 5/2015 | Filippov et al. |
| 9,163,952 B2 | 10/2015 | Viola et al. |
| 9,188,985 B1 | 11/2015 | Hobbs et al. |
| 9,229,905 B1 | 1/2016 | Penilla et al. |
| 9,299,251 B2 | 3/2016 | Scofield et al. |
| 9,360,342 B2 | 6/2016 | Ignatin |
| 9,581,460 B1 | 2/2017 | McNew et al. |
| 9,663,118 B1 * | 5/2017 | Palmer ................ B60W 50/082 |
| 9,969,404 B2 * | 5/2018 | McNew ............. B60W 50/082 |
| 10,077,056 B1 | 9/2018 | Fields et al. |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169531 A1 | 11/2002 | Kawazoe et al. |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0060977 A1 | 3/2003 | Jijina et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0092542 A1 | 5/2005 | Turner |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |

(56) References Cited

U.S. PATENT DOCUMENTS

| | | |
|---|---|---|
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2006/0293856 A1 | 12/2006 | Foessel et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134302 A1 | 6/2010 | Ahn et al. |
| 2010/0134958 A1 | 6/2010 | Disaverio et al. |
| 2010/0136944 A1 | 6/2010 | Taylor et al. |

(56) References Cited

U.S. PATENT DOCUMENTS

| | | |
|---|---|---|
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0000961 A1 | 1/2011 | McNeal |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0190972 A1* | 8/2011 | Timmons ............ G01C 21/34 701/31.4 |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0213656 A1 | 9/2011 | Turner |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0288765 A1 | 11/2011 | Conway |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083947 A1* | 4/2012 | Anderson ............ B60W 30/09 701/3 |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |

(56) References Cited

U.S. PATENT DOCUMENTS

| | | |
|---|---|---|
| 2012/0116696 A1 | 5/2012 | Wank |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173135 A1 | 7/2012 | Gutman |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wittlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0015814 A1* | 1/2013 | Kelty ............... B60L 3/0046 320/109 |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0105264 A1 | 5/2013 | Ruth et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166109 A1 | 6/2013 | Ginsberg |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0197797 A1 | 8/2013 | Boddy et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |

(56) References Cited

U.S. PATENT DOCUMENTS

| | | |
|---|---|---|
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0297195 A1* | 11/2013 | Das .................. G08G 1/163 701/117 |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0021915 A1* | 1/2014 | Staley .................. H01R 13/635 |
| 2014/0028542 A1 | 1/2014 | Lovitt et al. |
| 2014/0032014 A1 | 1/2014 | DeBiasio et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0156133 A1 | 6/2014 | Cullinane et al. |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244096 A1* | 8/2014 | An .................. G05D 1/0055 701/25 |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0278086 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1* | 10/2014 | Ricci .................. H04W 4/21 701/36 |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |

(56) References Cited

U.S. PATENT DOCUMENTS

| | | |
|---|---|---|
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0066284 A1 | 3/2015 | Yopp |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |
| 2015/0158499 A1 | 6/2015 | Koravadi |
| 2015/0178034 A1 | 6/2015 | Penilla et al. |
| 2015/0235480 A1 | 8/2015 | Cudak et al. |
| 2015/0343918 A1* | 12/2015 | Watanabe ............. B60L 3/0046 |
| 2016/0003637 A1 | 1/2016 | Andersen |
| 2016/0008985 A1 | 1/2016 | Kim et al. |
| 2016/0009291 A1* | 1/2016 | Pallett ................. B60W 50/082 701/23 |
| 2016/0009295 A1* | 1/2016 | Chun ................... A61B 5/6893 701/32.9 |
| 2016/0009391 A1* | 1/2016 | Friesel .................... B64C 39/10 244/36 |
| 2016/0026182 A1 | 1/2016 | Boroditsky et al. |
| 2016/0070527 A1 | 3/2016 | Ricci |
| 2016/0086391 A1 | 3/2016 | Ricci |
| 2016/0129908 A1* | 5/2016 | Harda .................. G05D 1/0088 701/24 |
| 2016/0161272 A1 | 6/2016 | Shigezumi et al. |
| 2016/0202074 A1 | 7/2016 | Woodard et al. |
| 2016/0269456 A1 | 9/2016 | Ricci |
| 2016/0269469 A1 | 9/2016 | Ricci |
| 2016/0276854 A1* | 9/2016 | Lian ................... B60L 11/1872 |
| 2016/0355192 A1 | 12/2016 | James et al. |
| 2016/0368396 A1 | 12/2016 | Konet et al. |
| 2016/0375788 A1 | 12/2016 | Liu |
| 2017/0008523 A1 | 1/2017 | Christensen et al. |
| 2017/0015288 A1 | 1/2017 | Coelingh et al. |
| 2017/0021837 A1 | 1/2017 | Ebina |
| 2017/0036673 A1* | 2/2017 | Lee ......................... A61B 3/112 |
| 2017/0053538 A1 | 2/2017 | Samarasekera et al. |
| 2017/0057507 A1* | 3/2017 | Gordon ................ B60W 30/16 |
| 2017/0057542 A1 | 3/2017 | Kim et al. |
| 2017/0076455 A1 | 3/2017 | Newman et al. |
| 2017/0143246 A1 | 5/2017 | Flickinger |
| 2017/0212515 A1 | 7/2017 | Bertollini et al. |
| 2017/0242442 A1 | 8/2017 | Minster |
| 2017/0267256 A1 | 9/2017 | Minster et al. |
| 2017/0291615 A1 | 10/2017 | Kusano et al. |
| 2017/0349045 A1 | 12/2017 | McNew |
| 2017/0349185 A1 | 12/2017 | McNew |
| 2017/0355377 A1 | 12/2017 | Vijaya Kumar et al. |
| 2018/0052463 A1* | 2/2018 | Mays ......................... B60T 7/18 |
| 2018/0109482 A1 | 4/2018 | DeLuca et al. |
| 2018/0113450 A1 | 4/2018 | Sherony |
| 2018/0118219 A1* | 5/2018 | Hiei ....................... B60W 40/09 |
| 2018/0151064 A1 | 5/2018 | Xu et al. |
| 2018/0201138 A1* | 7/2018 | Yellambalase ........ B60L 3/0046 |
| 2018/0208209 A1 | 7/2018 | Al-Dahle et al. |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/139821 | 9/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/035268 | 3/2016 |
| WO | WO 2016/062730 | 4/2016 |
| WO | WO 2016/145073 | 9/2016 |
| WO | WO 2016/145100 | 9/2016 |
| WO | WO 2017/167790 | 10/2017 |

OTHER PUBLICATIONS

Final Action for U.S. Appl. No. 15/395,924, dated Jul. 30, 2018, 14 pages.
Official Action for U.S. Appl. No. 15/395,952, dated Aug. 3, 2018, 11 pages.
U.S. Appl. No. 15/848,851, filed Dec. 20, 2017.
U.S. Appl. No. 15/727,838, filed Oct. 9, 2017.
U.S. Appl. No. 15/786,373, filed Oct. 17, 2017.
U.S. Appl. No. 15/798,016, filed Oct. 30, 2017.
Official Action for U.S. Appl. No. 15/408,143, dated Jun. 15, 2018, 9 pages.
Notice of Allowance for U.S. Appl. No. 15/634,197, dated Oct. 25, 2018, 8 pages.
U.S. Appl. No. 16/246,810, filed Jan. 14, 2019, Yalla et al.
Official Action for U.S. Appl. No. 15/395,924, dated Nov. 19, 2018, 13 pages.
Notice of Allowance for U.S. Appl. No. 15/408,143, dated Nov. 20, 2018, 8 pages.
Official Action for U.S. Appl. No. 15/665,644, dated Nov. 19, 2018, 32 pages.
Grana, et al., "A Fast Approach for Integrating ORB Descriptors in the Bag of Words Model," Proceedings of SPIE—The International Society for Optical Engineering, Feb. 2013, vol. 8667, pp. 86670-866709, DOI: 10.1117/12.2008460, 9 pages.
Notice of Allowance for U.S. Appl. No. 15/395,924, dated Apr. 2, 2019, 11 pages.
Final Action for U.S. Appl. No. 15/665,644, dated Apr. 4, 2019, 19 pages.
U.S. Appl. No. 15/395,924, filed Dec. 30, 2016, Singhal et al.
U.S. Appl. No. 15/395,952, filed Dec. 30, 2016, Singhal et al.
U.S. Appl. No. 15/408,143, filed Jan. 17, 2017, Xiao et al.
U.S. Appl. No. 15/634,197, filed Jun. 27, 2017, Singhal et al.
U.S. Appl. No. 15/665,644, filed Aug. 1, 2017, Singhal.
U.S. Appl. No. 15/848,851, filed Dec. 20, 2017, Cox et al.
U.S. Appl. No. 15/727,838, filed Oct. 9, 2017, Cox et al.
U.S. Appl. No. 15/786,373, filed Oct. 17, 2017, Guo et al.
U.S. Appl. No. 15/798,016, filed Oct. 30, 2017, Valla et al.
U.S. Appl. No. 61/567,962, filed Dec. 7, 2011, Baarman et al.

(56) References Cited

OTHER PUBLICATIONS

"Carpool, HOV, Transit lanes," WazeWiki, 2016, retrieved from https://wiki.waze.com/wiki/Carpool,_HOV,_Transit_lanes, retrieved on Feb. 27, 2018, 3 pages.
"Managing Demand Through Travel Information Services," U.S. Department of Transportation brochure, FHWA, retrieved from http://www.ops.fhwa.dot.gov/publications/manag_demand_tis/travelinfo.htm, retrieved on Feb. 28, 2018, 30 pages.
"Nexus 10 Guidebook for Android," Google Inc., © 2012, Edition 1.2, 166 pages.
"ORB (Oriented FAST and Rotated BRIEF)", Open CV 3.0.0-dev documentation, retrieved from https://docs.opencv.org/3.0-beta/doc/py_tutorials/py_feature2d/py_orb/py_orb.html, 2014, 3 pages.
"Self-Driving: Self-Driving Autonomous Cars," available at http://www.automotivetechnologies.com/autonomous-self-driving-cars, accessed Dec. 2016, 9 pages.
"Softmax function," Wikipedia, retrieved from https://en.wikipedia.org/wiki/Softmax_function, retrieved on Feb. 28, 2018, 4 pages.
Amor-Segan et al., "Towards the Self Healing Vehicle," Automotive Electronics, Jun. 2007, 2007 3rd Institution of Engineering and Technology Conference, 7 pages.
Badino et al., "Real-Time Topometric Localization," IEEE International Conference, Robotics and Automation, 2012, 8 pages.
Bennett, "Meet Samsung's Version of Apple AirPlay," CNET.com, Oct. 10, 2012, 11 pages.
Brubaker et al., "Lost! Leveraging the Crowd for Probabilistic Visual Self-Localization," Proceedings of the IEEE Conference on Computer Vision and Pattern Recognition, 2013, 8 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Cathy et al., "A prescription for transit arrival/departure prediction using automatic vehicle location data," Transportation Research Part C, 2003, vol. 11, pp. 241-264.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Davies, "This NIO EP9 performance EV wants to be the Tesla of Supercars," SlashGear, 2016, retrieved from https//www.slashgear.com/nextev-nio-ep9-car-tesla-of-performance-evs-21464829, 9 pages.
Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dellaert et al., "Monte Carlo Localization for Mobile Robots," IEEE, Robotics and Automation, 1999 Proceedings, vol. 2, pp. 1322-1328.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Engel et al., "LSD-SLAM: Large-Scale Direct Monocular SLAM," Springer, Cham., European Conference, Computer Vision, pp. 834-849, 16 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 6 pages.
Floros et al., "OpenStreetSLAM: Global Vehicle Localization Using OpenStreetMaps," RWTH Aachen University, Computer Vision Group, 2013, 20 pages.
Galvez-Lopez et al., "Bags of Binary Words for Fast Place Recognition in Image Sequences," IEEE Transactions on Robotics, 2012, vol. 28(5), pp. 1188-1197.
Ge et al., "Optimal Relay Selection in IEEE 802.16 Multihop Relay Vehicular Networks," IEEE Transactions on Vehicular Technology, 2010, vol. 59(5), pp. 2198-2206.
Grauman et al., "Excerpt chapter from Synthesis lecture draft: Visual Recognition," 2012, retrieved from http://www.cs.utexas.edu/~grauman/courses/fall2009/papers/bag_of_visual_words.pdf, 8 pages.

Guizzo, "How Google's Self-Driving Car Works," Oct. 18, 2011, available at https://spectrum.ieee.org/automaton/robotics/artificial-intelligence/how-google-self-driving-car-works, 5 pages.
Haklay et al., "OpenStreetMap: User-Generated Street Maps," IEEE Pervasive Computing, 2008, pp. 12-18.
Hays et al., "IM2GPS: estimating geographic information from a single image," IEEE Conference, Computer Vision and Pattern Recognition, 2008, pp. 1-8.
Heer et al., "ALPHA: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Kautonen, "NextEV unveils the NIO EP9 electric supercar in London," Autoblog, 2016, retrieved from http://www.autoblog.com/2016/11/21/nextev-unveiles-the-nio-ep9-electric-supercar-in-london/, 3 pages.
Kneip et al., "Robust Real-Time Visual Odometry with a Single Camera and an IMU," Proceedings of the British Machine Vision Conference, 2011, 11 pages.
Konolige et al., "Large-Scale Visual Odometry for Rough Terrain," Robotics Research, 2010, pp. 201-212, 12 pages.
Levinson et al., "Map-Based Precision Vehicle Localization in Urban Environments," Robotics: Science and Systems, 2007, vol. 4, 8 pages.
Ma et al., "Find your Way by Observing the Sun and Other Semantic Cues," Computer Vision and Pattern Recognition, 2016, 12 pages.
Muja et al., "Fast Approximate Nearest Neighbors with Automatic Algorithm Configuration," VISAPP International Conference on Computer Vision Theory and Applications, 2009, vol. 1, pp. 331-340, 10 pages.
Mur-Artal et al., "ORB-SLAM: a Versatile and Accurate Monocular SLAM System," IEEE Translations, Robotics, 2015, vol. 31(5), pp. 1147-1163.
Nister et al., "Visual odometry," IEEE Computer Vision and Pattern Recognition, 2004, vol. 1, 35 pages.
Persson "Adaptive Middleware for Self-Configurable Embedded Real-Time Systems," KTH Industrial Engineering and Management, 2009, 92 pages.
Raychaudhuri et al., "Emerging Wireless Technologies and the Future Mobile Internet," p. 48, Cambridge Press, 2011, 3 pages.
Rublee et al., ORB: an efficient alternative to SIFT or SURF, In Computer Vision (ICCV), 2011 IEEE international conference on (pp. 2564-2571) retrieved from http://citeseerx.ist.psu.edu/viewdoc/download?doi=10.1.1.370.4395&rep=rep1&type=pdfs, 8 pages.
Ruchti et al., "Localization on openstreetmap data using a 3D Laser Scanner," IEEE International Conference, Robotics and Automation, 2015, 6 pages.
Scaramuzza et al., "Visual Odometry[tutorial]," IEEE Robotics & Automation Magazine, 2011, vol. 18(4), pp. 80-92.
Stachniss, "Robot Mapping: Short Introduction to Particle Filters and Monte Carlo Localization," Albert-Ludwigs-Universitat Freiburg, 2012, retrieved from http://ais.informatik.uni-freiburg.de/teaching/ws12/mapping/pdf/slam09-particle-filter-4.pdf, 9 pages.
Stephens, Leah, "How Driverless Cars Work," Interesting Engineering, Apr. 28, 2016, available at https://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].
Thurn/Burgard/Fox, "Probabilistic Robotics," The MIT Press, 2010, retrieved from http://robotics.usc.edu/~gaurav/CS547/lecture6-2010-particle-filters.pdf, 51 pages.
Urmson et al., "Autonomous Driving in Urban Environments: Boss and the Urban Challenge," Journal of Field Robotics, 2008, vol. 25(8). pp. 425-466.

(56) References Cited

OTHER PUBLICATIONS

Walter et al., "The smart car seat: personalized monitoring of vital signs in automotive applications." Personal and Ubiquitous Computing, Oct. 2011, vol. 15, No. 7, pp. 707-715.
White, "NextEV's NIO IP9 is an incredible four-wheel-drive electric hypercar," WIRED, 2016, retrieved from http://www.wired.co.uk/article/nextev-hypercar-nio-ep9, 6 pages.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.
Wu et al., "Where am I: Place instance and category recognition using spatial PACT," IEEE Conference, Computer Vision and Pattern Recognition, 2008, 8 pages.
Zhang et al., "LOAM: Lidar Odometry and Mapping in Real-time," Robotics Science and Systems, 2014, vol. 2, 9 pages.
Zhang et al., "Real-time Depth Enhanced Monocular Odometry," IEEE/RSJ International Conference, Intelligent Robots and Systems, 2014, pp. 4973-4980.
Zhang et al., "Visual-lidar Odometry and Mapping: Low-drift, Robust, and Fast," IEEE International Conference, Robotics and Automation, 2015, pp. 2174-2181.
Official Action for U.S. Appl. No. 15/395,924, dated Jan. 25, 2018, 10 pages.

\* cited by examiner

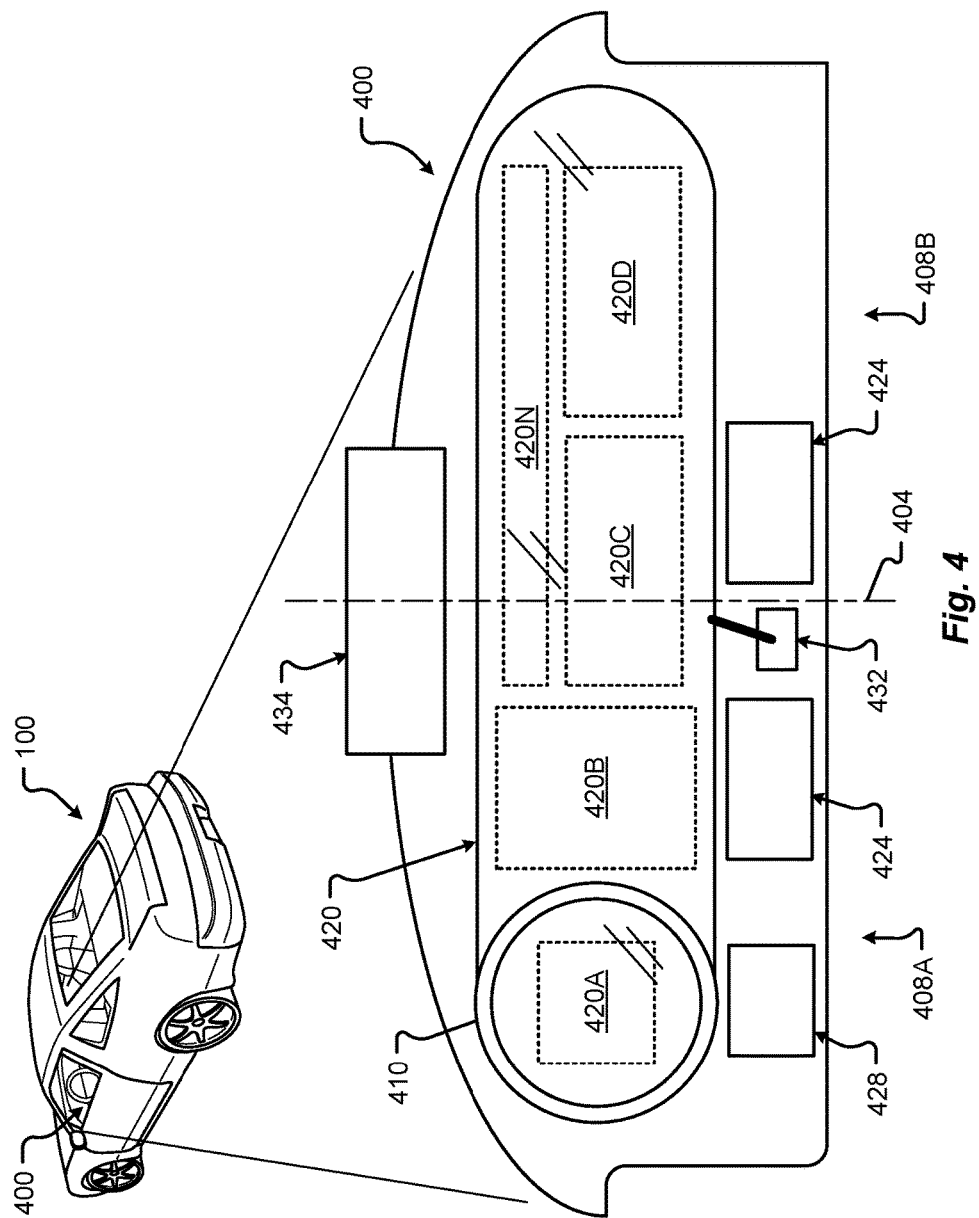

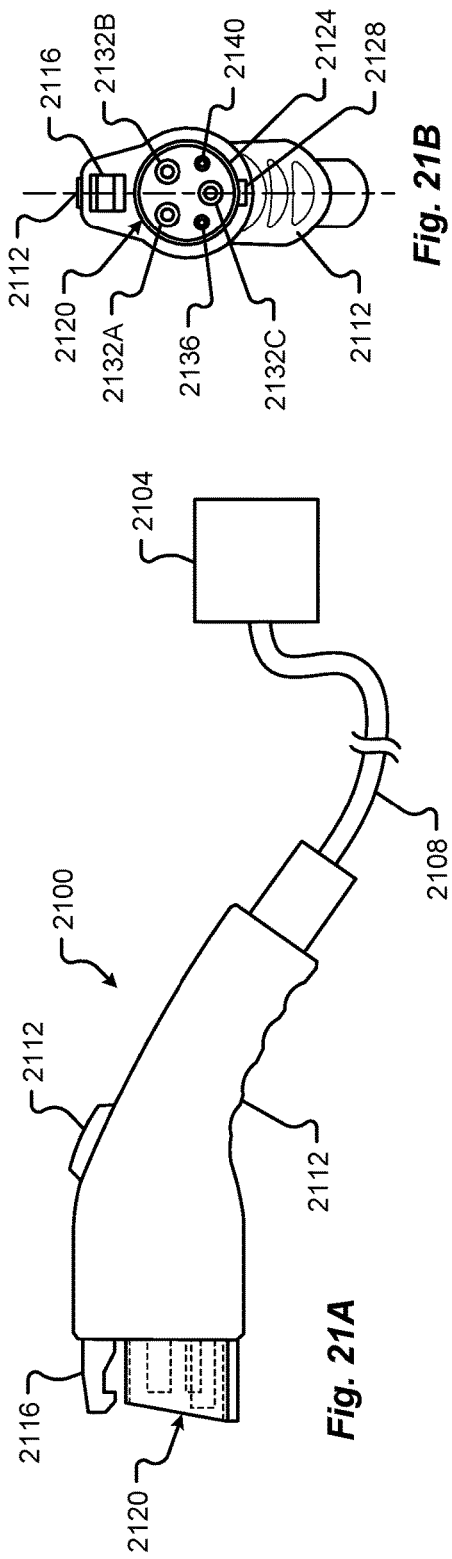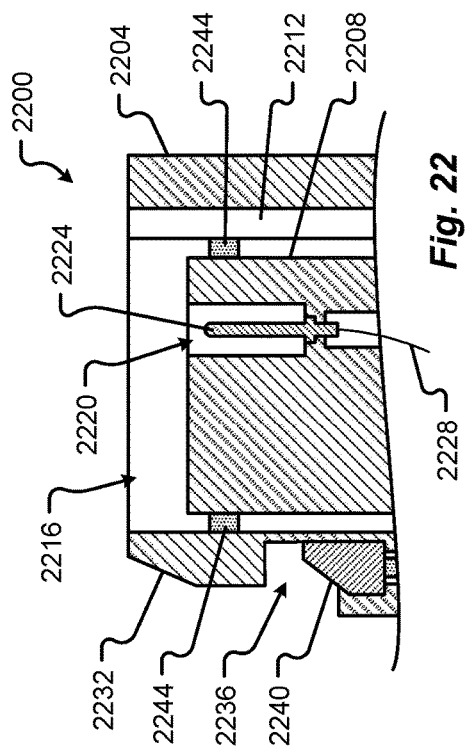

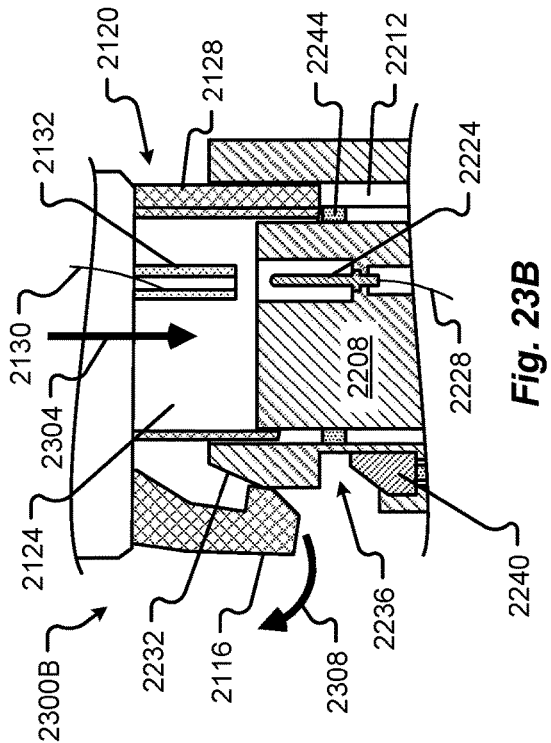
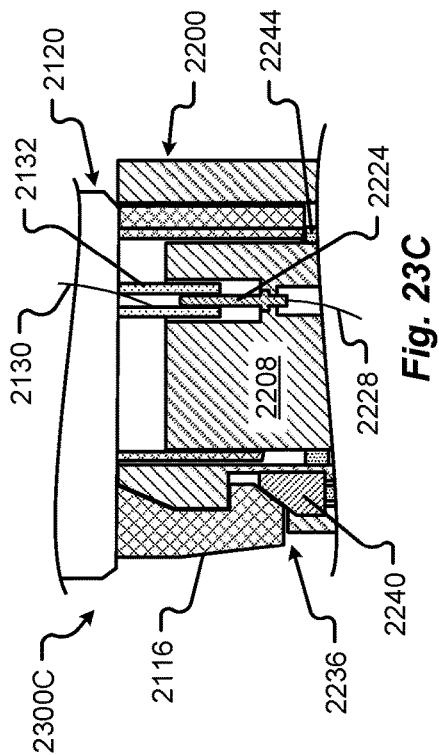
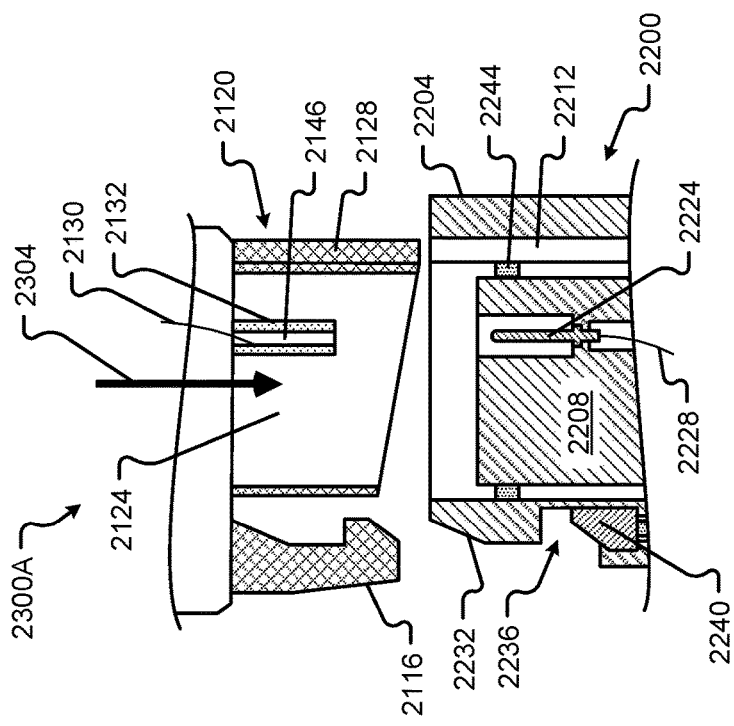

SELF-DESTRUCT ZONE AND AUTONOMOUS VEHICLE NAVIGATION

FIELD

The present disclosure is generally directed to vehicle systems, in particular, toward vehicle charging systems.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 4 shows an embodiment of the instrument panel of the vehicle according to one embodiment of the present disclosure;

FIG. 21A is a side view of an electric vehicle charging system in accordance with embodiments of the present disclosure;

FIG. 21B is an end view of a charging handle of the electric vehicle charging system of FIG. 21A;

FIG. 22 is a section view of a charging receptacle in accordance with embodiments of the present disclosure;

FIG. 23A is a section view of a charging connector aligning with a charging receptacle for engagement in accordance with embodiments of the present disclosure;

FIG. 23B is a section view of a charging connector in a first engagement state with a charging receptacle in accordance with embodiments of the present disclosure;

FIG. 23C is a section view of a charging connector connected to a charging receptacle in accordance with embodiments of the present disclosure;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
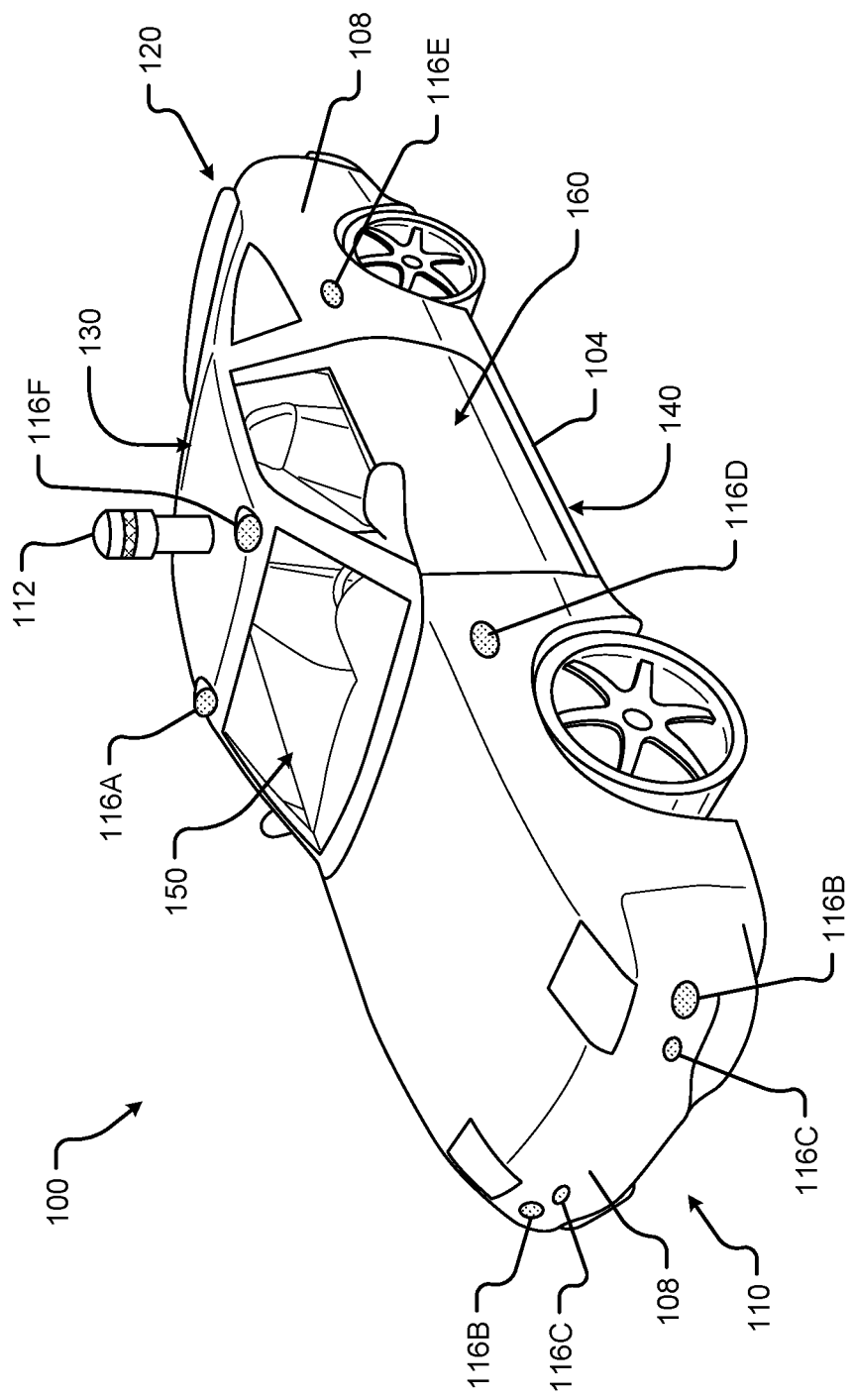
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
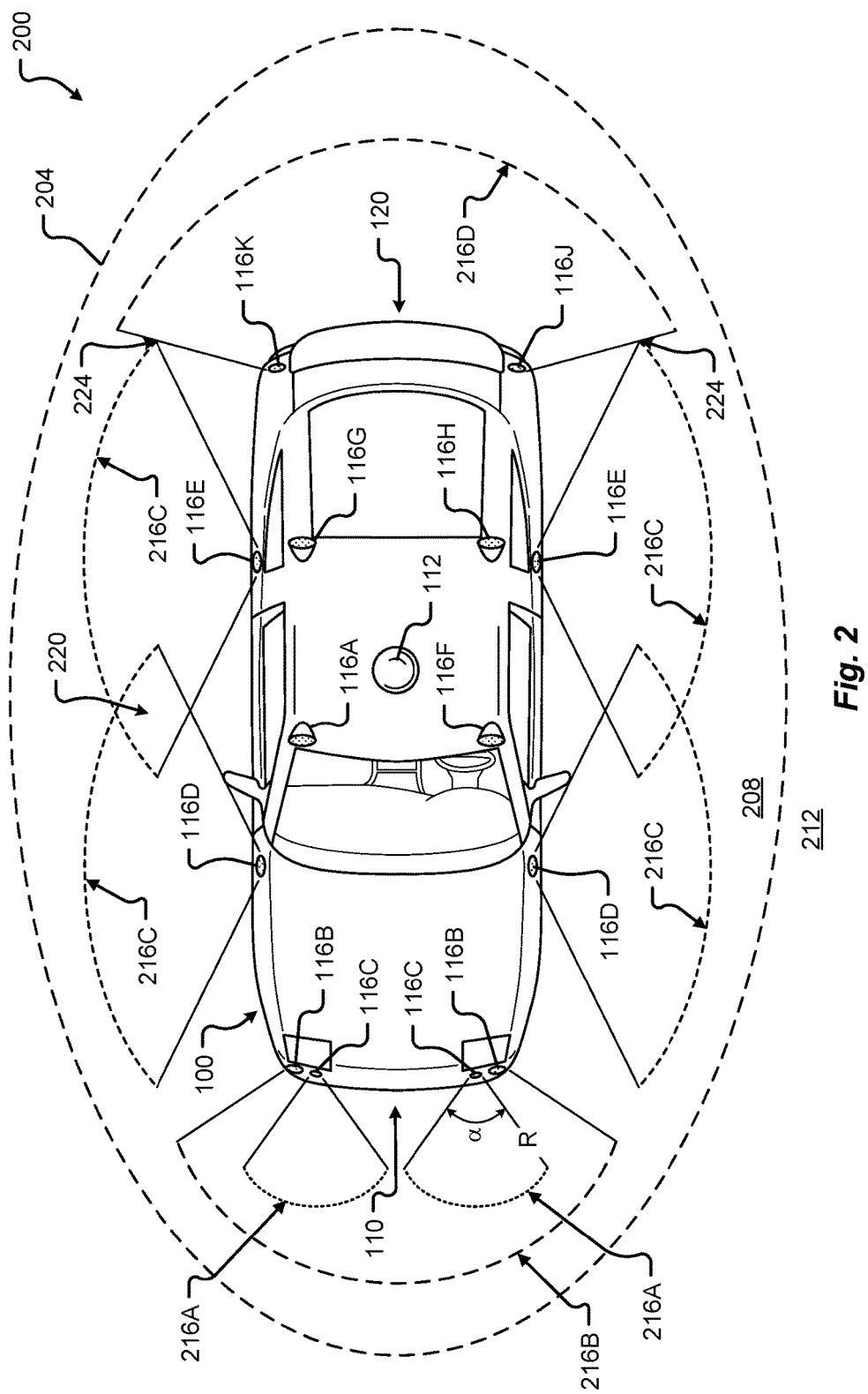
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
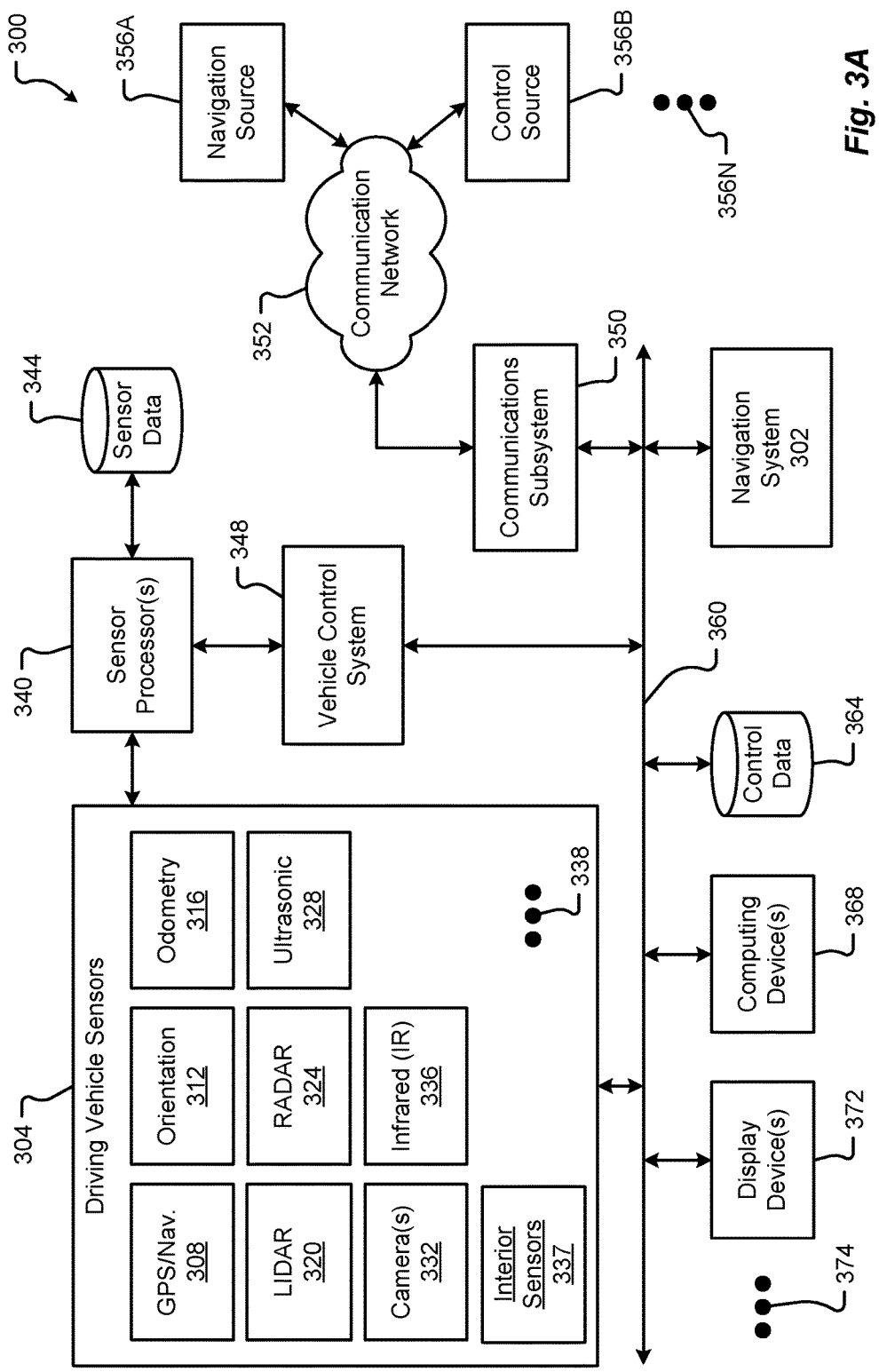
FIG. 3A is a block diagram of an embodiment of a communication environment of the vehicle in accordance with embodiments of the present disclosure.
Figure 3B:
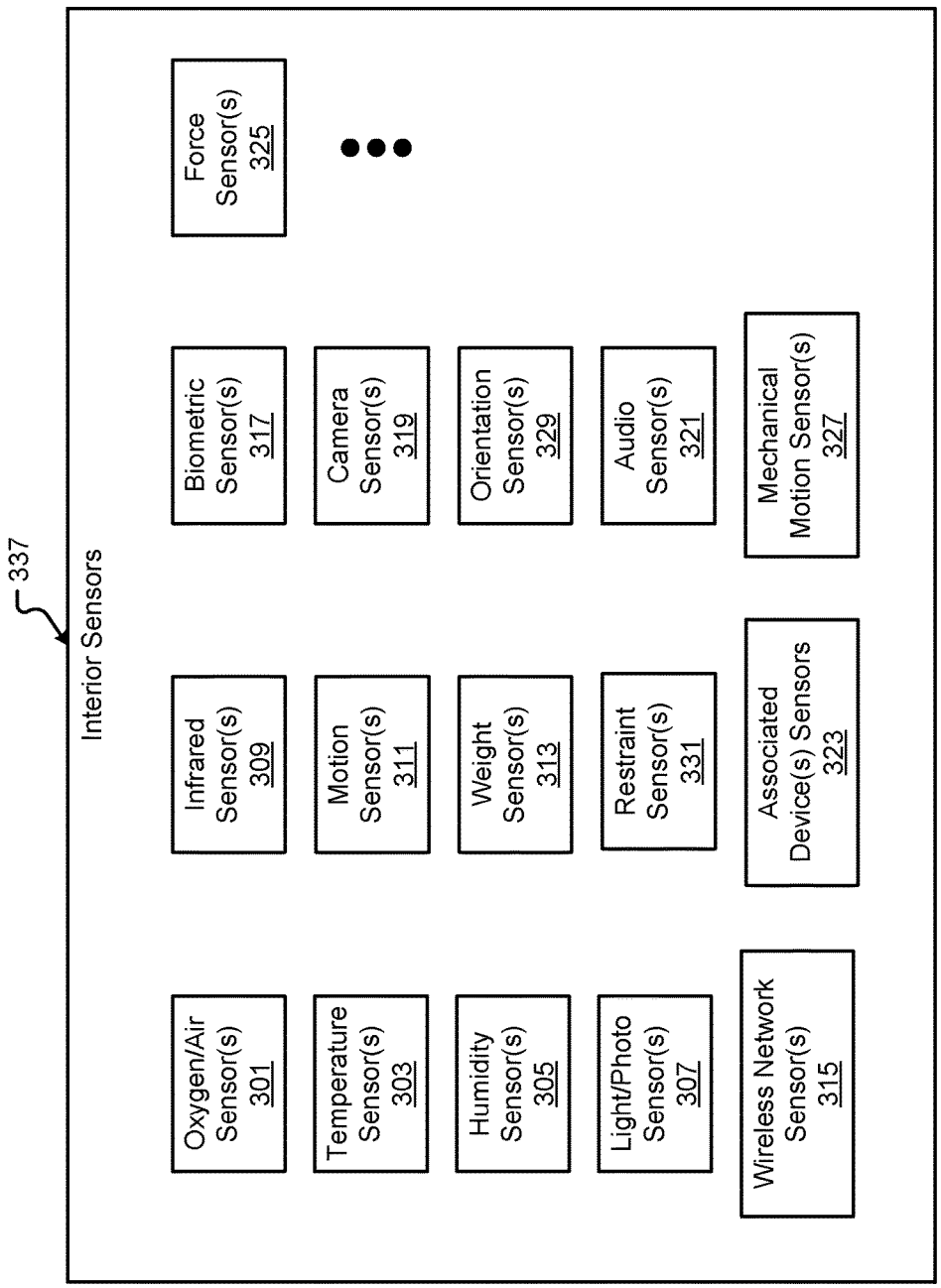
FIG. 3B is a block diagram of an embodiment of interior sensors within the vehicle in accordance with embodiments of the present disclosure.
Figure 3C:
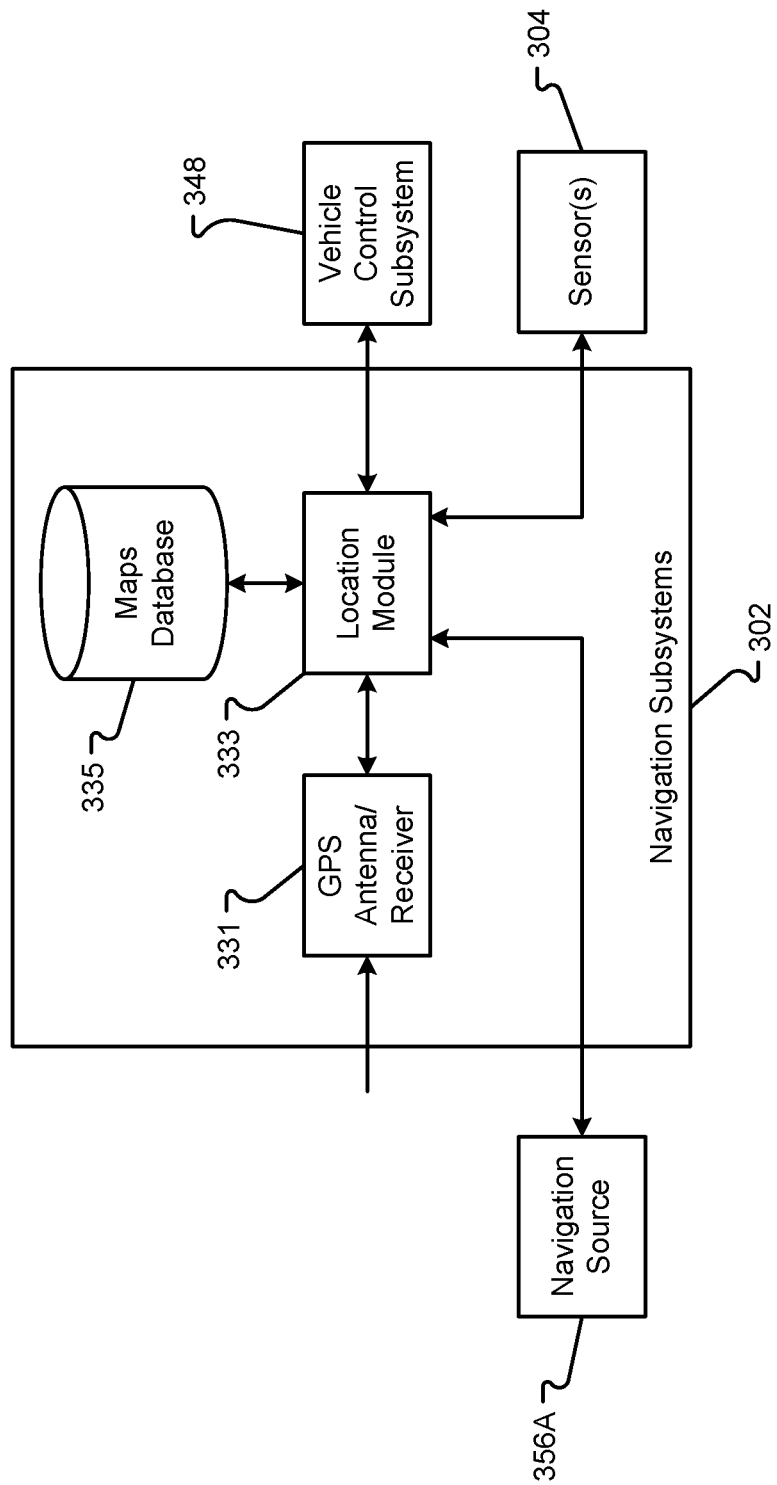
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 104. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
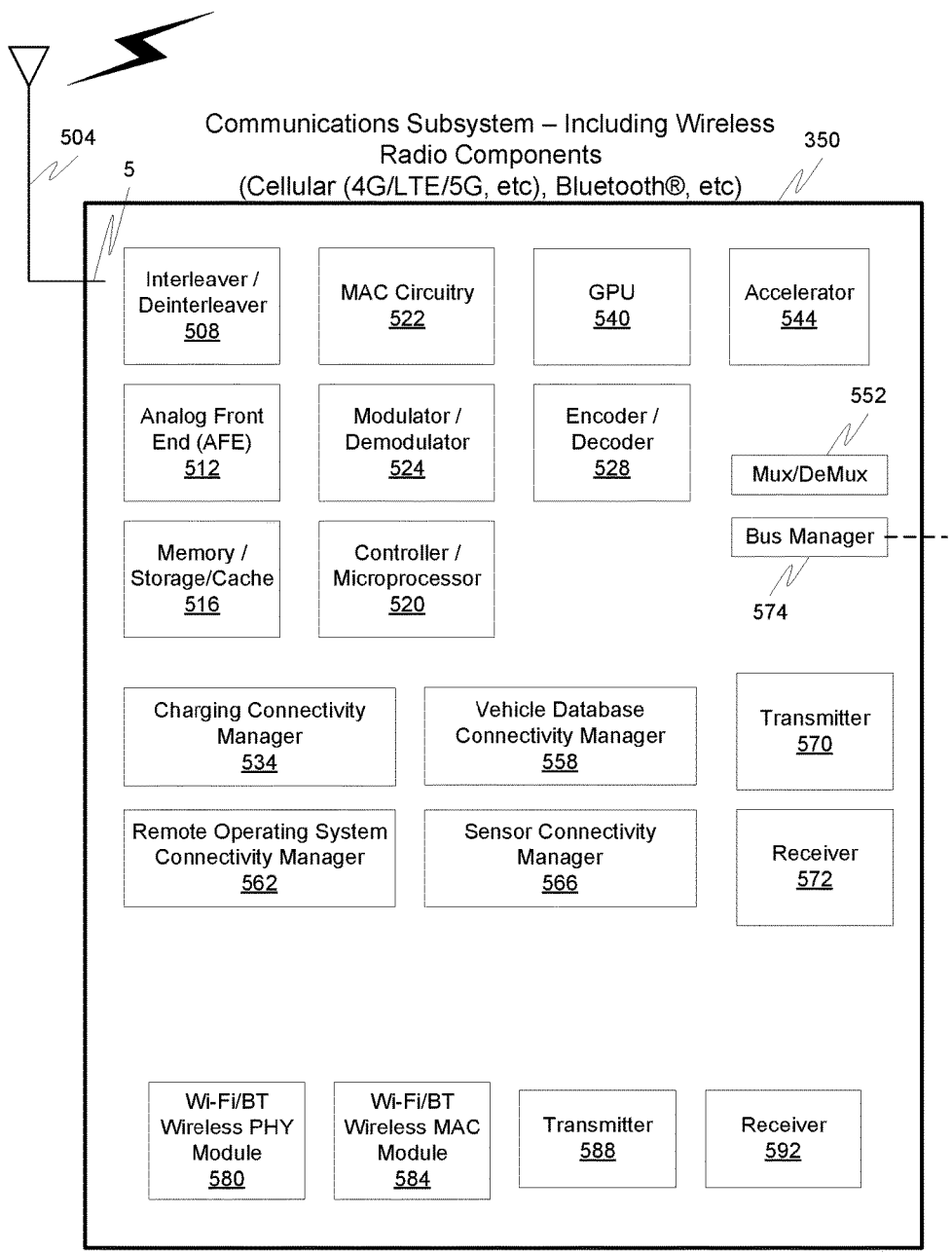
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CAN FD, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), Ethernet bus, and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally +AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
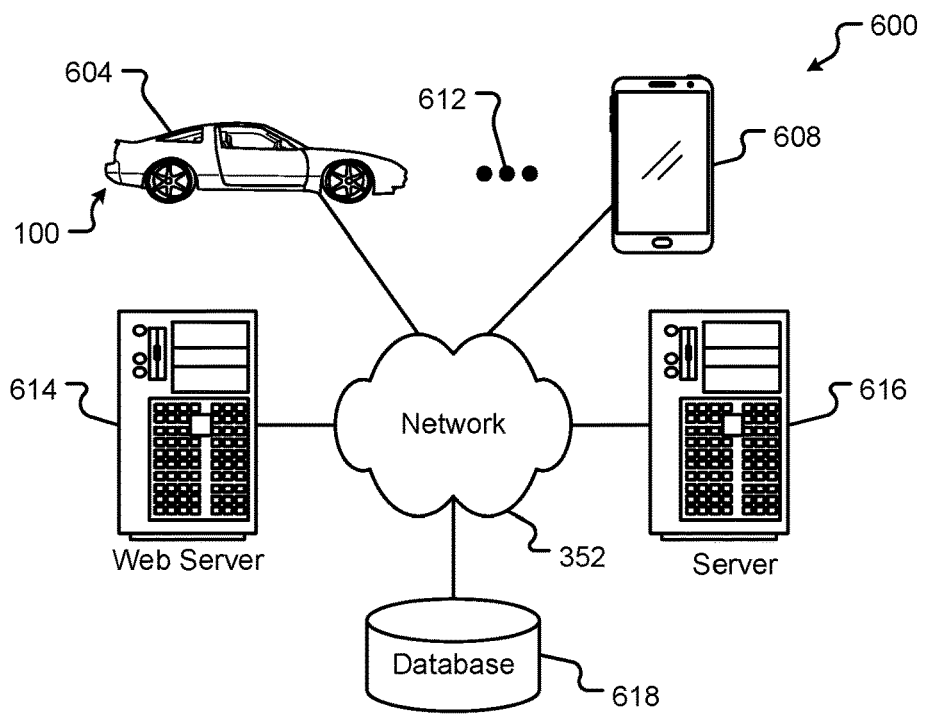
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
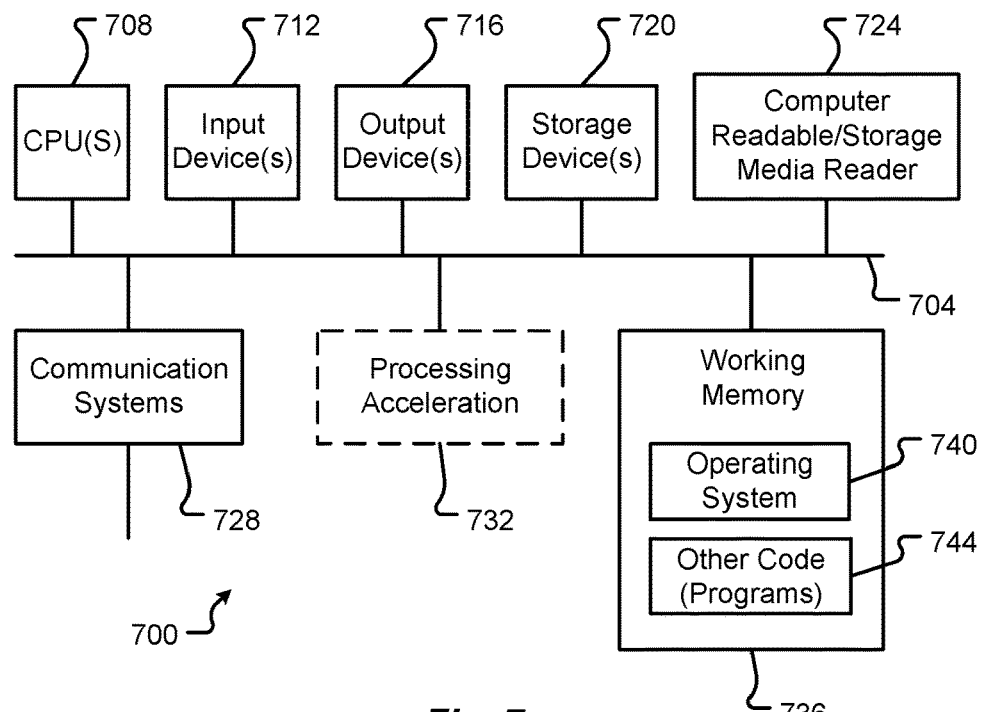
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
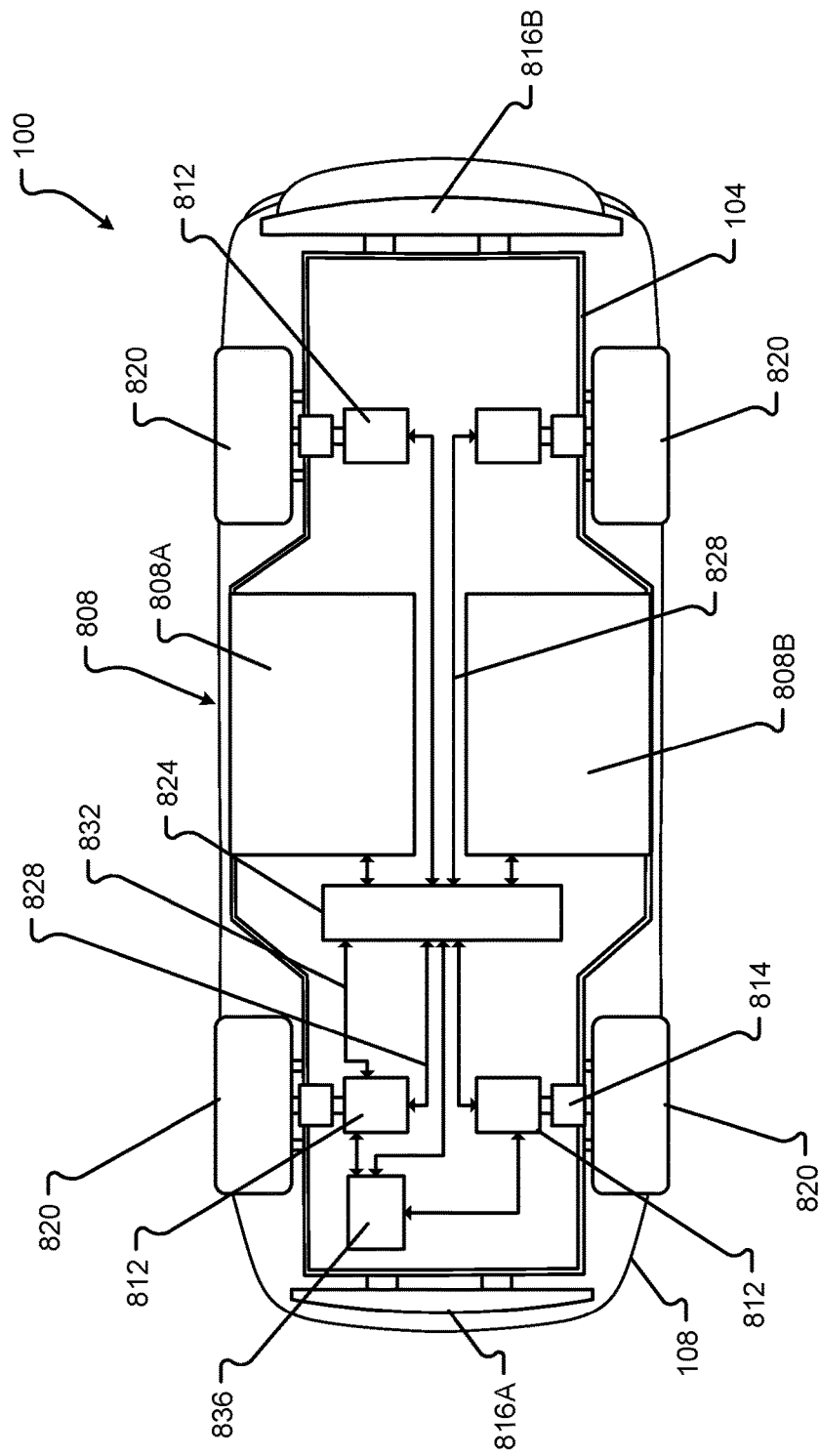
FIG. 8 shows a plan view of the vehicle in accordance with at least some embodiments of the present disclosure.

Referring now to FIG. 8, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 808A, 808B, motors 812, engines, safety equipment, controllers, user interfaces, interiors exterior components, body panels 108, bumpers 816, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 808A, 808B (e.g., battery unit, capacitor unit, etc.) from the vehicle 100 and replace the used power source 808A, 808B with a charged or new power source. Continuing this example, the power source 808A, 808B may include selectively interchangeable features that interconnect with the frame 104 or other portion of the vehicle 100. For instance, in a power source 808A, 808B replacement, the quick release features may be configured to release the power source 808A, 808B from an engaged position and slide or move in a direction away from the frame 104 of a vehicle 100. Once removed, or separated from, the vehicle, the power source 808A, 808B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 812 of the vehicle 100. The electric motors 812 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 820 that are driven by the one or more electric motors 812 and motor controllers 814. In some cases, the vehicle 100 may include an electric motor 812 configured to provide a driving force for each drive wheel 820. In other cases, a single electric motor 812 may be configured to share an output force between two or more drive wheels 820 via one or more power transmission components. It is an aspect of the present disclosure that the powertrain may include one or more power transmission components, motor controllers 814, and/or power controllers that can provide a controlled output of power to one or more of the drive wheels 820 of the vehicle 100. The power transmission components, power controllers, or motor controllers 814 may be controlled by at least one other vehicle controller, vehicle control system 348, or computer system as described herein.

As provided above, the powertrain of the vehicle 100 may include one or more power sources 808A, 808B. These one or more power sources 808A, 808B may be configured to provide drive power, system and/or subsystem power, accessory power, etc. While described herein as a single power source 808 for sake of clarity, embodiments of the present disclosure are not so limited. For example, it should be appreciated that independent, different, or separate power sources 808A, 808B may provide power to various systems of the vehicle 100. For instance, a drive power source may be configured to provide the power for the one or more electric motors 812 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 808A, 808B in this manner may provide a number of benefits over conventional vehicle systems. For example, separating the power sources 808A, 808B allow one power source 808 to be removed and/or replaced independently without requiring that power be removed from all systems and/or subsystems of the vehicle 100 during a power source 808 removal/replacement. For instance, one or more of the accessories, communications, safety equipment, and/or backup power systems, etc., may be maintained even when a particular power source 808A, 808B is depleted, removed, or becomes otherwise inoperable.

In some embodiments, the drive power source may be separated into two or more cells, units, sources, and/or systems. By way of example, a vehicle 100 may include a first drive power source 808A and a second drive power source 808B. The first drive power source 808A may be operated independently from or in conjunction with the second drive power source 808B and vice versa. Continuing this example, the first drive power source 808A may be removed from a vehicle while a second drive power source 808B can be maintained in the vehicle 100 to provide drive power. This approach allows the vehicle 100 to significantly reduce weight (e.g., of the first drive power source 808A, etc.) and improve power consumption, even if only for a temporary period of time. In some cases, a vehicle 100 running low on power may automatically determine that pulling over to a rest area, emergency lane, and removing, or "dropping off," at least one power source 808A, 808B may reduce enough weight of the vehicle 100 to allow the vehicle 100 to navigate to the closest power source replacement and/or charging area. In some embodiments, the removed, or "dropped off," power source 808A may be collected by a collection service, vehicle mechanic, tow truck, or even another vehicle or individual.

The power source 808 may include a GPS or other geographical location system that may be configured to emit a location signal to one or more receiving entities. For instance, the signal may be broadcast or targeted to a specific receiving party. Additionally or alternatively, the power source 808 may include a unique identifier that may be used to associate the power source 808 with a particular vehicle 100 or vehicle user. This unique identifier may allow an efficient recovery of the power source 808 dropped off. In some embodiments, the unique identifier may provide information for the particular vehicle 100 or vehicle user to be billed or charged with a cost of recovery for the power source 808.

The power source 808 may include a charge controller 824 that may be configured to determine charge levels of the power source 808, control a rate at which charge is drawn from the power source 808, control a rate at which charge is added to the power source 808, and/or monitor a health of the power source 808 (e.g., one or more cells, portions, etc.). In some embodiments, the charge controller 824 or the power source 808 may include a communication interface. The communication interface can allow the charge controller 824 to report a state of the power source 808 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 808 to one or more electric motors 812 in the vehicle 100. The power distribution system may include electrical interconnections 828 in the form of cables, wires, traces, wireless power transmission systems, etc., and/or combinations thereof. It is an aspect of the present disclosure that the vehicle 100 include one or more redundant electrical interconnections 832 of the power distribution system. The redundant electrical interconnections 832 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 832 is being used and/or damage has occurred to a particular area of the vehicle electrical system. In any event, the one or more redundant electrical interconnections 832 may be configured along completely different routes than the electrical interconnections 828 and/or include different modes of failure than the electrical interconnections 828 to, among other things, prevent a total interruption power distribution in the event of a failure.

In some embodiments, the power distribution system may include an energy recovery system 836. This energy recovery system 836, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 836, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 808. For example, the recovered electrical energy may be used to charge the power source 808 of the vehicle 100.

The vehicle 100 may include one or more safety systems. Vehicle safety systems can include a variety of mechanical and/or electrical components including, but in no way limited to, low impact or energy-absorbing bumpers 816A, 816B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 9:
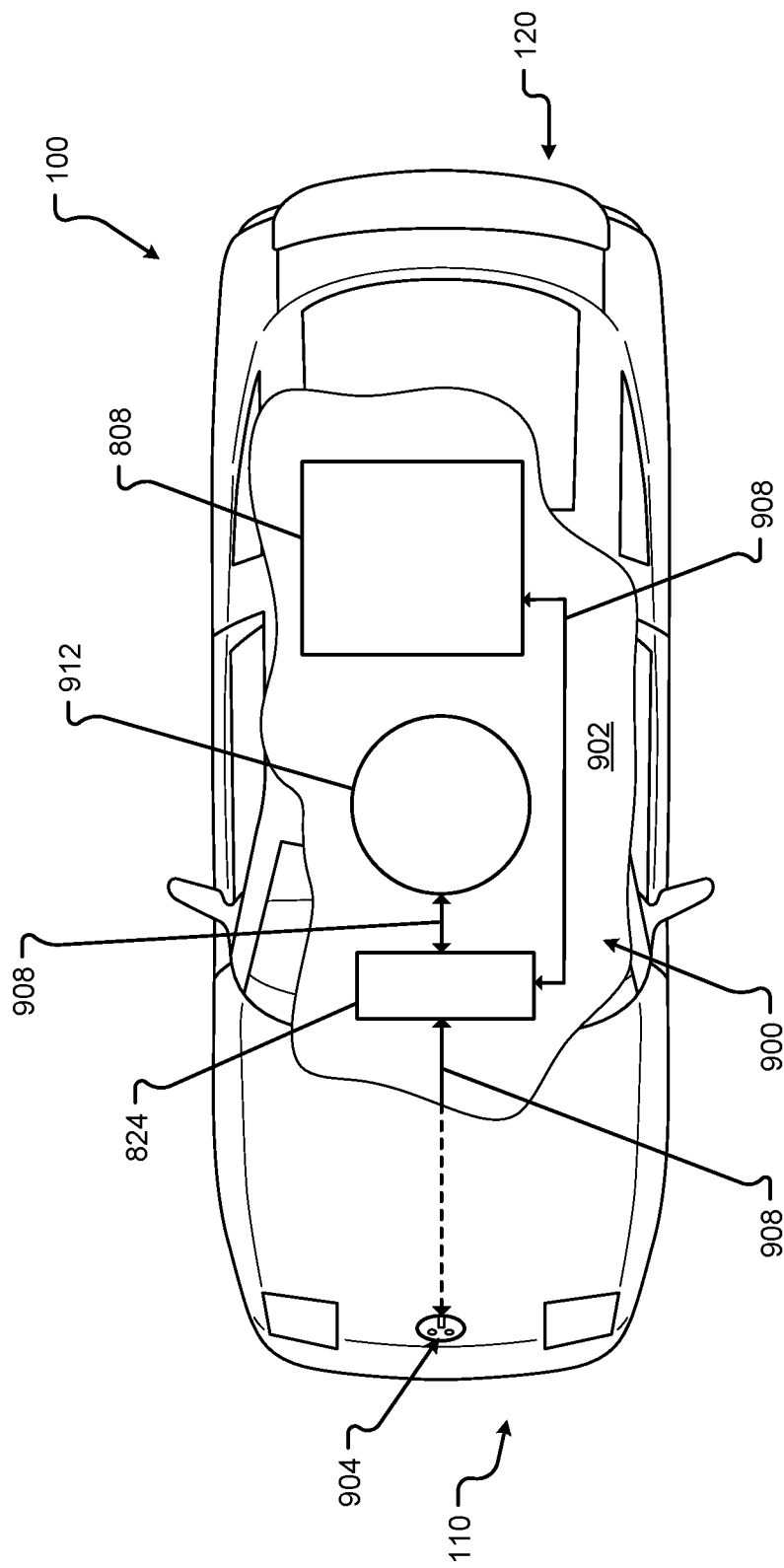
FIG. 9 shows a plan view of the vehicle in accordance with embodiments of the present disclosure.

FIG. 9 shows a plan view of the vehicle 100 in accordance with embodiments of the present disclosure. In particular, FIG. 9 shows a broken section 902 of a charging system 900 for the vehicle 100. The charging system 900 may include at least one plug or receptacle 904 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 904 may be transferred via at least one power transmission interconnection 908. Similar, if not identical, to the electrical interconnections 828 described above, the at least one power transmission interconnection 908 may be one or more cables, wires, traces, wireless power transmission systems, etc., and/or combinations thereof. Electrical energy in the form of charge can be transferred from the external power source to the charge controller 824. As provided above, the charge controller 824 may regulate the addition of charge to at least one power source 808 of the vehicle 100 (e.g., until the at least one power source 808 is full or at a capacity, etc.).

In some embodiments, the vehicle 100 may include an inductive charging system and inductive charger 912. The inductive charger 912 may be configured to receive electrical energy from an inductive power source external to the vehicle 100. In one embodiment, when the vehicle 100 and/or the inductive charger 912 is positioned over an inductive power source external to the vehicle 100, electrical energy can be transferred from the inductive power source to the vehicle 100. For example, the inductive charger 912 may receive the charge and transfer the charge via at least one power transmission interconnection 908 to the charge controller 924 and/or the power source 908 of the vehicle 100. The inductive charger 912 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 912 may be configured to receive charge only when the inductive charger 912 is deployed from the vehicle 100. In other embodiments, the inductive charger 912 may be configured to receive charge while concealed in the portion of the vehicle 100.

Figure 10:
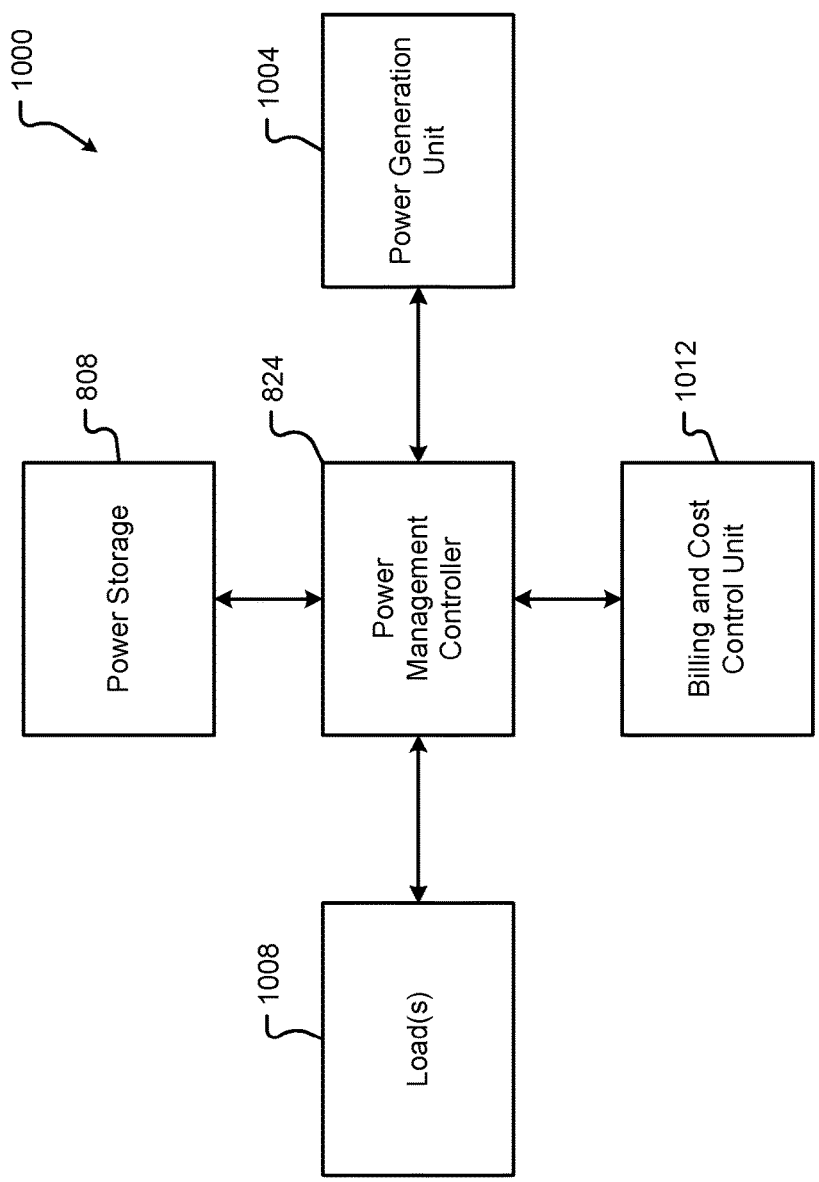
FIG. 10 is a block diagram of an embodiment of an electrical system of the vehicle.

An embodiment of the electrical system 1000 associated with the vehicle 100 may be as shown in FIG. 10. The electrical system 1000 can include power source(s) that generate power, power storage that stores power, and/or load(s) that consume power. Power sources may be associated with a power generation unit 1004. Power storage may be associated with a power storage system 808. Loads may be associated with loads 1008. The electrical system 1000 may be managed by a power management controller 824. Further, the electrical system 1000 can include one or more other interfaces or controllers, which can include the billing and cost control unit 1012.

Figure 11:
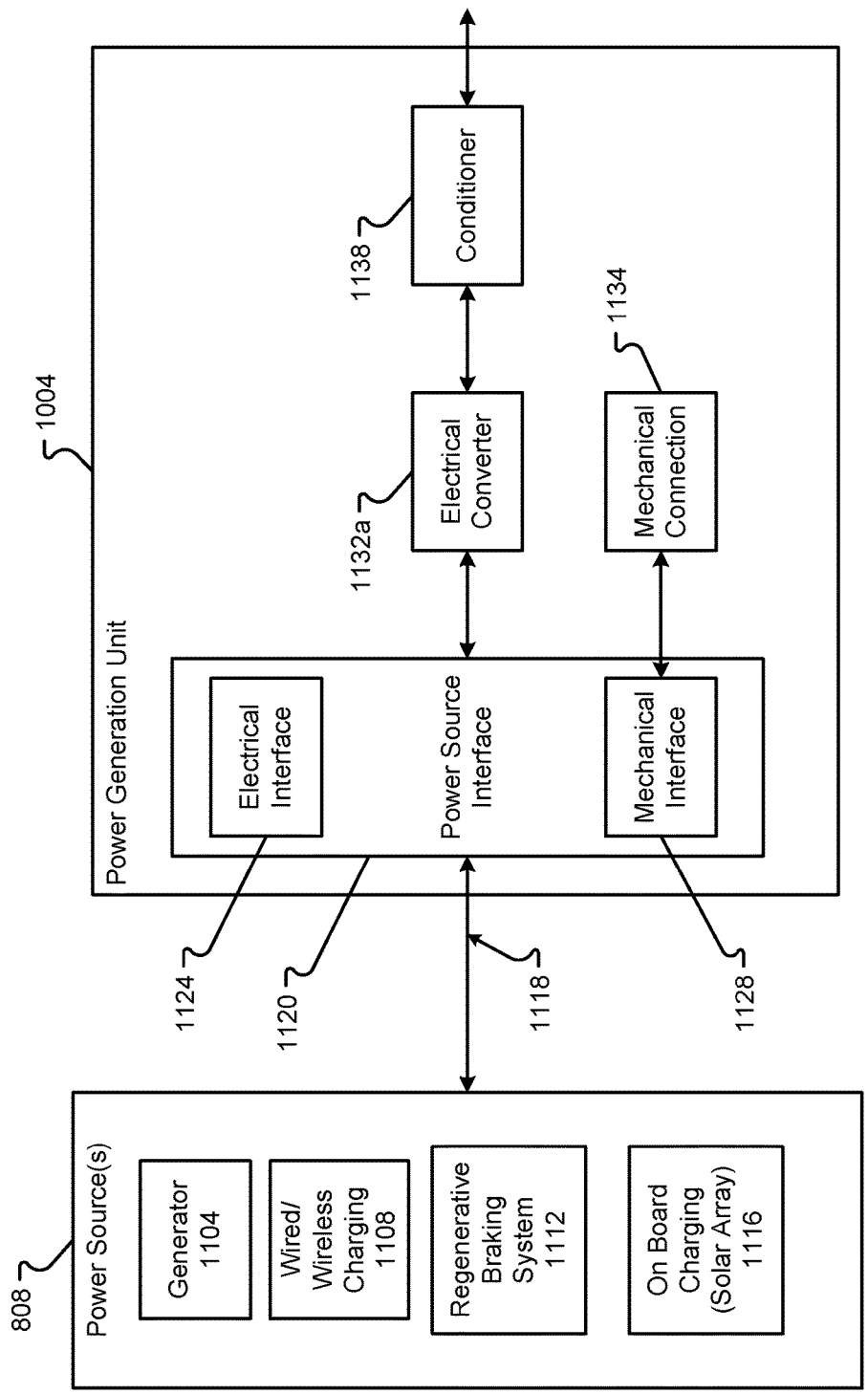
FIG. 11 is a block diagram of an embodiment of a power generation unit associated with the electrical system of the vehicle.

The power generation unit 1004 may be as described in conjunction with FIG. 11. The power storage component 808 may be as described in conjunction with FIG. 12. The loads 1008 may be as described in conjunction with FIG. 13.

The billing and cost control unit 1012 may interface with the power management controller 824 to determine the amount of charge or power provided to the power storage 808 through the power generation unit 1004. The billing and cost control unit 1012 can then provide information for billing the vehicle owner. Thus, the billing and cost control unit 1012 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 824 can be a computer or computing system(s) and/or electrical system with associated components, as described herein, capable of managing the power generation unit 1004 to receive power, routing the power to the power storage 808, and then providing the power from either the power generation unit 1004 and/or the power storage 808 to the loads 1008. Thus, the power management controller 824 may execute programming that controls switches, devices, components, etc. involved in the reception, storage, and provision of the power in the electrical system 1000.

An embodiment of the power generation unit 1004 may be as shown in FIG. 11. Generally, the power generation unit 1004 may be electrically coupled to one or more power sources 808. The power sources 808 can include power sources internal and/or associated with the vehicle 100 and/or power sources external to the vehicle 100 to which the vehicle 100 electrically connects. One of the internal power sources can include an on board generator 1104. The generator 1104 may be an alternating current (AC) generator, a direct current (DC) generator or a self-excited generator. The AC generators can include induction generators, linear electric generators, and/or other types of generators. The DC generators can include homopolar generators and/or other types of generators. The generator 1104 can be brushless or include brush contacts and generate the electric field with permanent magnets or through induction. The generator 1104 may be mechanically coupled to a source of kinetic energy, such as an axle or some other power take-off. The generator 1104 may also have another mechanical coupling to an exterior source of kinetic energy, for example, a wind turbine.

Another power source 808 may include wired or wireless charging 1108. The wireless charging system 1108 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 1108 can provide power to the power generation unit 1004 from external power sources 808.

Internal sources for power may include a regenerative braking system 1112. The regenerative braking system 1112 can convert the kinetic energy of the moving car into electrical energy through a generation system mounted within the wheels, axle, and/or braking system of the vehicle 100. The regenerative braking system 1112 can include any coils, magnets, electrical interconnections, converters, controllers, etc. required to convert the kinetic energy into electrical energy.

Another source of power 808, internal to or associated with the vehicle 100, may be a solar array 1116. The solar array 1116 may include any system or device of one or more solar cells mounted on the exterior of the vehicle 100 or integrated within the body panels of the vehicle 100 that provides or converts solar energy into electrical energy to provide to the power generation unit 1004.

The power sources 808 may be connected to the power generation unit 1004 through an electrical interconnection 1118. The electrical interconnection 1118 can include any wire, interface, bus, etc. between the one or more power sources 808 and the power generation unit 1004.

The power generation unit 1004 can also include a power source interface 1120. The power source interface 1120 can be any type of physical and/or electrical interface used to receive the electrical energy from the one or more power sources 808; thus, the power source interface 1120 can include an electrical interface 1124 that receives the electrical energy and a mechanical interface 1128 which may include wires, connectors, or other types of devices or physical connections. The mechanical interface 1108 can also include a physical/electrical connection 1134 to the power generation unit 1004

The electrical energy from the power source 808 can be processed through the power source interface 1124 to an electric converter 1132. The electric converter 1132 may convert the characteristics of the power from one of the power sources into a useable form that may be used either by the power storage 808 or one or more loads 1008 within the vehicle 100. The electrical converter 1124 may include any electronics or electrical devices and/or component that can change electrical characteristics, e.g., AC frequency, amplitude, phase, etc. associated with the electrical energy provided by the power source 808. The converted electrical energy may then be provided to an optional conditioner 1138. The conditioner 1138 may include any electronics or electrical devices and/or component that may further condition the converted electrical energy by removing harmonics, noise, etc. from the electrical energy to provide a more stable and effective form of power to the vehicle 100.

Figure 12:
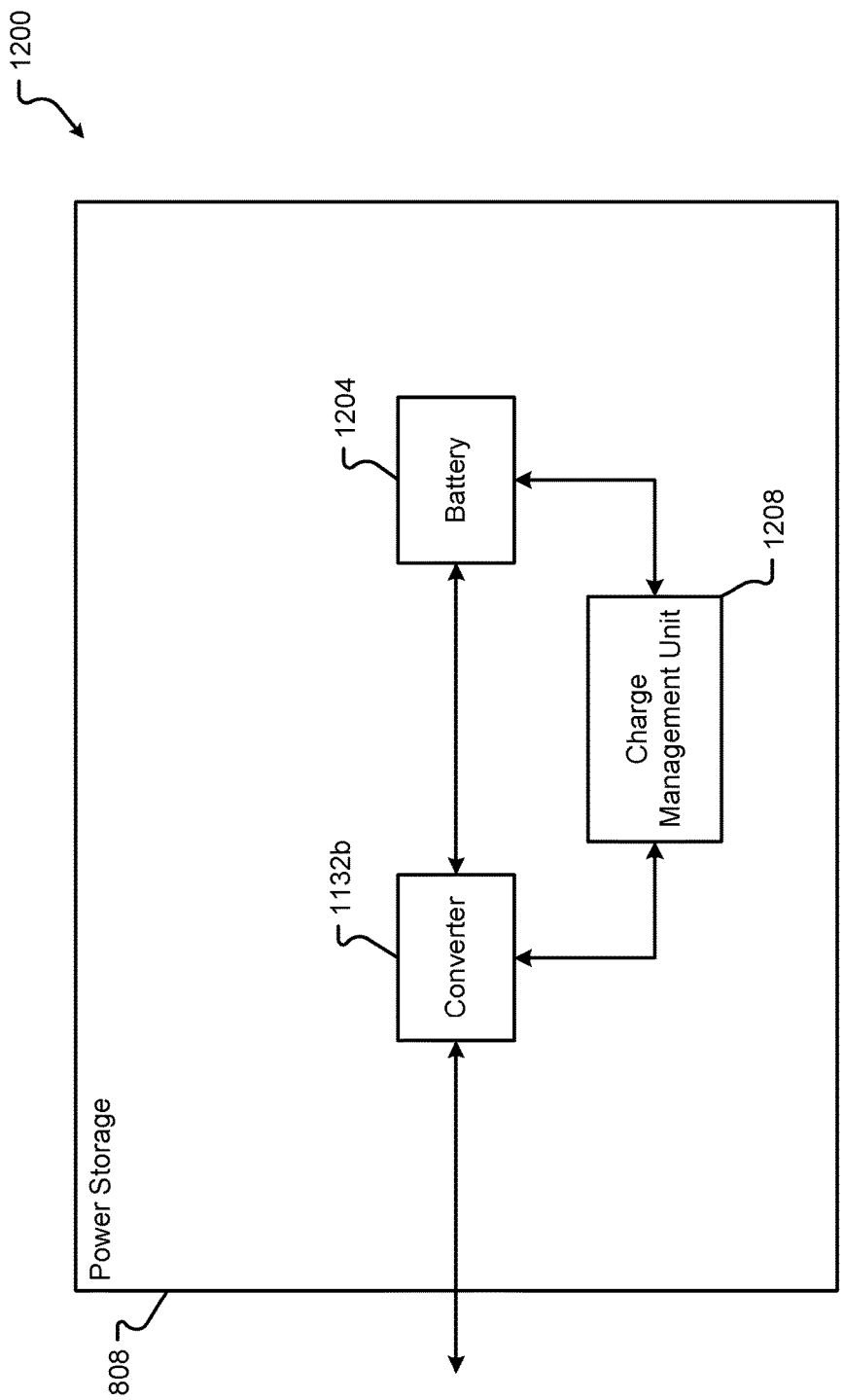
FIG. 12 is a block diagram of an embodiment of power storage associated with the electrical system of the vehicle.

An embodiment of the power storage 808 may be as shown in FIG. 12. The power storage unit can include an electrical converter 1132b, one or more batteries, one or more rechargeable batteries, one or more capacitors, one or more accumulators, one or more supercapacitors, one or more ultrabatteries, and/or superconducting magnetics 1204, and/or a charge management unit 1208. The converter 1132b may be the same or similar to the electrical converter 1132a shown in FIG. 11. The converter 1132b may be a replacement for the electric converter 1132a shown in FIG. 11 and thus eliminate the need for the electrical converter 1132a as shown in FIG. 11. However, if the electrical converter 1132a is provided in the power generation unit 1004, the converter 1132b, as shown in the power storage unit 808, may be eliminated. The converter 1132b can also be redundant or different from the electrical converter 1132a shown in FIG. 11 and may provide a different form of energy to the battery and/or capacitors 1204. Thus, the converter 1132b can change the energy characteristics specifically for the battery/capacitor 1204.

The energy storage or battery 1204 can be any type of battery for storing electrical energy, for example, a lithium ion battery, a lead acid battery, a nickel cadmium battery, etc. Further, the battery 1204 may include different types of power storage systems, such as, ionic fluids or other types of fuel cell systems. The energy storage 1204 may also include one or more high-capacity capacitors 1204. The capacitors 1204 may be used for long-term or short-term storage of electrical energy. The input into the battery or capacitor 1204 may be different from the output, and thus, the capacitor 1204 may be charged quickly but drain slowly. The functioning of the converter 1132 and battery capacitor 1204 may be monitored or managed by a charge management unit 1208.

The charge management unit 1208 can include any hardware (e.g., any electronics or electrical devices and/or components), software, or firmware operable to adjust the operations of the converter 1132 or batteries/capacitors 1204. The charge management unit 1208 can receive inputs or periodically monitor the converter 1132 and/or battery/capacitor 1204 from this information; the charge management unit 1208 may then adjust settings or inputs into the converter 1132 or battery/capacitor 1204 to control the operation of the power storage system 808.

Figure 13:
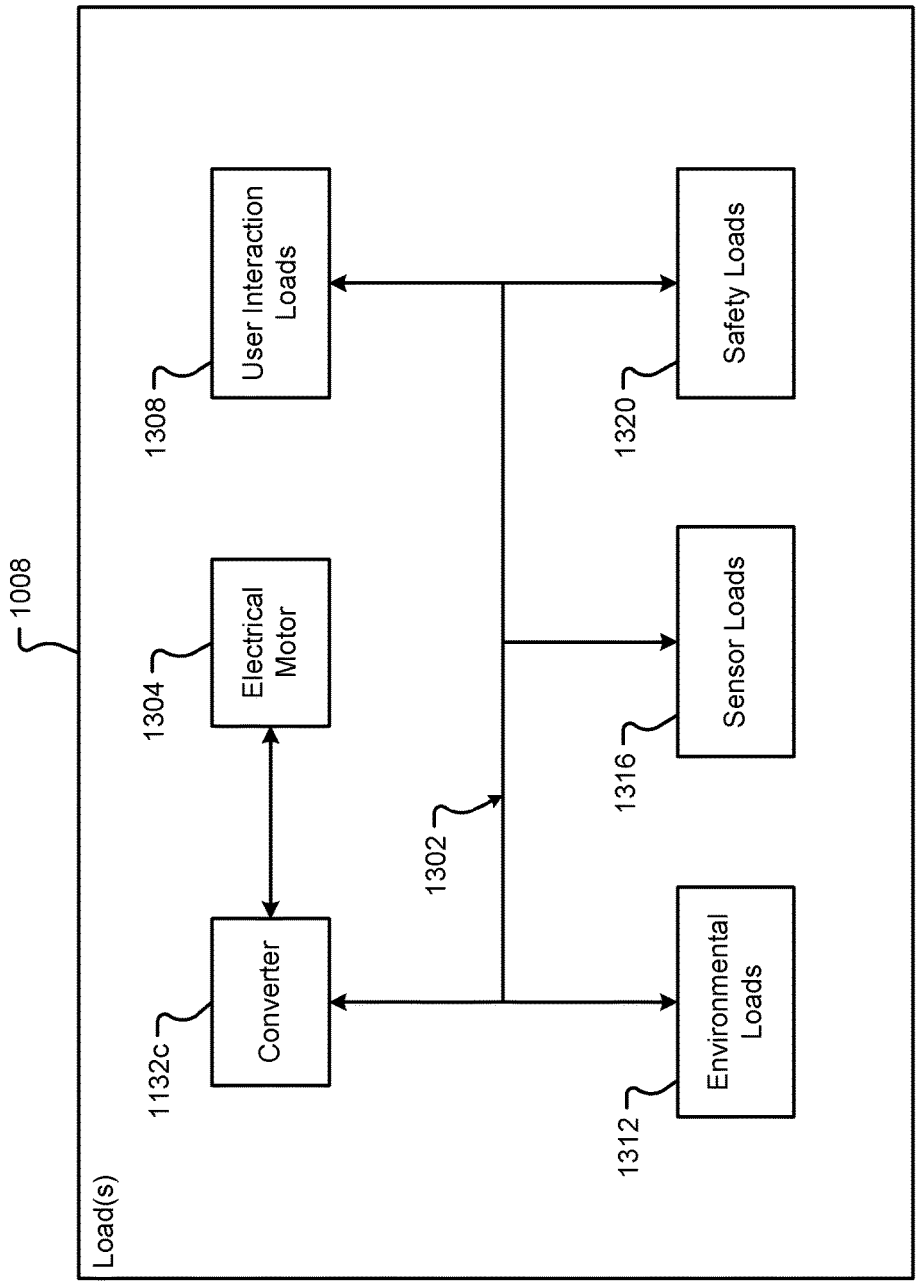
FIG. 13 is a block diagram of an embodiment of loads associated with the electrical system of the vehicle.

An embodiment of one or more loads 1008 associated with the vehicle 100 may be as shown in FIG. 13. The loads 1008 may include a bus or electrical interconnection system 1302, which provides electrical energy to one or more different loads within the vehicle 100. The bus 1302 can be any number of wires or interfaces used to connect the power generation unit 1004 and/or power storage 808 to the one or more loads 1008. The converter 1132c may be an interface from the power generation unit 1004 or the power storage 808 into the loads 1008. The converter 1132c may be the same or similar to electric converter 1132a as shown in FIG. 11. Similar to the discussion of the converter 1132b in FIG. 12, the converter 1132c may be eliminated, if the electric converter 1132a, shown in FIG. 11, is present. However, the converter 1132c may further condition or change the energy characteristics for the bus 1302 for use by the loads 1008. The converter 1132c may also provide electrical energy to electric motor 1304, which may power the vehicle 100.

The electric motor 1304 can be any type of DC or AC electric motor. The electric motor may be a direct drive or induction motor using permanent magnets and/or winding either on the stator or rotor. The electric motor 1304 may also be wireless or include brush contacts. The electric motor 1304 may be capable of providing a torque and enough kinetic energy to move the vehicle 100 in traffic. In some embodiments, the electric motor 1304 may be similar, if not identical, to the electric motor 812 described in conjunction with FIG. 8.

The different loads 1008 may also include environmental loads 1312, sensor loads 1316, safety loads 1320, user interaction loads 1308, etc. User interaction loads 1308 can be any energy used by user interfaces or systems that interact with the driver and/or passenger(s) of the vehicle 100. These loads 1308 may include, for example, the heads up display 434, the dash display 420, 424, 428, the radio, user interfaces on the head unit, lights, radio, and/or other types of loads that provide or receive information from the occupants of the vehicle 100. The environmental loads 1312 can be any loads used to control the environment within the vehicle 100. For example, the air conditioning or heating unit of the vehicle 100 can be environmental loads 1312. Other environmental loads can include lights, fans, and/or defrosting units, etc. that may control the environment within, and/or outside of, the vehicle 100. The sensor loads 1316 can be any loads used by sensors, for example, air bag sensors, GPS, and other such sensors used to either manage or control the vehicle 100 and/or provide information or feedback to the vehicle occupants. The safety loads 1320 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 13.

Figure 14:
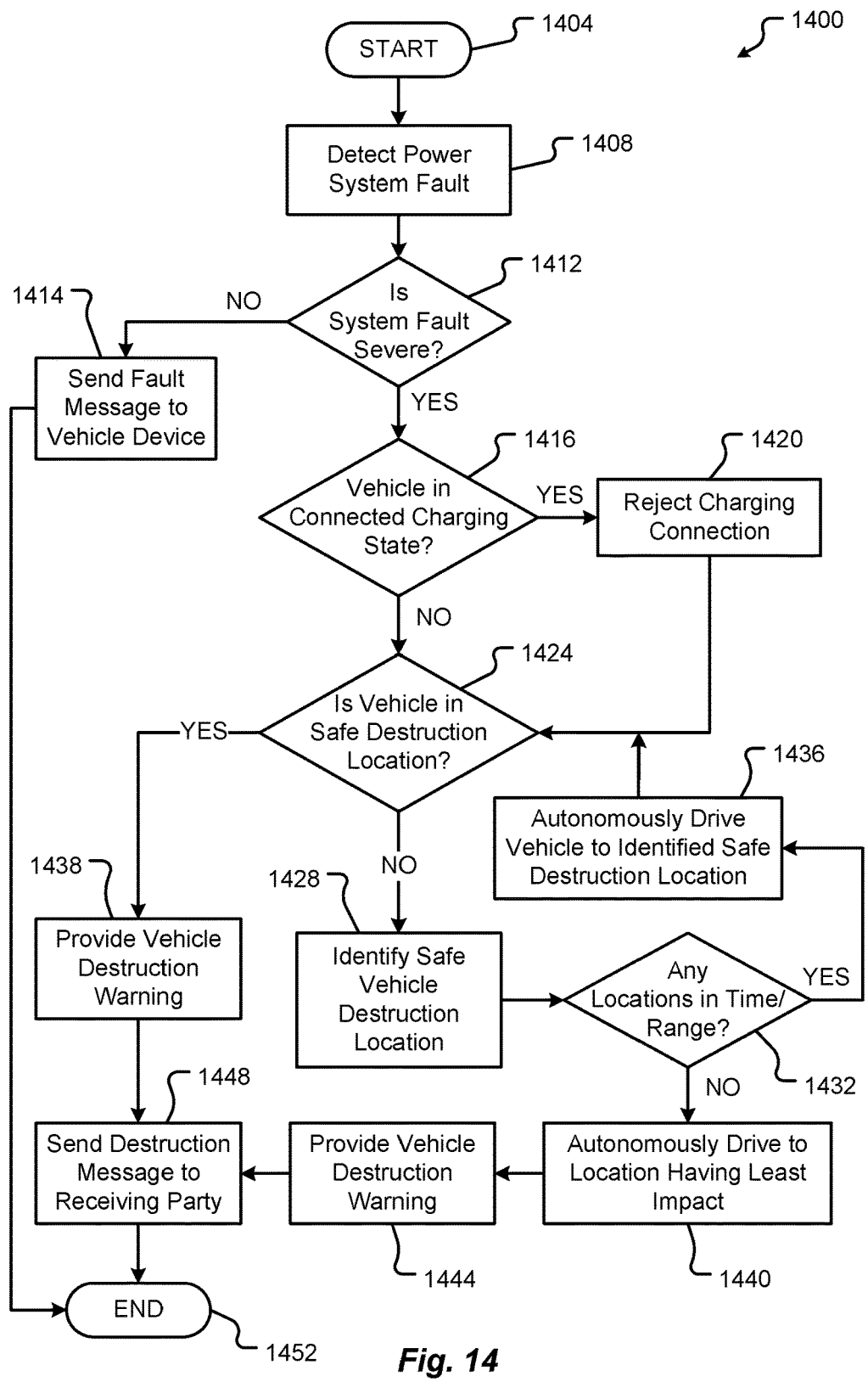
FIG. 14 is a flow diagram of a method for autonomously driving a vehicle in accordance with embodiments of the present disclosure.

FIG. 14 is a flow diagram of a method 1400 for autonomously driving a vehicle 100 in response to detecting a power system fault (e.g., a battery fault, a thermal fault, etc.). While a general order for the steps of the method 1400 is shown in FIG. 14, the method 1400 can include more or fewer steps or can arrange the order of the steps differently than those shown in FIG. 14. Generally, the method 1400 starts with a start operation 1404 and ends with an end operation 1452. The method 1400 can be executed as a set of computer-executable instructions executed by a computer system and encoded or stored on a computer readable medium. Hereinafter, the method 1400 shall be explained with reference to the systems, components, assemblies, devices, user interfaces, environments, software, etc. described in conjunction with FIGS. 1-13.

Current day electric vehicles may be prone to thermal events or power system faults. These events may be due to the immature nature of battery cell chemistry. Ideally, a thermal event occurs when the user is present and able to escape from the vehicle 100 safely. In a non-ideal situation, the user may be charging the vehicle 100 at their home and while the user is sleeping, the vehicle 100 may catch fire which could possibly spread to the home of the user causing damage and/or death. In some embodiments, the vehicle 100 may be charging in a public place (e.g., at work, at a shopping area, at a park, etc.) where the vehicle 100 may be surrounded by, or in a vicinity to, people.

It is an aspect of the present disclosure to provide an autonomous vehicle 100 that is capable of recognizing a thermal fault, rejecting a charging connection, and autonomously driving to a safe location or zone where the vehicle 100 can "self-destruct." During this process, the vehicle may attempt to keep a user safe while preventing, or lessening, damage to surrounding environments, objects, and/or structures. Upon reaching a safe location, the vehicle 100 may evaluate the location to determine whether the safe location is free of obstructions, hazards, objects, people, animals, and/or structures. In some cases, the vehicle 100 may send commands, instructions, and/or information to a third party (e.g., fire, police, medical, local authorities, etc.) to assist in lessening or preventing harm to the vehicle 100, any occupant, and/or any other area.

In one embodiment, the method 1400 may begin at step 1404 and proceed by detecting a power system fault (step 1408). The power system fault may correspond to any fault associated with the power source 808, 808A-B, charge controller 824, motor 812, electrical interconnections 828, 832, 908, energy recovery system 836, charger 912, power receptacle 904, and/or any other component of the power distribution system of the vehicle 100 (e.g., as described in conjunction with FIGS. 8 and 9, etc.). In some embodiments, the power system fault may be an electrical disturbance, thermal event, charging error, electric arc, component or system fire, component or system smoking/smoldering, insulation failure, electrical short, etc., and/or combinations thereof. For the sake of example, the power system fault may be described as corresponding to a thermal event (e.g., fire, smoke, explosion, etc.) associated with the power source 808 or related component of the vehicle 100. It should be appreciated, however, that the embodiments described herein are not limited to thermal events associated with the power source 808 of the vehicle 100.

In any event, the method 1400 may detect the power system fault (e.g., thermal event, etc.) based on one or more signals received from thermocouples, pressure sensors, temperature sensors, smoke detectors, electrical continuity circuits, etc., and/or other sensors or devices associated with the vehicle 100 and/or the power source 808. In some embodiments, these sensors or devices may be integral to the power source 808, the vehicle 100, and/or combinations thereof. The sensors or devices, upon detecting a fault condition (e.g., receiving a signal indicative of a pressure, temperature, electrical signal, etc.) of the power source 808 and/or vehicle 100 may report the condition (e.g., in the form of an output, etc.) to one or more sensor processors 340 of the vehicle 100. The sensor processors 340 can interpret the fault condition and determine whether the fault condition falls inside or outside of acceptable parameters. In some embodiments, a system fault may be detected when a value of the fault condition exceeds, or fails to meet, a predetermined threshold value. The predetermined threshold value may be set to include safe operable limits for the power system, the vehicle 100, the occupants of the vehicle 100, the surroundings of the vehicle 100, and the like.

In some embodiments, the method 1400 may optionally determine a severity of the power system fault (step 1412). For instance, the fault condition, or fault observed, at the power system may be graded, rated, classified, or otherwise categorized based on the value associated with the fault condition. In one embodiment, the sensor processors 340 may compare the value of the fault condition and compare it to a number of predetermined threshold values or ranges of values. By way of example, a first predetermined threshold value may be set at a first severity level. The first severity level may correspond to a minimum fault condition that may affect an operation or capability of the vehicle 100 but that would not, or cannot, affect a health of a person in or about the vehicle 100. At the first predetermined threshold value, the power system fault would not be considered "severe." In some embodiments, however, a fault condition may be considered severe if the health of a person is at risk. For instance, a second predetermined threshold value may be set at a second severity level. The second severity level may indicate that the fault could pose a safety hazard to one or more people, structures, objects, etc., in proximity to the vehicle 100 (e.g., inside and/or outside of the vehicle 100). In some embodiments, a fault condition may be considered urgent and severe if the health of a person is immediately at risk. In this case, a third predetermined threshold value may be set at a third severity level. The third severity level may indicate that the fault could poses an immediate safety hazard to one or more people, structures, objects, etc., in proximity to the vehicle 100 (e.g., inside and/or outside of the vehicle 100). The methods and systems disclosed herein may alter a presentation or response to the power system fault based on the determined severity level.

In some cases, these and/or additional predetermined threshold values may be set that can be used in identifying the urgency associated with the power system fault. As an example, each severity level may include timing information associated with the observed fault. In this case, the sensor processors 340 can determine an amount of time until the power system fault poses an immediate threat to a person, structure, object, etc. When there is a shorter amount of time until the power system fault poses an immediate threat, the severity level may increase. In some embodiments, this increase to the severity level may alter an output by one or more components of the vehicle 100. For instance, a first severity level may cause the vehicle 100 to provide only a warning of the fault (e.g., to a display or other output device associated with the vehicle, etc.). The second severity level may cause the vehicle 100 to provide the warning of the fault as described in conjunction with the first severity level, or a warning with increased urgency (e.g., greater emphasis, font size, enhanced graphics, color changing presentation of information, outputting to more than one display, etc., and/or combinations thereof), and may additionally provide exit instructions, autonomous vehicle control, vehicle component actuation, charging connection ejection, etc. The third severity level may cause the vehicle 100 to provide an urgent warning (e.g., having a greater emphasis or effect, etc.) to devices associated with the vehicle, notify third parties (e.g., via wireless communication, exterior output devices, etc.), and provide exit instructions, autonomous vehicle control, vehicle component actuation, charging connection ejection, etc., and/or take immediate action to prevent harm to people, structures, and/or objects in proximity to the vehicle 100 (e.g., inside and/or outside of the vehicle 100). In some embodiments, the vehicle 100 may use the horn, external hazard lights/blinkers, and/or other device to alert people of a power system fault.

In the event the power system fault is determined not to be severe or only at a first severity level, the method 1400 may proceed by sending a fault message to one or more devices associated with the vehicle 100 (step 1414). The fault message may be rendered to a display device associated with the vehicle 100. In some embodiments, the fault message may be sent to a device that is associated with an owner, occupant, or user of the vehicle 100. The fault message may include information regarding the fault detected, the location of the fault detected, a severity of the fault, and/or other fault information.

In the event that the power system fault is determined to be severe or at a second or higher severity level, the method 1400 may proceed by determining a state of the vehicle 100, for example, whether the vehicle 100 is in a connected charging state (step 1416). In some embodiments, the connected charging state may correspond to a state where the vehicle 100 is receiving power from a power supply, or charging, system (e.g., whether inductively or physically interconnected to the charging system). In one embodiment, the connected charging state may correspond to a state where the vehicle 100 is physically interconnected with a charging system (e.g., via a charging connector and receptacle coupling or interface, etc.).

The connection may be determined from one or more charging sensors, charge controllers 824, proximity sensors, and/or some other switch or sensor associated with the charging receptacle of the vehicle 100 and/or the charging system. For instance, where the one or more switches and/or sensors provide a signal indicating the vehicle 100 is connected to a charging system. In some embodiments, the connection may be determined based on a flow of charge monitored by the charge controller 824 of the vehicle 100. This monitored flow of charge may indicate that the vehicle 100 is receiving charge from a connected charging system.

In the event that the vehicle 100 is determined to be in a connected charging state, the method 1400 may continue by rejecting the charging connection (step 1420). In some embodiments, rejection of the charging connection may include one or more of interrupting the charging operation (e.g., ceasing the flow of charge from the charging system, etc.), informing the charging system of the fault, disconnecting the charging connection, ejecting the charging connector from the vehicle 100, and/or the like. Additional details of rejecting the charging connection are described in conjunction with FIGS. 19-25B.

Next, the method 1400 may proceed by determining whether the vehicle 100 is in a safe location to suffer through the power system fault, safely contain the fault, or otherwise destruct (step 1424). For instance, if the power system fault is a thermal event (e.g., fire, explosion, smoking, etc.), the method 1400 may determine whether the vehicle 100 is close to any people and/or flammable objects/structures. As another example, if the power system fault is an electrical event, battery leak, or other chemical event, the method 1400 may determine whether the vehicle 100 is close to any people, plants, water sources, etc. In any event, the method 1400 may use one or more sensors or systems associated with the vehicle 100 in making this determination. In some embodiments, the vehicle 100 may use any of the driving vehicle sensors 304, or environment sensors, described in conjunction with FIG. 3A to evaluate an environment around the vehicle 100. For example, the vehicle 100 may use one or more cameras 332, LIDAR 320, or IR sensors 336 to view an area or zone adjacent to the vehicle 100. In this view, the imaging sensors 332, 320, 336 may detect whether one or more people, structures, and/or objects are in close proximity to the vehicle 100 (e.g., at an unsafe distance from the vehicle 100 where an effect of the power system fault may spread to the nearby people, structures, or objects, etc.). Additionally or alternatively, the vehicle 100 may utilize one or more proximity sensors (e.g., RADAR 324, ultrasonic 328, etc.) to determine whether an object is close to the vehicle 100. In some embodiments, the vehicle 100 may use a redundant or backup battery to operate the vehicle 100 if a primary battery is under threat. In one embodiment, firewalls may be used to protect other electronic systems to continue to operate in case of a thermal event.

In the event that the vehicle 100 is not determined to be in a safe location, the method 1400 may proceed by identifying a safe location to which the vehicle 100 may travel (step 1428). Identification of a safe location may include referring to a memory associated with the vehicle 100. The memory may include one or more geographical locations (e.g., identified by GPS coordinates, etc.) or zones (e.g., identified by map position, waypoints, etc.) stored therein that are identified as "safe" for vehicle destruction. In some cases, a vehicle owner may have previously identified one or more safe locations (e.g., prior to the power system fault occurring, etc.) for the vehicle 100 to destruct. In one embodiment, the safe location may be stored in a database of recognized safe locations. The database may be stored locally with the vehicle 100 or remotely across a communication network. In some embodiments, the vehicle 100 may identify the safe location based on visual/image data obtained by one or more sensors associated with the vehicle 100. Examples of safe locations may include, but are in no way limited to, a driveway, nearby fire station, reserved area, parking lot, remote area, inert location, designated destruction zone, etc.

Next, the method 1400 continues by determining whether any of the identified safe locations are within a range of travel for the vehicle 100 (step 1432). The range of travel for the vehicle 100 may depend on a state of charge (e.g., empty, near-empty, reserve power, backup power only, near full, full, etc.) associated with the vehicle power source 808. Additionally or alternatively, the range of travel may depend on a severity or timing associated with the power system fault. The more severe the power system fault, the shorter the range of travel. The less severe the power system fault, the longer the range of travel. By way of example, a power system fault may be determined to be destroying components of the vehicle 100 required for autonomous driving at a rate of speed that would prevent the vehicle 100 from reliably or safely driving beyond a first distance or range. In another example, the power system fault may be determined to be confined to, or contained within, a particular area of the vehicle 100 (e.g., a less severe fault than the previous example) and the vehicle 100 may be capable of safely driving beyond the first distance or range. It should be appreciated that the severity and corresponding range of travel for the vehicle 100 may change as time passes.

In some embodiments, if the power source 808 is near-empty, the vehicle 100 may calculate a range of travel for the vehicle 100 based on this state of charge. As can be appreciated, a range of travel for a power source 808 that is near-empty (e.g., a power source 808 having 1%, 5%, or 10% remaining charge, and/or values therebetween, etc.) is less than a range of travel for a power source 808 that is near-full (e.g., a power source 808 having 75%, 90%, or 99% remaining charge, and/or values therebetween, etc.).

The state of charge and the severity of the power system fault may be used alone, separately, and/or in conjunction to determine an appropriate range of travel for the vehicle 100.

This range of travel may dynamically change in response to a change in detected conditions, state of charge, and/or severity of the fault. In some embodiments, the safe locations provided to the vehicle 100 may be filtered based on the range of travel determined.

In the event that at least one safe location is determined to be in a range of travel for the vehicle 100, the method 1400 may proceed by autonomously driving (e.g., automatically, without human interaction, etc.) to the identified safe location (step 1436). The vehicle 100 may autonomously drive using one or more sensors and systems described in conjunction with FIGS. 3A-3C. Upon reaching the identified safe location, the method 1400 may proceed by evaluating the identified safe location as described in conjunction with step 1424. In some embodiments, this evaluation may include determining whether the identified safe location is safe and free of people, objects, obstructions, hazards, etc.

In the event that no safe locations are determined to be in a range of travel for the vehicle 100, the method 1400 may continue by autonomously driving to a location having a least amount of impact or damage (step 1440). This location may be referred to as an alternative, or non-optimal, location. In some embodiments, the alternative location may be a non-optimal location that is selected to mitigate an amount of damage or effect from the power system fault from harming people or animals, but may not be optimal to mitigating damage to one or more object, structure, or environment surrounding the vehicle 100. For example, a vehicle 100 may have suffered a severe thermal fault in the form of a battery fire consuming components of the vehicle at a rapid rate of speed. In this example, the fire may be producing noxious gasses that are harmful to people and/or other animals. Based at least partially on the severity of this fault, the vehicle 100 may not have the time to reach an optimal safe location. In this case, the vehicle 100 may determine to minimize the harm to people at the expense of harming one or more objects, structures, and/or environments. Continuing this example, the vehicle 100 may determine that a nearby pool, pond, lake, river, stream, ocean, or sea is capable of extinguishing the fire at the sacrifice of major (if not irreparable) damage to the vehicle 100. In this example, the vehicle 100 may self-destruct and mitigate human harm by autonomously driving into the water source, drowning the vehicle 100 and extinguishing the fire. The locations of various water sources, beaches, etc. may be stored in the memory (e.g., maps database 335, etc.) associated with the vehicle 100 or identified by one or more sensors (e.g., imaging sensors, etc.) associated with the vehicle 100 as the vehicle 100 moves in an environment.

In some embodiments, the vehicle 100 may provide a vehicle destruction warning indicating that the vehicle 100 is suffering a power system fault (steps 1438 and 1444). The vehicle destruction warning may include, but is in no way limited to, an audible alert (e.g., an alarm, siren, tone, etc.), a visual alert (e.g., graphics rendered to a display device, flashing lights, strobes, etc.), tactile alerts (e.g., vibrating seats, body panels, etc., of the vehicle 100), and/or combinations thereof. In some embodiments, the vehicle destruction warning may include information about the power system fault. For instance, the information may describe the type of power system fault (e.g., thermal event, electrical event, chemical event, etc.), the severity of the power system fault, a location of the power system fault, a time until destruction, and/or the like. In any event, the warnings may be provided to at least one area inside and/or outside of the interior space 150 of the vehicle 100.

The method 1400 may optionally proceed by sending a destruction message to at least one receiving party (step 1448). The destruction message may be sent across a wireless communication network to a receiving device of at least one receiving party (e.g., emergency entity, owner, occupant, mechanic, etc.). Similar, if not identical, to the destruction warning, the destruction message may include information about the power system fault. For instance, the information may describe the type of power system fault (e.g., thermal event, electrical event, chemical event, etc.), the severity of the power system fault, a location of the power system fault, a time until destruction, and/or the like. Additionally or alternatively, the destruction message may provide location information for the vehicle 100 in distress. This location information may be in the form of a beacon, radio communication, GPS coordinates, and/or other mapping information. In some embodiments, this location information may allow a responding entity (e.g., police, fire, ambulance, etc.) to reach the vehicle 100 and assist in mitigating or controlling the effect from the power system fault. The method 1400 may end at step 1452.

Figure 15:
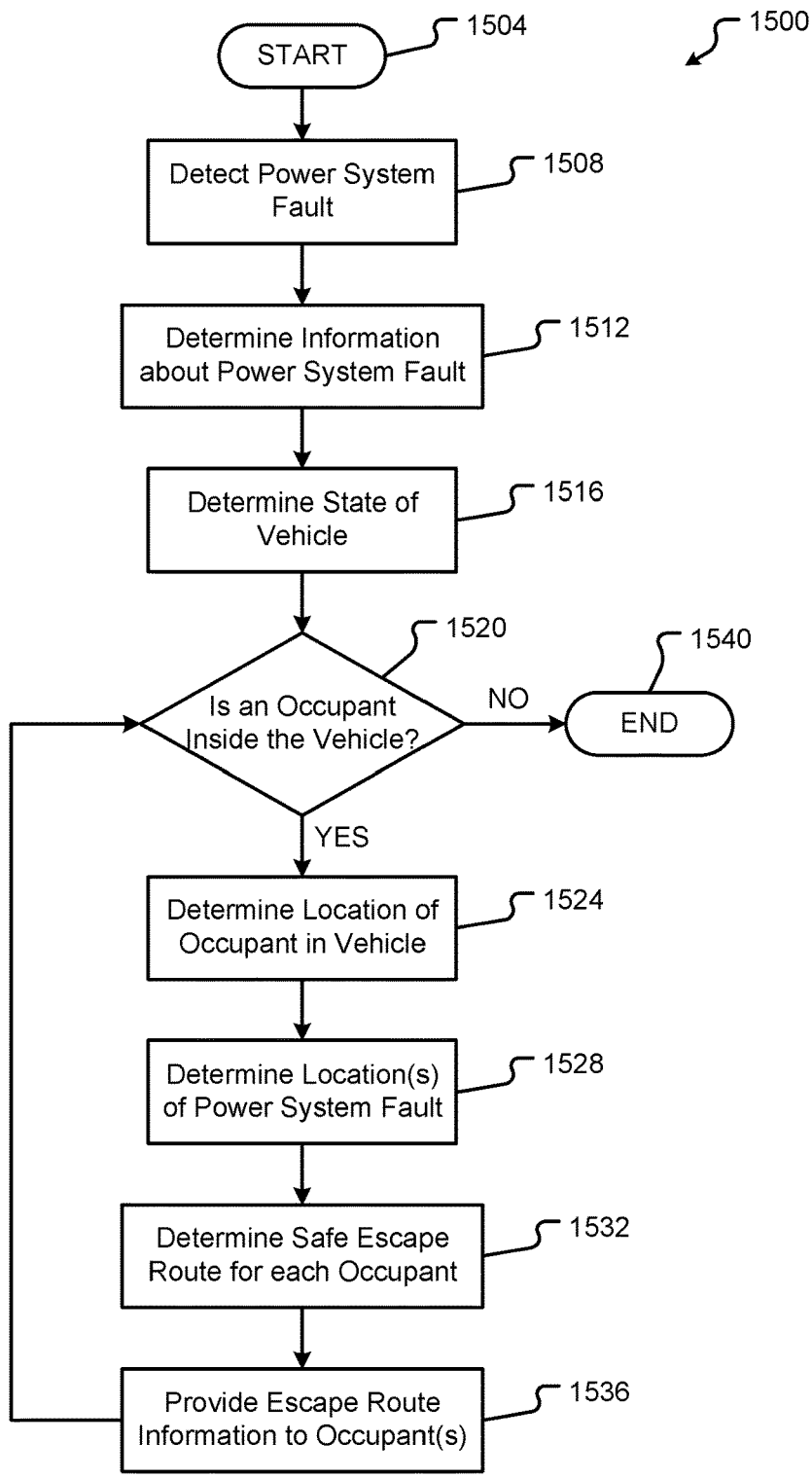
FIG. 15 is a flow diagram of a method for providing an escape route to an occupant within a vehicle in accordance with embodiments of the present disclosure.

FIG. 15 is a flow diagram of a method 1500 for providing an escape route to an occupant within a vehicle 100 in response to detecting a power system fault (e.g., a battery fault, a thermal fault, etc.). While a general order for the steps of the method 1500 is shown in FIG. 15, the method 1500 can include more or fewer steps or can arrange the order of the steps differently than those shown in FIG. 15. Generally, the method 1500 starts with a start operation 1504 and ends with an end operation 1540. The method 1500 can be executed as a set of computer-executable instructions executed by a computer system and encoded or stored on a computer readable medium. Hereinafter, the method 1500 shall be explained with reference to the systems, components, assemblies, devices, user interfaces, environments, software, etc. described in conjunction with FIGS. 1-14.

In some embodiments, the vehicle 100 may detect a power system fault while a user is inside the vehicle 100. In this scenario, the user may need to make a quick escape or exit from the vehicle 100 to be free from harm. It is an aspect of the present disclosure that the vehicle 100 may identify a location of the power system fault and indicate to a user the best exit route for the user (e.g., which door to exit from inside the vehicle 100, etc.). The best exit route may be the route providing the safest escape for, or lowest risk of harm to, the user when exiting from the vehicle 100. The vehicle 100 may utilize one or more sensors and systems to determine this best exit route. For example, the vehicle 100 may use LIDAR 320, RADAR 324, ultrasonic 328, cameras 332, IR 336, and/or other sensors to determine a safe area of exit to an environment around the vehicle 100. Additionally or alternatively, the vehicle may provide escape cues by automatically opening an escape door, window, hatch, etc., and/or by displaying the escape route to one or more display devices associated with users or occupants in the vehicle 100.

In one embodiment, the method 1500 may begin at step 1504 and proceed by detecting a power system fault (step 1508). Similar, if not identical, to the power system fault described in conjunction with FIG. 14, the power system fault may correspond to any fault associated with the power source 808, 808A-B, charge controller 824, motor 812, electrical interconnections 828, 832, 908, energy recovery system 836, charger 912, power receptacle 904, and/or any other component of the power distribution system of the vehicle 100 (e.g., as described in conjunction with FIGS. 8 and 9, etc.). In some embodiments, the power system fault may be an electrical disturbance, thermal event, charging error, electric arc, component or system fire, component or system smoking/smoldering, insulation failure, electrical short, etc., and/or combinations thereof. For the sake of example, the power system fault may be described as corresponding to a thermal event (e.g., fire, smoke, explosion, etc.) associated with the power source 808 or related component of the vehicle 100. It should be appreciated, however, that the embodiments described herein are not limited to thermal events associated with the power source 808 of the vehicle 100.

The power system fault may be detected in a similar, if not identical, manner as described in conjunction with step 1408 of FIG. 14.

The method 1500 may proceed by determining information associated with the power system fault (step 1512). This information may include a location of the fault detected, a severity of the fault detected, a type of fault for the fault detected, and/or other fault information. The location of the fault detected may correspond to a location of the fault inside the vehicle 100. In one embodiment, the location may be determined based on signals received from one or more fault detecting sensors. Each of the fault detecting sensors may be identified as being associated with a particular location or area of the power system, vehicle 100, and/or power source 808. In some embodiments, this sensor identification may be cross-referenced against a signal anomaly (i.e., a signal provided by one or more sensors indicating a fault) to identify one or more physical locations in or about the vehicle 100 that are associated with the power system fault.

The severity of the fault may be determined as described in conjunction with FIG. 14. The type of the fault included in the information may indicate whether the fault is a thermal fault (e.g., fire, smoke, explosion, etc.), an electrical fault (e.g., electric arcing, circuit short, circuit open, etc.), a chemical fault (e.g., battery leak, acid leak, gas leak, etc.), and/or some other fault capable of causing a harm to one or more occupants of the vehicle 100, the vehicle 100, and/or objects surrounding the vehicle 100.

In any event, the location, severity, and/or type of fault may be used by the vehicle control system 348 and/or the sensor processors 340 in determining an escape route for one or more occupants of the vehicle 100.

The method 1500 continues by determining a state of the vehicle 100 (step 1516). The state of the vehicle 100 may include, but is in no way limited to, whether the vehicle is stationary, parked, being charged, moving, driving at one or more autonomous levels, driving to a destination, driving at a particular speed, driving in traffic, etc. The state of the vehicle 100 may be determined based on signals received from one or more driving vehicle sensors 304, navigation information used by the navigation system 302, electrical interconnection sensor information, etc., and/or combinations thereof. In some embodiments, the method may determine that the vehicle 100 is in a connected charging state where the vehicle 100 is receiving power from a power supply, or charging, system (e.g., whether inductively or physically interconnected to the charging system). In one embodiment, the connected charging state may correspond to a state where the vehicle 100 is physically interconnected with a charging system (e.g., via a charging connector and receptacle coupling or interface, etc.). This connection may be determined from one or more charging sensors, charge controllers 824, proximity sensors, and/or some other switch or sensor associated with the charging receptacle of the vehicle 100 and/or the charging system. For instance, where the one or more switches and/or sensors provide a signal indicating the vehicle 100 is connected to a charging system. In some embodiments, the connection may be determined based on a flow of charge monitored by the charge controller 824 of the vehicle 100. This monitored flow of charge may indicate that the vehicle 100 is receiving charge from a connected charging system.

The method 1500 continues by determining whether an occupant is inside the vehicle 100 (step 1520). If no occupant is determined to be inside the vehicle 100, the method 1500 may end at step 1540. However, in some embodiments, one or more interior sensors 337 may be used to determine whether a person or animal is inside the vehicle 100 (e.g., in an interior space 150 of the vehicle 100). By way of example, one or more of the infrared sensors 309, motion sensors 311, weight sensors 313, biometric sensors 317, camera sensors 319, audio sensors 321, and/or other sensors in the vehicle 100 may determine that a living being (e.g., person, animal, etc.) is inside the vehicle 100.

Next, the method 1500 may proceed by determining a location of the one or more occupants in the vehicle 100 (step 1524). In some embodiments, one or more interior sensors 337 sensors may determine a position of the occupant within the vehicle (e.g., front left-hand seat, front right-hand seat, rear left-hand seat, rear right-hand seat, and/or other seating positions inside the vehicle). For instance, the infrared sensors 309, motion sensors 311, weight sensors 313, biometric sensors 317, camera sensors 319, audio sensors 321, and/or other sensors in the vehicle 100 may observe that a living being (e.g., person, animal, etc.) or animate object is inside the vehicle 100.

In some embodiments, the method 1500 may determine a physical location of the power system fault in relation to the physical location or position of an occupant determined to be inside the vehicle 100 (step 1528). This location may correspond to a location of the fault inside the vehicle 100. In one embodiment, the location may be determined based on signals received from one or more fault detecting sensors. In some embodiments, the location of the fault may be based on the information about the power system fault determined in step 1512. For instance, the physical location of the fault may correspond to the location of the fault in or about the vehicle 100.

Next, the method 1500 may determine a safe escape route for each occupant detected inside the vehicle 100 (step 1532). The safe escape route may be the same or different for two or more occupants inside the vehicle 100. In some embodiments, the safe escape route may be based at least partially on the location of the occupant and the location of the fault determined. Additionally or alternatively, the safe escape route may be based at least partially on an environment outside of the vehicle 100. In some cases, the best escape route may provide an escape route for an occupant or user that has the lowest risk of harm, dismemberment, or death. By way of example, a vehicle 100 may be traveling in a high-traffic environment where vehicular traffic is constant along at least one side of the vehicle 100. In this example, the vehicle 100 may determine that escape from the vehicle 100 along that side of the vehicle 100 poses too great a risk for an occupant. Continuing this example, the vehicle 100 may provide an escape route to the occupant that is on an opposite or different side of the vehicle 100. In some cases, the escape route may determine that it is less risky to direct a user or occupant to escape from the vehicle 100 at an area that is adjacent to, or includes, the location of the fault detected than direct the user to exit the vehicle 100 into a dangerous (e.g., high-traffic, obstructed, hazardous, etc.) environment outside of the vehicle 100.

The method 1500 may proceed by providing escape route information to the one or more occupants of the vehicle 100 (step 1536). The escape route information may be provided by rendering a graphical image or information about the escape route to at least one display device associated with the vehicle 100. In this example, the rendered images may include a direction or arrow the user can follow, information about the fault, and/or instructions to follow to safely exit the vehicle 100. In some embodiments, the vehicle 100 may provide other cues by, for example, opening a door, window, or hatch of the vehicle 100 from which the occupant can safely exit the vehicle. In some cases, the escape route may be provided via a number of output devices including vehicle devices (e.g., display devices, speakers, lights, etc.) and/or other connected devices (e.g., smart phones, tablets, etc.) associated with the vehicle 100 or occupant inside the vehicle 100. The method 1500 may continue until all occupants have escaped the vehicle 100. Once no occupants are determined to be inside the vehicle 100, the method 1500 may end at step 1540.

Figure 16:
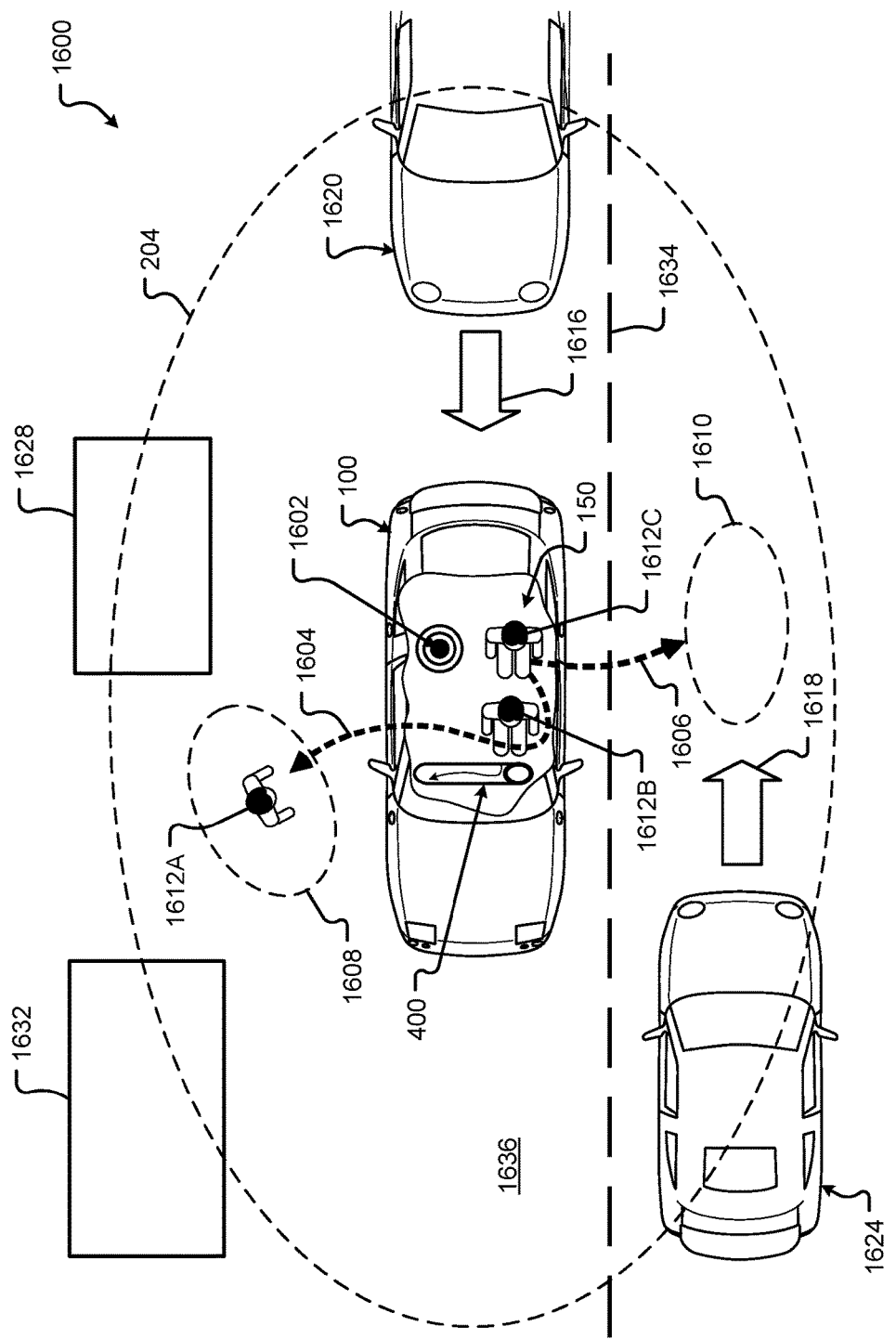
FIG. 16 illustrates an example of an escape route environment for an occupant of a vehicle in accordance with embodiments of the present disclosure.

FIG. 16 illustrates an example of an escape route environment 1600 for an occupant 1612A-C of a vehicle 100 in accordance with embodiments of the present disclosure. As shown in FIG. 16, the vehicle 100 is traveling on a road 1636 divided by a road marking 1634 (e.g., divider, lane identifier, painted line, etc.). The vehicle 100 is shown traveling in a first direction 1616 along with a following vehicle 1620 disposed at the rear of the vehicle 100. The other side of the road 1636 and road marking 1634 shows an approaching vehicle 1624 that is traveling in a second direction 1618 (e.g., opposite the first direction 1616) and generally toward the vehicle 100. A broken-out schematic view of the interior 150 of the vehicle 100 is shown revealing at least one dash display, or instrument panel, 400 and two occupants 1612B, 1612C in different seating positions inside the vehicle 100. In addition, the broken-out view shows an identified fault location 1602 for an example power system fault.

As described above, the vehicle 100, upon detecting a power system fault, may determine the location of the fault 1602 relative to one or more areas, references, and/or datum of the vehicle 100. In one embodiment, the location of the fault 1602 may be determined relative to one or more occupants 1612A-C of the vehicle 100. In the example fault shown in FIG. 16, the power system fault is determined to be in a fault location 1602 corresponding to a rear right-hand seat of the vehicle 100. In some embodiments, the vehicle 100 may determine a location for one or more occupants inside the vehicle 100 using one or more interior sensors 337. For instance, a first occupant 1612A may have been determined to be in a first location in the front right-hand side of the vehicle 100, a second occupant 1612B may be determined to be in a second location in the front left-hand side of the vehicle 100, and a third occupant 1612C may be determined to be in a third location in the rear left-hand side of the vehicle 100.

Based at least partially on the location of the fault and/or the occupants 1612A-C, the vehicle 100 (e.g., the processors and/or systems associated with the vehicle 100, etc.) may determine an appropriate escape route for the occupants 1612A-C. The escape route may include directing one or more of the occupants 1612A-C to identified safe zones 1608 outside of the vehicle 100. In some embodiments, the vehicle 100 may determine the state of an environment surrounding the vehicle 100 prior to recommending or providing the escape route. For instance, the vehicle 100 may use one or more sensors to detect objects, vehicles, structures, obstructions, and/or hazards in a view zone 208 surrounding at least a portion of the vehicle 100. The view zone 208 may correspond to an effective detection zone for the sensors of the vehicle 100. The sensors may include one or more of the driving vehicle sensors 304, 116A-K, 112 described in conjunction with FIGS. 1-3A.

In FIG. 16, the vehicle 100 detects a first and second unmoving objects 1628, 1632 (e.g., buildings, structures, etc., and/or other objects) on a right-hand side of the vehicle 100. In addition, the vehicle 100 detects a following vehicle 1620 behind the vehicle 100 and an approaching vehicle 1624 on a different side of the road 1636 than the vehicle 100. It is an aspect of the present disclosure that the vehicle 100 may determine the speed, direction, behavior, and/or movement characteristics associated with one or more objects inside the detection view zone 208. At times, a possible escape route 1606 to a zone 1610 outside of the vehicle 100 may be determined to be unsafe or pose a risk of harm to an occupant 1612A-C. For instance, the vehicle 100 may determine that instructing the occupants 1612A-C to exit on the left-hand side of the vehicle 100 may place the occupants in a path of travel associated with the approaching vehicle 1624. Accordingly, the vehicle 100 may interpret this possible escape route 1606 and/or zone 1610 as being unsafe.

In some embodiments, when a particular exit point from a vehicle 100 is determined to be unsafe or pose a threat or risk of death and/or dismemberment to an occupant 1612A-C, the vehicle 100 may take action and prevent the occupant from exiting the vehicle from the unsafe exit point. In some cases, upon determining an exit point is unsafe, the vehicle 100 may automatically lock the door associated with the unsafe exit point from the inside via an automatic locking mechanism. This locking mechanism may be similar, if not identical, to an automatically locking child safety door. In this case, the user may not voluntarily exit the vehicle into a greater danger but the locking mechanism may allow opening from the outside by a rescuer, other person, authority, etc. In some embodiments, as the conditions around the vehicle 100 change, the locking mechanism and/or escape route may change dynamically. For example, the vehicle 100 may detect the approaching vehicle 1624 slowing to a stop. In this example, the vehicle 100 may change an escape route rendered to one or more displays of the vehicle 100, unlock previously locked doors or exit points, automatically open doors, windows, or escape hatches, etc., and/or inform one or more occupants of an optimal or best escape route given the current state of the fault and the environment outside of the vehicle 100.

The risk of harm to an occupant 1612A-C due to the power system fault may be continually evaluated and reevaluated as conditions change or time passes. The risk evaluation may include determining a percentage of probable harm and/or a severity of the harm that an occupant may suffer if escaping the vehicle 100 at one or more exit points of the vehicle 100. For instance, the vehicle 100 may determine that the exit point on the left-hand side of the vehicle 100 would pose a risk of probable harm above an acceptable level or value due to the motion characteristics of the approaching vehicle 1624. In this instance, the vehicle 100 would recommend a different escape route to the occupant 1612C. In some cases, the vehicle 100 may determine that a previously unsafe exit point determined at a first time has become a safe exit point at a second later time. For example, the percentage of probable harm associated with an exit point may decrease from a high-risk value (e.g., defined as likely to cause harm to an occupant 1612A-C upon exiting the vehicle 100) to a low-risk value (e.g., defined as unlikely to cause harm, or major harm, to an occupant 1612A-C upon exiting the vehicle 100).

Referring to FIG. 16, an escape route 1604 to a safe zone 1608 outside of the vehicle 100 may be provided to the occupants of the vehicle 100. In some embodiments, the escape route 1604 may be rendered to at least one display 400 associated with the vehicle 100. The first occupant 1612A is shown outside of the vehicle 100 in the safe zone 1608 identified by the vehicle 100. In this example, the second and third occupants 1612B, 1612C may be instructed to follow the same or different escape route as the first occupant. Here, the occupants 1612B, 1612C are instructed to escape the vehicle 100 using the route 1604 taken by the first occupant 1612A avoiding the fault location 1602 and dangers or hazards detected around the vehicle 100.

Figure 17A:
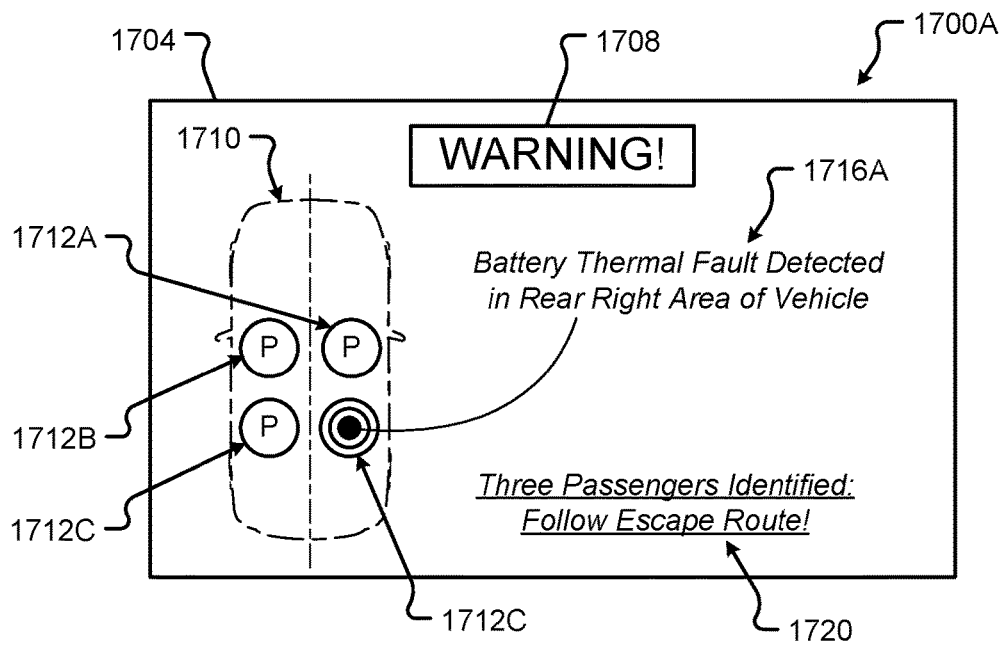
FIG. 17A shows a first state of a graphical user interface used in presenting an escape route to an occupant of a vehicle in accordance with embodiments of the present disclosure.
Figure 17B:
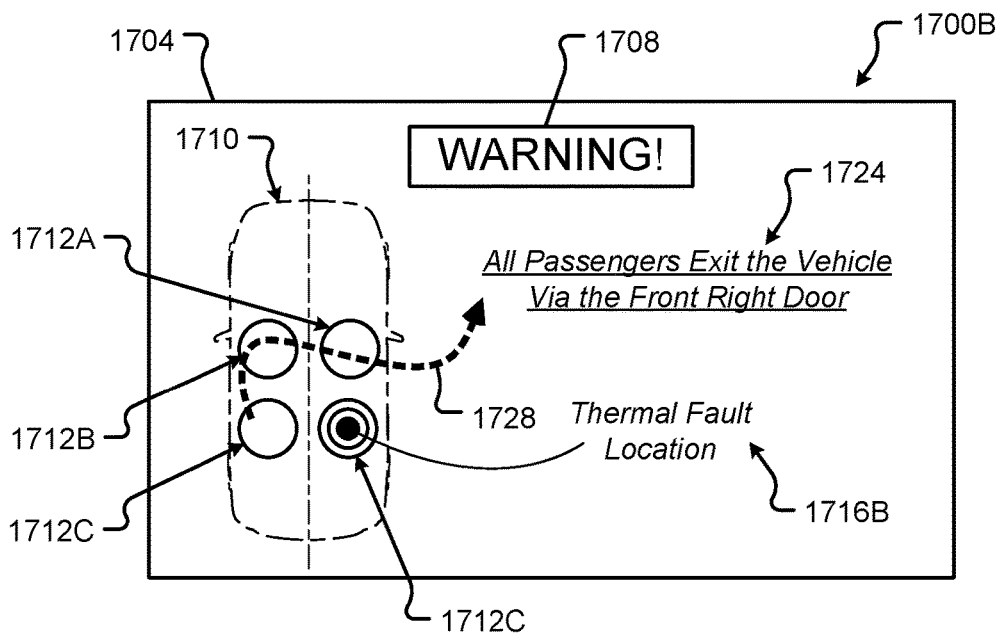
FIG. 17B shows a second state of the graphical user interface of FIG. 17A.

FIGS. 17A and 17B show embodiments of a graphical user interface used in presenting an escape route from the vehicle 100 to at least one occupant inside the vehicle 100. The graphical user interface 1704 may comprise a display or display device associated with the vehicle 100. The graphical user interface 1704 may be configured to render one or more images, characters, text, etc. to at least a portion of the display. The display may be the operational display 420 or other displays 424, 428, 434 described in conjunction with FIG. 4 above. In some embodiments, the display and graphical user interface 1704 may be associated with a smart phone. In any event, the graphical user interface 1704 may include a warning indication 1708 configured to alert a user of a power system fault. The warning indication 1708 may be rendered to the display upon detection of the power system fault. In some cases, the warning indication 1708 may include graphic alert features including, but in no way limited to, scrolling, scaling, flashing, colored, etc., and/or other presentation effect for the text and/or graphics.

The graphical user interface 1704 may include a schematic representation 1710 of the vehicle 100 rendered to a portion of the display. The schematic representation 1710 may be configured as a virtual image of the vehicle 100 and identify a location of the power system fault detected with a target or fault marker 1712C. In some embodiments, the location of the power system fault may be shown relative to a position of one or more occupants inside the vehicle 100. The location of each detected occupant may be shown on the graphical user interface 1704 with schematic occupant identifiers 1712A-C. The graphical user interface 1704 may provide, or render, an escape route 1728 to the display illustrating the route for one or more occupants inside the vehicle 100 to follow to safely escape danger from the power system fault. In some embodiments, the escape route 1728 presented to the display may be different between occupants. For instance, a first occupant may be directed to follow an escape route directing the first occupant out of a right-hand side of the vehicle 100, while a second occupant may be directed to follow an escape route directing the second occupant out of a left-hand side of the vehicle 100. These different routes may be simultaneously rendered to the same display or rendered to different displays associated with different positions in the vehicle 100.

FIG. 17A shows a first state 1700A of a graphical user interface 1704 used in presenting an escape route to an occupant of a vehicle 100 in accordance with embodiments of the present disclosure. The first state 1700A shows the schematic representation 1710 of the vehicle 100 and identifies a location of the power system fault. In the first state 1700A, the graphical user interface 1704 includes a first information message 1716A describing information associated with the fault, for example, describing that the fault is a battery thermal fault detected at a rear right-hand portion of the vehicle 100. Depending on the severity of the detected power system fault, the graphical user interface 1704 may include a second information message 1720. The second information message 1720 may be configured to inform the occupants of the vehicle 100 of any danger associated with the detected power system fault and/or provide instructions regarding the fault. In the first state 1700A, the second information message 1720 is instructing the occupants to follow the escape route to safely exit the vehicle 100.

As the instructions are provided, the first information message 1716A may move to a secondary position on the display and can even change to a third information message 1716B. In some cases, the third information message may be a modification to the first information message 1716A. As shown in FIG. 17B, in the second state 1700B the graphical user interface 1704 shows an abbreviated information message 1716B describing the identified location and type of the fault detected. FIG. 17B shows an escape route 1728 rendered to the display 1704 and illustrating an exit path, direction, and exit point for one or more occupants to follow. In some embodiments, the escape route 1728 may be connected to one or more occupant identifiers 1712A-C illustrating that the connected occupant should follow the escape route 1728. In one embodiment, a fourth information message 1724 may be caused to render to the display of the graphical user interface 1704. The fourth information message 1724 may include information about the escape route 1728. This information may be specific to a particular occupant or to all of the occupants inside the vehicle 100.

Figure 18:
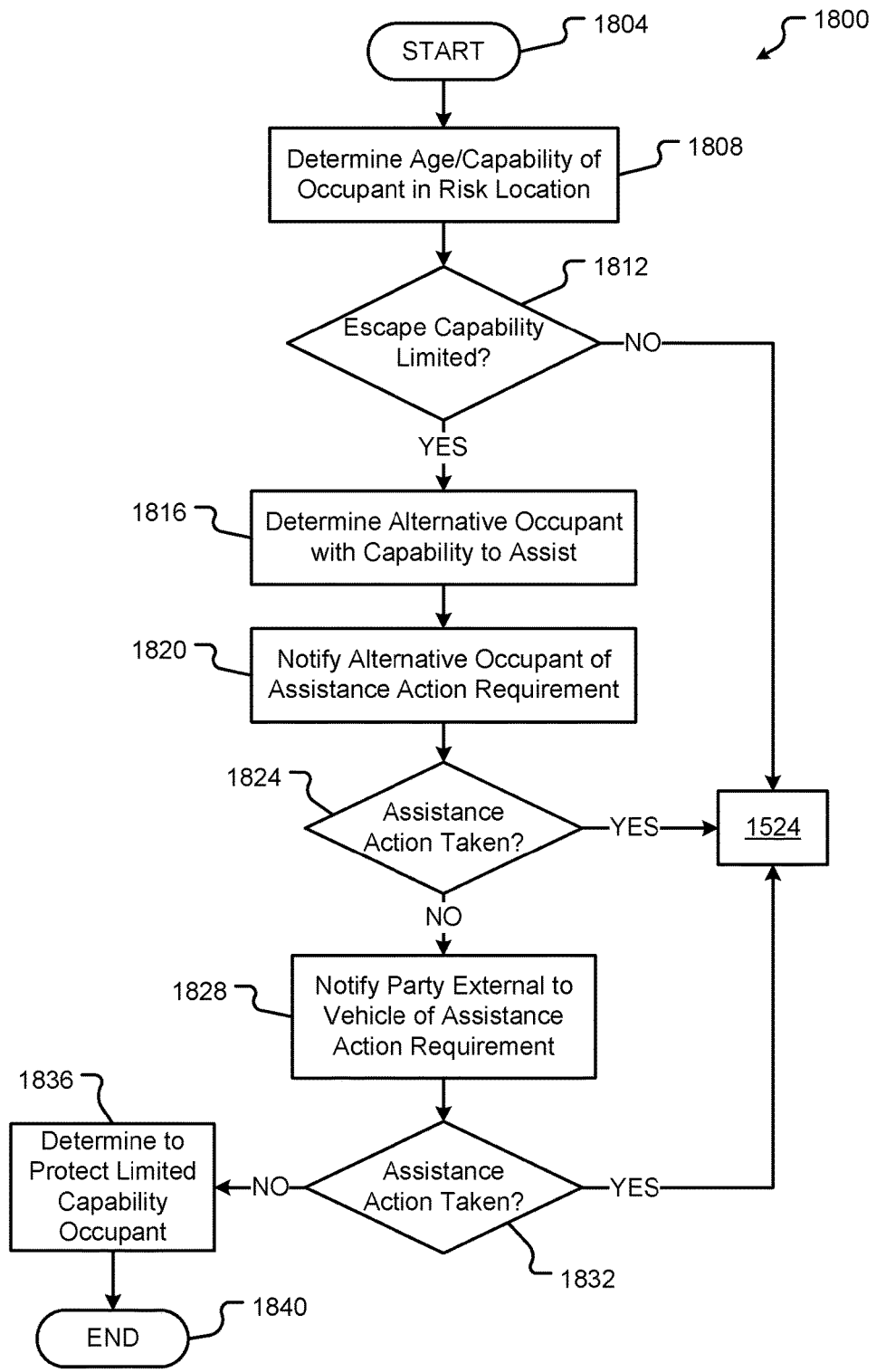
FIG. 18 is a flow diagram of a method for assisting limited capability individuals in a vehicle in accordance with embodiments of the present disclosure.

Referring now to FIG. 18, a flow diagram of a method 1800 for assisting limited capability individuals in a vehicle 100 is shown in accordance with embodiments of the present disclosure. While a general order for the steps of the method 1800 is shown in FIG. 18, the method 1800 can include more or fewer steps or can arrange the order of the steps differently than those shown in FIG. 18. Generally, the method 1800 starts with a start operation 1804 and ends with an end operation 1840. The method 1800 can be executed as a set of computer-executable instructions executed by a computer system and encoded or stored on a computer readable medium. Hereinafter, the method 1800 shall be explained with reference to the systems, components, assemblies, devices, user interfaces, environments, software, etc. described in conjunction with FIGS. 1-17.

The method 1800 begins at step 1804 and proceeds by determining an age and/or capability of one or more occupants in a risk location (step 1808). In some embodiments, this step may be a part of the determination step 1520 described in conjunction with FIG. 15. The age and/or capability of an occupant may be determined by an identification of each occupant using one or more interior sensors 337 associated with the vehicle 100. For example, the one or more interior sensors 337 may determine that an occupant is in a child seat, booster seat, etc. This determination may indicate that the occupant is incapable of exiting the vehicle 100 alone. In some embodiments, the interior sensors 337 (e.g., infrared sensors 309, motion sensors 311, weight sensors 313, biometric sensors 317, camera sensors 319, audio sensors 321, etc.) may identify that the occupant has a particular handicap, injury, or other incapability that could adversely affect the occupant's ability to safely exit the vehicle 100. By way of example, the camera sensors 319 inside the vehicle 100 may observe that an occupant is wearing an orthopedic cast, body cast, bandage, or some other accessory indicative of a limited capability for the occupant. In this example, the observation may indicate that the occupant is incapable of exiting the vehicle 100 alone.

Next, the method 1800 continues by determining whether the determined age and capability of the occupant could limit, impair, or prevent the occupant from exiting the vehicle 100 (step 1812). The capability of an occupant may be defined by rules stored in a memory of the vehicle 100. These rules may determine a limited escape capability when the occupant is determined to be a child, baby, elderly person, injured person, handicapped person, etc. If the escape capability of the occupant is not limited in any way, the method 1800 may continue by proceeding to step 1524 of FIG. 15.

In the event that the occupant is determined to have a limited escape capability, the method 1800 may proceed by determining an alternative occupant inside the vehicle 100 who is capable, or available, to assist the limited capability occupant (step 1816). In some embodiments, these individuals or alternative occupants may be those who were identified in step 1812 as having no limited capability.

The method 1800 may continue by notifying the alternative occupant of a required assistance action (step 1820). The notification may include instructions rendered to a graphical user interface or display associated with the vehicle 100. In some cases the instructions may be output via at least one speaker associated with the vehicle 100. The assistance action may include moving, rescuing, or assisting the limited capability occupant in escaping from the vehicle 100.

The vehicle 100 may determine whether any assistance action has been taken (step 1832). In the event that the assistance action is taken, such that the limited capability occupant is being assisted in escaping from the vehicle 100, the method 1800 may continue by proceeding to step 1524 of FIG. 15. However, if no assistance action is taken by any alternative occupant in the vehicle 100, the vehicle 100 may notify one or more parties external to the vehicle 100 of the assistance action requirement (step 1828). This notification may include instructions directing at least one person to assist the limited capability occupant. The notification may be provided to one or more people in proximity to the vehicle 100. The notification may be provided via an external speaker, alarm, and/or display associated with the vehicle 100. In one embodiment, the notification may be rendered to a display of a smart phone associated with a person in proximity to the vehicle 100. In some embodiments, the notification may be broadcast or sent to specific people in proximity to the vehicle 100 (e.g., sent across a wireless network to a receiving device or smart phone, etc.). Additionally or alternatively, the notification may be sent to people in vehicles close to the vehicle 100 having the limited capability occupant.

The vehicle 100 may again determine whether any assistance action has been taken (step 1832). In some cases, this determination may be based on a timing associated with the assistance. For instance, the assistance action may be required to be taken within a predetermined time period. In the event that the assistance action is taken within the time period, such that the limited capability occupant is being assisted in escaping from the vehicle 100, the method 1800 may continue by proceeding to step 1524 of FIG. 15. However, if no assistance action is provided within the time period, the vehicle 100 may determine to protect the limited capability occupant (step 1836). In some cases, protecting the limited capability occupant may include ejecting the limited capability occupant safely from the vehicle 100, activating airbags adjacent to the limited capability occupant, or activating a fire suppressant inside the vehicle 100. In some embodiments, when the power system fault is associated with a component or system of the vehicle 100 that can be separated from the vehicle 100, the vehicle 100 may proceed to automatically separate the component or system. For example, in the event the fault is associated with one of two power sources 808A, 808B associated with the vehicle 100, the vehicle 100 may disconnect the faulty power source 808A or 808B, separate the faulty power source 808A or 808B from the vehicle 100, and autonomously drive away from the fault and take the limited capability occupant to a safe location. The method 1800 may end at step 1840.

Figure 19:
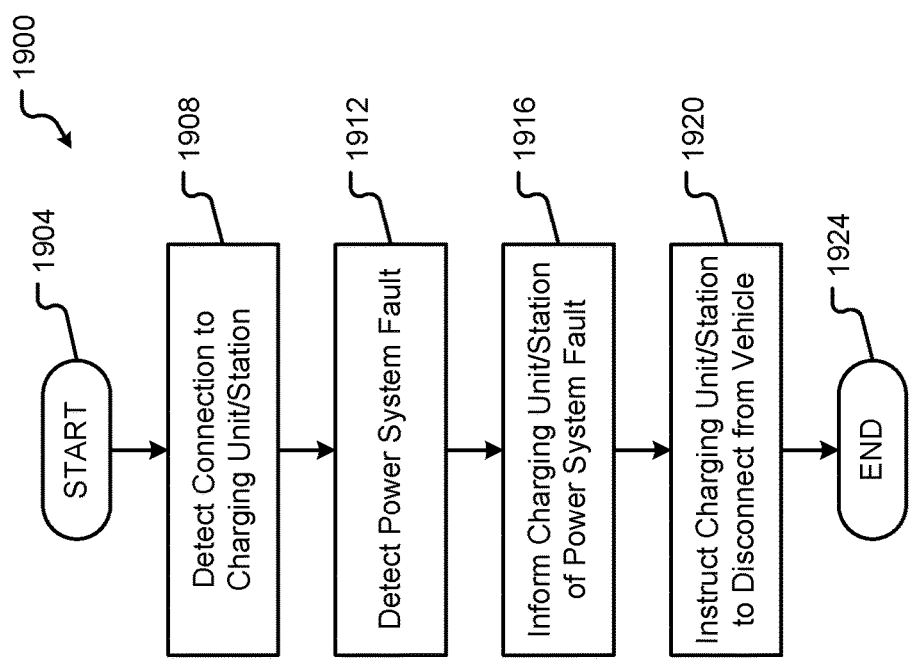
FIG. 19 is a flow diagram of a first method for disconnecting a charging connector from a vehicle in accordance with embodiments of the present disclosure.

FIG. 19 is a flow diagram of a method 1900 for disconnecting a charging connector from a vehicle 100 in accordance with embodiments of the present disclosure. While a general order for the steps of the method 1900 is shown in FIG. 19, the method 1900 can include more or fewer steps or can arrange the order of the steps differently than those shown in FIG. 19. Generally, the method 1900 starts with a start operation 1904 and ends with an end operation 1940. The method 1900 can be executed as a set of computer-executable instructions executed by a computer system and encoded or stored on a computer readable medium. Hereinafter, the method 1900 shall be explained with reference to the systems, components, assemblies, devices, user interfaces, environments, software, etc. described in conjunction with FIGS. 1-18.

The method 1900 begins at step 1904 and proceeds by detecting a connection to a charging unit or station (step 1908). In particular, the method 1900 is directed to physically disconnecting a charging connector from a vehicle 100 via a disconnection device associated with the charging connector. In some embodiments, a charging connection may be detected via one or more proximity sensors or switches detecting a position of connection between the charging connector and a charging receptacle of a vehicle 100. The detection may be made by the vehicle 100 and/or the charging unit/station.

Next, the method 1900 continues by detecting a power system fault (step 1912). In some embodiments, detecting the power system fault may be similar, if not identical, to the detection of the power system fault described at steps 1408 and 1412 in conjunction with FIG. 14. Additionally or alternatively, detecting the power system fault may be similar, if not identical, to the detection of the power system fault described at steps 1508 in conjunction with FIG. 15.

The method 1900 may proceed by informing the charging unit/station of the detected power system fault (step 1916). This information may be communicated from the communications subsystem 350 of the vehicle 100 to a receiving communications system associated with the charging unit/station. In some embodiments, the information may be communicated in the form of a message sent via a wired communications connection between the charging connector and the charging receptacle. In one embodiment, the information message may be sent to the charging unit/station across a wireless communication network. In some embodiments, the message may include information about the fault as described above.

The method 1900 may proceed by instructing the charging unit/station to disconnect the charging connector from the vehicle 100 (step 1920). In some embodiments, the charging unit/station may respond to this instruction by sending a disconnect signal to at least one ejection or disconnection component and/or mechanism associated with the charging connector and/or charging handle. Embodiments of the charging connection, ejection components, and or other ejection mechanisms are described in greater detail in conjunction with FIGS. 21A-25B.

Figure 20:
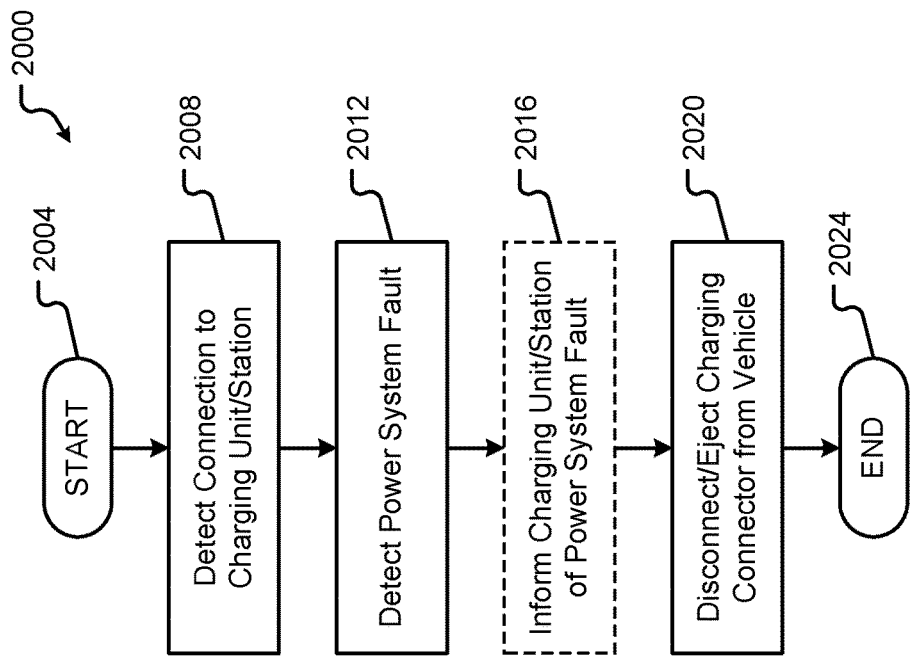
FIG. 20 is a flow diagram of a second method for disconnecting a charging connector from a vehicle in accordance with embodiments of the present disclosure.

FIG. 20 is a flow diagram of a method 2000 for disconnecting a charging connector from a vehicle 100 in accordance with embodiments of the present disclosure. While a general order for the steps of the method 2000 is shown in FIG. 20, the method 2000 can include more or fewer steps or can arrange the order of the steps differently than those shown in FIG. 20. Generally, the method 2000 starts with a start operation 2004 and ends with an end operation 2040. The method 2000 can be executed as a set of computer-executable instructions executed by a computer system and encoded or stored on a computer readable medium. Hereinafter, the method 2000 shall be explained with reference to the systems, components, assemblies, devices, user interfaces, environments, software, etc. described in conjunction with FIGS. 1-19.

The method 2000 begins at step 2004 and proceeds by detecting a connection to a charging unit or station (step 2008). In particular, the method 2000 is directed to physically disconnecting a charging connector from a vehicle 100 via a disconnection device associated with the charging receptacle and/or vehicle 100. In some embodiments, a charging connection may be detected via one or more proximity sensors or switches detecting a position of connection between the charging connector and a charging receptacle of a vehicle 100. The detection may be made by the vehicle 100 and/or the charging unit/station.

Next, the method 2000 continues by detecting a power system fault (step 2012). In some embodiments, detecting the power system fault may be similar, if not identical, to the detection of the power system fault described at steps 1408 and 1412 in conjunction with FIG. 14. Additionally or alternatively, detecting the power system fault may be similar, if not identical, to the detection of the power system fault described at steps 1508 in conjunction with FIG. 15.

The method 2000 may optionally proceed by informing the charging unit/station of the detected power system fault (step 2016). This information may be communicated from the communications subsystem 350 of the vehicle 100 to a receiving communications system associated with the charging unit/station. In some embodiments, the information may be communicated in the form of a message sent via a wired communications connection between the charging connector and the charging receptacle. In one embodiment, the information message may be sent to the charging unit/station across a wireless communication network. In some embodiments, the message may include information about the fault as described above.

The method 2000 may proceed by instructing a charging connector rejection device to physically disconnect, eject, and/or separate the charging connector from the charging receptacle of the vehicle 100 (step 2020). In some embodiments, the charging connector rejection device may include one or more mechanisms, devices, and/or systems configured to automatically disconnect the charging connector from the charging receptacle. Embodiments of the charging connection, ejection components, and or other ejection mechanisms are described in greater detail in conjunction with FIGS. 21A-25B.

FIG. 21A shows a side view of an embodiment of an electric vehicle charging system 2100 in accordance with embodiments of the present disclosure. In some embodiments, the charging system 2100 may comprise a power supply 2104, a charging handle 2112 having a charging plug or connector 2120 (e.g., disposed at an end of the charging handle 2112), and at least one electrically conductive line 2108 electrically coupling the charging connector 2120 to the power supply 2104. In some embodiments, the charging handle 2112 may include a latch 2116 or other device that is configured to selectively interconnect with a retaining feature of a charging receptacle. In one embodiment, the latch 2116 may be manually actuated via a latch release button 2112 disposed on a side of the charging handle 2112.

The power supply 2104 may be a charging station that is configured to provide charging power to a power storage system and/or power source 808 of the vehicle 100. The power supply 2104 may be configured to provide wired charging power via the charging handle 2112 and electrically conductive line 2108. The power supply 2104 may be any kind of grid-connected charging station. The charging system 2100 can include connectors, wired interconnections, controllers, etc. In some embodiments, the charging system 2100 can provide power to the power generation unit 1004 of the vehicle 100 from external power sources. Depending on the configuration, the power supply 2104 may be configured to provide power at one or more charging levels.

The charging handle 2112 may be configured as a single or multi-piece housing at least partially surrounding a portion of the electrical connections of the charging connector 2120. The housing may incorporate one or more ergonomic features for handling by a user.

The charging connector 2120 may include at least one electrical connector configured to provide power to a vehicle power source 808 when interconnected at a charging receptacle of the vehicle 100. Examples of the charging connectors 2120 as described herein may include, but are not limited to, at least one of the SAE J1772 connector, SAE J1772 combined charging system (CCS) connector, IEC 62196 type 2 connector, IEC 62196-3 CCS combo 2 connector, CHAdeMO connector, proprietary connectors, etc., and/or combinations thereof.

Referring now to FIG. 21B, an end view of an embodiment of the charging handle 2112 of the electric vehicle charging system 2100 is shown. The charging handle 2112 may include a charging connector 2120 having a number of electrical ports 2132A, 2132B, 2136, 2140, 2144, a connector shroud or housing 2124, an alignment or key feature 2128, and a latch 2116, etc. In some embodiments, the connector housing 2124 may be configured to protect the electrical ports 2132A, 2132B, 2136, 2140, 2144 from damage during use, connection, disconnection, and/or when the charging handle 2112 is stored. The key feature 2128 may serve as an alignment feature to aid in physically connecting the charging connector 2120 with a charging receptacle of a vehicle 100. For example, the key feature 2128 may mate with a keyway feature associated with the charging receptacle of the vehicle 100 ensuring a proper orientation of the electrical ports to mating electrical connections associated with the vehicle 100.

In one embodiment, the first port 2132A may correspond to a first line connection to an electrical power supply, the second port 2132B may correspond to a second line connection to the electrical power supply, and the third port 2132C may correspond to a ground connection. In some embodiments, the first and second ports 2132A, 2132B may provide AC or DC power. In one embodiment, one of the first and second ports 2132A, 2132B may be a line connection while the other of the first and second ports 2132A, 2132B may be a neutral connection.

In some embodiments, the charging connector 2120 may include a communications port 2136 and/or a connection detection port 2140. The communications port 2136 may be used to exchange information between the charging system 2100 and a connected vehicle 100. The information may include charging specifics associated with the vehicle 100 and/or power source 808, details of the charge transfer, vehicle identification, detected system faults, and/or other data. The connection detection port 2140 may include one or more devices, sensors, and/or systems that are configured to detect when the charging connector 2120 is physically interconnected with a charging receptacle of a vehicle 100. In one embodiment, the connection detection port 2140 may include a mechanical proximity switch that is activated when the charging connector 2120 is physically interconnected with a charging receptacle of a vehicle 100.

FIG. 22 is a section view of a charging receptacle 2200 in accordance with embodiments of the present disclosure. The charging receptacle 2200 may include a number of features that mate with corresponding features of the charging connector 2120. Examples of the charging receptacle 2200 as described herein may include, but are not limited to, at least one of the SAE J1772 receptacle, SAE J1772 combined charging system (CCS) receptacle, IEC 62196 type 2 receptacle, IEC 62196-3 CCS combo 2 receptacle, CHAdeMO receptacle, proprietary receptacles, etc., and/or combinations thereof.

The charging receptacle 2200 may include a receptacle housing 2204, for example, a substantially cylindrical housing, disposed around at least one electrical connector 2224. The receptacle housing 2204 may include a keyway 2212 or other feature configured to mate with a key feature 2128 of a charging connector 2120. In some embodiments, the charging receptacle 2200 may include a receptacle core 2208 including one or more electrical connectors 2224. Each of the one or more connectors 2224 may be recessed in a counterbored hole, recess 2220, indent, or other shrouded area disposed at least partially in the receptacle housing 2204. The one or more connectors 2224 may mate with a corresponding port of a mating charging connector. At least one of the one or more connectors 2224 may be connected to the vehicle power source 808 via at least one wire, cable, or other electrical interconnection 2228. In some embodiments, the receptacle core 2208 and/or the receptacle housing 2204 may be made from an electrically insulative material (e.g., an insulator, or other non-conductive material, etc.).

In some embodiments, the receptacle housing 2204 may include a latch interface including a latch ramp 2232, a latch retaining area 2236, and in some cases a latch release mechanism 2240. When aligned with the charging receptacle 2200, the latch 2116 of the charging handle 2112 may engage with the latch ramp 2232 and pivot against a spring force included in the charging handle 2112 until the latch positively engages with the latch retaining area 2236.

In one embodiment, the charging receptacle 2200 may include a spring-loaded annulus 2244 disposed between the receptacle housing 2204 and the receptacle core 2208. The spring-loaded annulus may be configured as a ring-shaped member surrounding the receptacle core 2208 and configured to move or linearly displace along a central axis of the core 2208. In some embodiments, as a charging connector 2120 is engaged with the charging receptacle 2200, the connector housing 2124 may contact the spring-loaded annulus 2244 and displace the spring-loaded annulus (e.g., against a spring force pushing in a direction against the engagement direction of the charging handle 2112) etc. In one embodiment, when the charging connector 2120 is fully engaged with a charging receptacle 2200, the charging handle 2112 may be retained by the latch 2116 until the latch 2116 is released. In this embodiment, when the latch 2116 is released, the charging handle 2112 may be physically forced apart from the charging receptacle 2200 via a spring force pushing the spring-loaded annulus 2244 against the connector housing 2124 of the charging handle 2112 in a disengaging direction (e.g., a direction opposite to the engagement direction, etc.).

FIGS. 23A-C show section views of charging connector 2120 of a charging system 2100 engaging with a charging receptacle 2200 of a vehicle 100. The section views may be taken through a center of the charging connector 2120 and the charging receptacle 2200. For the sake of clarity, only one electrical port 2132 of the charging connector 2120 and only one electrical connector 2224 of the charging receptacle 2200 is shown in FIGS. 23A-C. The electrical port of the charging connector 2120 may correspond to any one or more of the electrical ports 2132A-C described in conjunction with FIGS. 21A and 21B. As described above, the electrical port 2132 of the charging connector 2120 may be electrical interconnected to a line of the power supply 2104 via at least one conductive line 2130 (e.g., wire, cable, etc.).

Referring to FIG. 23A, a section view of the charging connector 2120 in an alignment state 2300A is shown where charging connector 2120 is oriented into a pre-engagement position apart from the charging receptacle 2200. In FIG. 23A, the key feature 2128 of the connector housing 2124 is aligned with the keyway 2212 of the receptacle housing 2204. From this aligned position, the charging connector 2120 may be moved in an engagement direction 2304 toward the charging receptacle 2200.

Next, and as shown in the first engagement state 2300B of FIG. 23B, as the charging connector 2120 is moved in the engagement direction 2304 closer to the charging receptacle 2200, the connector housing 2124 may contact the spring-loaded annulus 2244, forcing the annulus 2244 to displace (e.g., axially, downward, etc.) against a spring force. Additionally or alternatively, as the charging connector 2120 is moved toward the charging receptacle 2200, the connector housing 2124 surrounds a portion of the receptacle core 2208 while the key feature 2128 rides along the keyway 2212. Among other things, this combination of features ensures the electrical port 2132 of the charging connector 2120 is aligned with the mating electrical connector 2224 of the charging receptacle 2200. As the as the charging connector 2120 moves closer to a fully engaged position, the latch 2116 may be pivoted, or otherwise moved, in a direction 2308 away from a center of the charging receptacle 2200. In some embodiments, the movement of the latch 2116 along the angled latch ramp 2232 may cause this pivoting action. In one embodiment, the latch 2116 may be forced against a latch return spring (e.g., inside the charging handle 2112, etc.) providing a counter force to the movement or pivoting of the latch 2116.

Once the charging connector 2120 is fully-engaged with the charging receptacle, as shown in the second engagement state 2300C of FIG. 23C, the annulus 2244 may be displaced to a maximum spring force position (e.g., axially, downward, etc.) and the latch 2116 may spring into the latch retaining area 2236. The latch retaining area 2236 may include one or more features configured to retain the latch 2116 and the charging connector 2120 in a fully-engaged or connected state with the charging receptacle 2200.

In some embodiments, the charging handle 2112 may be armed with a device for self-ejecting from a connected state to a disconnected state. For instance, in the event of an incident or detected fault, the charging handle 2112 may automatically physically disconnect from the vehicle 100. The disconnection or ejection may be achieved via one or more of a spring-loaded mechanism, CO2 canister within the handle 2112 or other component, and/or using strong electromagnetic coupling and decoupling. In some cases, the charging connector 2120 may be connected to the charging receptacle 2200 and retained using one or more electromagnets. In this example, when the charging connector 2120 is to be separated from the charging receptacle 2200, the electromagnet may turn off. In one embodiment, two opposing electromagnets may be provide the retaining force, where a first electromagnet provides a magnetic field in a first polarity and a second electromagnet provides an opposing magnetic field polarity. In this example, an emergency disconnection may be achieved by reversing the polarity of one of the opposing electromagnets providing a repelling force between the charging connector 2120 may be connected to the charging receptacle 2200.

Figure 24A:
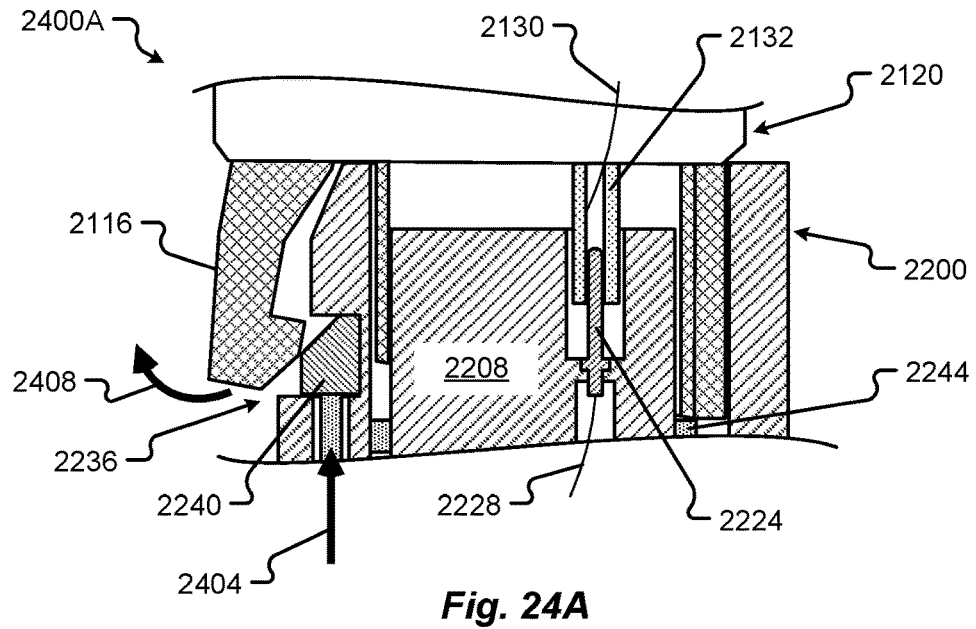
FIG. 24A is a section view of a charging connector and charging receptacle in a first ejection state in accordance with embodiments of the present disclosure.
Figure 24B:
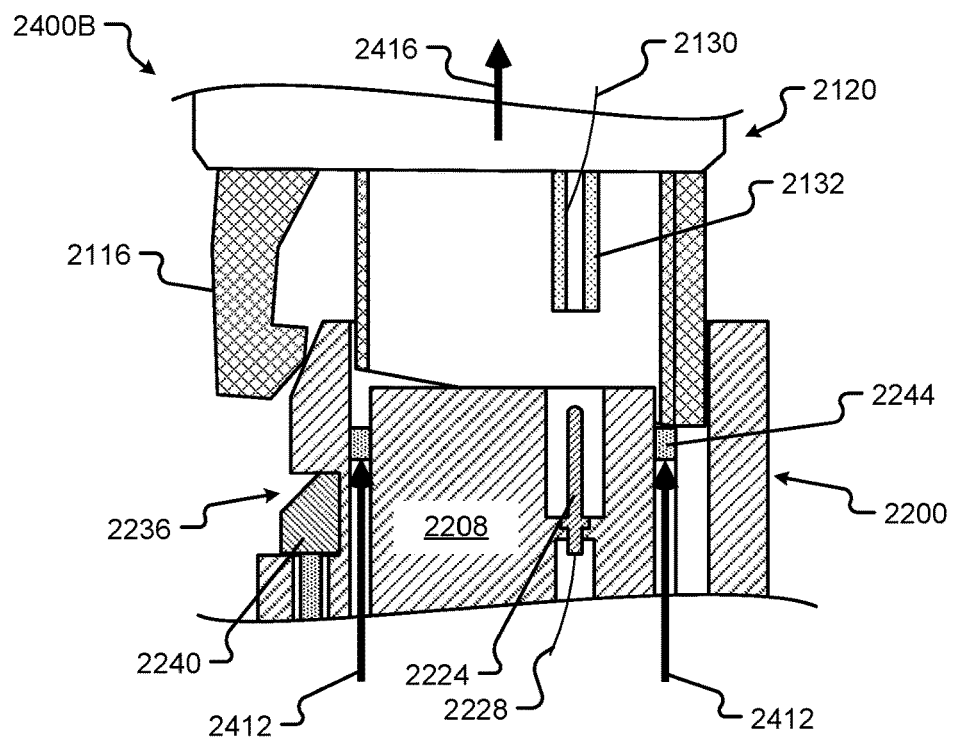
FIG. 24B is a section view of a charging connector and charging receptacle in a second ejection state in accordance with embodiments of the present disclosure.

FIGS. 24A and 24B show section views of charging connector 2120 of a charging system 2100 being disengaged from a charging receptacle 2200 of a vehicle 100 in accordance with embodiments of the present disclosure. In one embodiment, FIGS. 24A and 24B may show a charging connector 2120 ejection mechanism associated with the vehicle 100.

For example, FIG. 24A shows a section view of a charging connector 2120 in a first ejection state 2400A. In the first ejection state 2400A, a latch release mechanism 2240 of the charging receptacle 2200 may actuate to contact the latch 2116 of the charging connector 2120. The actuation may be provided in a direction 2404 that moves a portion of the latch release mechanism 2240 into a portion of the latch retaining area 2236 and releasing the latch 2116 from a retained position. In some embodiments, as the latch release mechanism 2240 is actuated, the latch 2116 may be forced to pivot, or otherwise move, out of the latch retaining area 2236 in a direction 2408 away from the center of the charging receptacle 2200.

In one embodiment, the latch release mechanism 2240 may be configured as a solenoid, piston, air cylinder, hydraulic cylinder, lever, and/or other actuator configured to selectively translate in a direction toward a portion of the latch 2116. Once the latch release mechanism 2240 is actuated to an extended position, or to a position where a portion of the mechanism 2240 is disposed inside the latch retaining area 2236, the charging connector 2120 and handle 2112 are no longer locked to the charging receptacle 2200 of the vehicle 100.

In some embodiments, (e.g., in the method 1500 described in conjunction with FIG. 15, etc.) the vehicle 100 may drive away (e.g., autonomously, etc.) from the charging system 2100 when the latch release mechanism 2240 is actuated (and the latch 2116 is released) allowing the movement of the vehicle 100 relative to the charging system 2100 to physically disconnect or disengage the charging connector 2120 from the charging receptacle 2200 of the vehicle 100.

In some embodiments, the charging connector 2120 may be forcibly ejected from the charging receptacle 2200 via an ejection mechanism of the vehicle 100. For instance, FIG. 24B shows a section view of a charging connector 2120 in a second ejection state 2400B where the latch release mechanism 2240 is actuated and the spring-loaded annulus 2244 is caused to eject the charging connector 2120 from the charging receptacle 2200 in a disengagement direction 2416. In one embodiment, the connector housing 2124 may be moved axially in the disengagement direction 2416 via an ejection force 2412 associated with the spring-loaded annulus 2244. The ejection force 2412 may be provided via a mechanical spring, solenoid, actuator, gas spring, compressed air spring, leaf spring, compression spring, die spring, extension spring, and/or some other force-transmitting element.

Figure 25A:
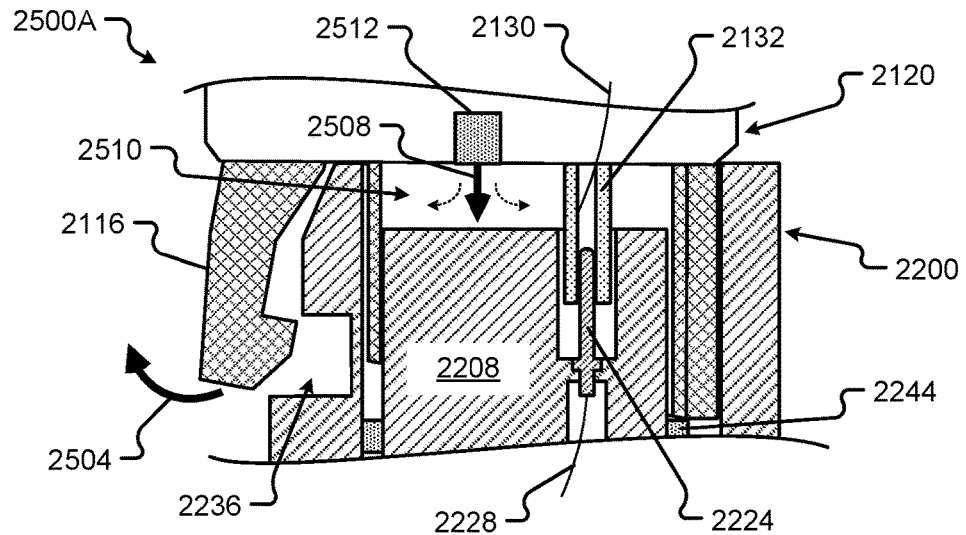
FIG. 25A is a section view of a charging connector and charging receptacle in a first disconnection state in accordance with embodiments of the present disclosure.
Figure 25B:
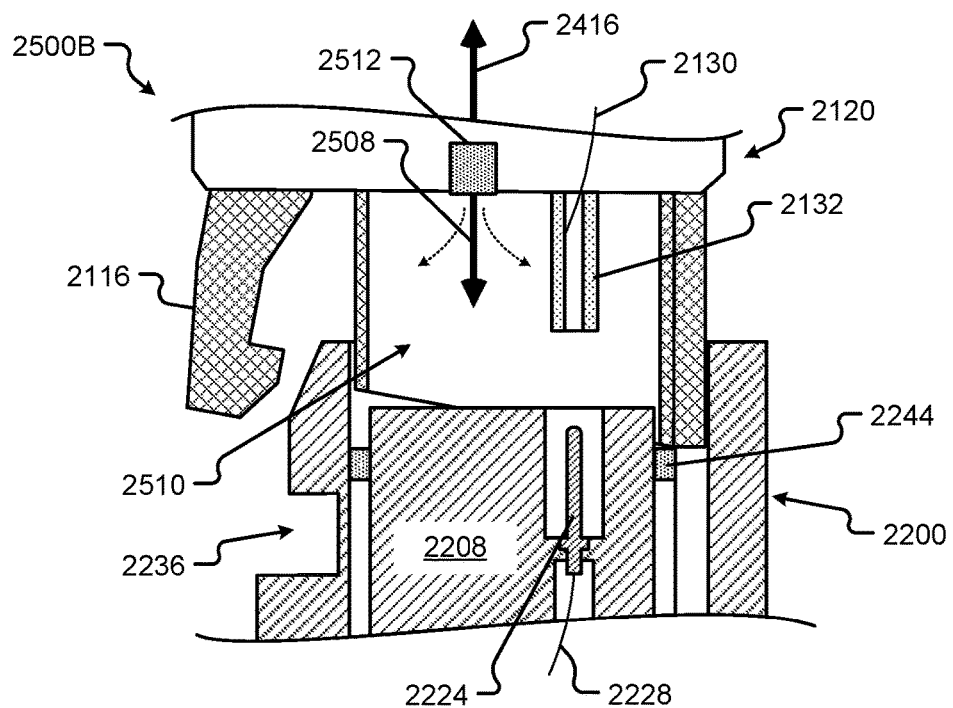
FIG. 25B is a section view of a charging connector and charging receptacle in a second disconnection state in accordance with embodiments of the present disclosure.

FIGS. 25A and 25B show section views of charging connector 2120 of a charging system 2100 being disengaged from a charging receptacle 2200 of a vehicle 100 in accordance with an embodiment of the present disclosure. In one embodiment, FIGS. 25A and 25B may show a charging connector 2120 ejection mechanism where the ejection mechanism is associated with the charging system 2100.

FIG. 25A shows a section view of an embodiment of the charging connector 2120 in a first ejection state 2500A. In FIG. 25A, the charging connector 2120 may be physically and/or electrically interconnected with the charging receptacle 2200. In the first ejection state 2500A, the latch 2116 of the charging connector 2120 may be actuated to move the latch 2116 from the latch retaining area 2236 of the charging receptacle 2200. This actuation may be caused by at least one actuation element in the charging connector 2120 or charging handle 2112 and may be configured to release the latch 2116 from a retained position. In some embodiments, the latch 2116 may be pivoted, or otherwise moved, out of the latch retaining area 2236 in a direction 2504 away from the center of the charging receptacle 2200.

In one embodiment, the latch 2116 may be released via one or more solenoid, piston, air cylinder, hydraulic cylinder, lever, and/or other actuator configured to open the latch 2116. Once the latch 2116 is no longer retained inside the latch retaining area 2236, the charging connector 2120 and handle 2112 are no longer locked to the charging receptacle 2200 of the vehicle 100.

In some embodiments, (e.g., in the method 1500 described in conjunction with FIG. 15, etc.) the vehicle 100 may drive away (e.g., autonomously, etc.) from the charging system 2100 when the latch 2116 is moved from the retained position allowing the driving movement of the vehicle 100 relative to the charging system 2100 to physically disconnect or disengage the charging connector 2120 from the charging receptacle 2200 of the vehicle 100.

In some embodiments, the charging connector 2120 may forcibly eject itself from the charging receptacle 2200 via one or more ejection mechanisms 2512 associated with the charging handle 2112. The ejection mechanism 2512 may be at least partially disposed within the charging handle 2112 and/or the charging connector 2120. As shown in FIG. 25A, the ejection mechanism 2512 may provide an actuation force 2508 in a direction of the charging receptacle 2200. The actuation force 2508 may be applied in a volume 2510, or area, in between the charging connector 2120 and the charging receptacle 2200. The actuation force 2508 may be configured to physically separate the charging connector 2120 from the charging receptacle 2200.

In some embodiments, the ejection mechanism 2512 may include a compressed gas canister (e.g., a CO2 canister or cartridge) that, when activated, releases the compressed gas from a nozzle into the volume 2510. This release of gas may cause the charging connector 2120 to physically disconnect and/or separate from the charging receptacle 2200. In one embodiment, the ejection mechanism 2512 may include one or more of a solenoid, piston, air cylinder, hydraulic cylinder, lever, spring-loaded plunger, and/or other actuator configured to physically push or force the charging connector 2120 from the charging receptacle 2200. In any event, FIG. 25B shows the embodiment of the charging connector 2120 in a second ejection state 2500A moving apart from the charging receptacle 2200 in a disengagement direction 2416.

Although shown as having separate ejection mechanisms in FIGS. 24A-25B, it is anticipated that one or more of the spring-loaded annulus 2244, latch release mechanism 2240, actuating latch 2116, and/or charging system ejection mechanism 2512, may be used alone or together in various combinations. Additionally or alternatively, the disconnection or rejection of the charging connection described in conjunction with step 1420 of FIG. 14, step 1920 of FIG. 19, and/or step 2020 of FIG. 20 may be achieved via at least one of the ejection mechanisms described in conjunction with FIGS. 24A-25B.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle control system, comprising: a microprocessor; and a computer readable medium coupled to the microprocessor and comprising instructions stored thereon that cause the microprocessor to: receive output from sensors associated with a power system in a vehicle monitoring a state of the power system; determine, based on at least one output from the sensors exceeding a predetermined threshold value, that the state of the power system includes a power system fault; determine whether a current location of the vehicle is in a safe destruction location; and autonomously drive the vehicle to an identified safe vehicle destruction location when the vehicle is determined not to be in a safe destruction location.

Aspects of the above vehicle control system include wherein prior to determining whether the current location of the vehicle is in a safe destruction location, the instructions further cause the microprocessor to: determine a severity level associated with the power system fault from a plurality of predetermined severity levels, wherein a first severity level indicates the power system fault is capable of only damaging the vehicle and a second severity level indicates the power system fault is capable of harming one or more objects other than the vehicle. Aspects of the above vehicle control system include wherein the current location of the vehicle is determined not to be in a safe destruction location when the severity level is the second severity level and the one or more objects are in proximity to the vehicle. Aspects of the above vehicle control system include wherein the current location of the vehicle is determined to be in a safe destruction location when the severity level is the second severity level and the one or more objects are not in proximity to the vehicle. Aspects of the above vehicle control system include wherein prior to determining whether the current location of the vehicle is in a safe destruction location, the instructions further cause the microprocessor to: determine that the vehicle is in a connected charging state, wherein a charging connector of a charging system is physically connected with charging receptacle of the vehicle; and disconnect the charging connector from the charging receptacle of the vehicle. Aspects of the above vehicle control system include wherein the severity level is the second severity level and the one or more objects are in proximity to the vehicle. Aspects of the above vehicle control system include wherein prior to autonomously driving the vehicle to an identified safe vehicle destruction location, the instructions further cause the microprocessor to: refer to a computer readable memory of the vehicle having one or more possible safe vehicle destruction locations stored thereon; and identify a safe vehicle destruction location from the one or more possible safe vehicle destruction locations. Aspects of the above vehicle control system include wherein prior to identifying the safe vehicle destruction location, the instructions further cause the microprocessor to: determine a range of travel for the vehicle; and filter the one or more possible safe vehicle destruction locations to include only those within the range of travel for the vehicle. Aspects of the above vehicle control system include wherein identifying the safe vehicle destruction location includes selecting the safe vehicle destruction location from the filtered one or more possible safe vehicle destruction locations. Aspects of the above vehicle control system include wherein there is no safe vehicle destruction location within the range of travel for the vehicle. Aspects of the above vehicle control system include wherein the vehicle autonomously drives to an alternative location other than the current location of the vehicle and the safe vehicle destruction location. Aspects of the above vehicle control system include wherein prior to the vehicle destructing the instructions further cause the microprocessor to: provide a vehicle destruction warning via an output from one or more devices associated with the vehicle, wherein the vehicle destruction warning is configured to notify one or more people of the destruction. Aspects of the above vehicle control system include wherein the vehicle destruction warning includes information about the power system fault.

Embodiments include a method, comprising: receiving, via a processor, output from sensors associated with a power system in a vehicle monitoring a state of the power system; determining, via the processor and based on at least one output from the sensors exceeding a predetermined threshold value, that the state of the power system includes a power system fault; determining, via the processor, whether a current location of the vehicle is in a safe destruction location; and autonomously driving the vehicle to an identified safe vehicle destruction location when the vehicle is determined not to be in a safe destruction location.

Aspects of the above method include wherein prior to determining whether the current location of the vehicle is in a safe destruction location, the method further comprises: determining, via the processor, a severity level associated with the power system fault from a plurality of predetermined severity levels, wherein a first severity level indicates the power system fault is capable of only damaging the vehicle and a second severity level indicates the power system fault is capable of harming one or more objects other than the vehicle. Aspects of the above method include wherein the current location of the vehicle is determined not to be in a safe destruction location when the severity level is the second severity level and the one or more objects are in proximity to the vehicle. Aspects of the above method include wherein prior to determining whether the current location of the vehicle is in a safe destruction location, the method further comprises: determining, via the processor, that the vehicle is in a connected charging state, wherein a charging connector of a charging system is physically connected with charging receptacle of the vehicle; and disconnecting, automatically, the charging connector from the charging receptacle of the vehicle. Aspects of the above method include wherein the severity level is the second severity level and the one or more objects are in proximity to the vehicle, wherein the vehicle autonomously drives to the identified safe vehicle destruction location and wherein the method further comprises: determining, via the processor and based on an output from one or more imaging sensors of the vehicle, that the identified safe vehicle destruction location is unsafe; referring, via the processor, to a computer readable memory of the vehicle having one or more possible alternate safe vehicle destruction locations stored thereon; identifying, via the processor, an alternate safe vehicle destruction location from the one or more possible safe vehicle destruction locations; and autonomously driving the vehicle to the identified alternate safe vehicle destruction location.

Embodiments include a vehicle, comprising: a power system comprising one or more electrical components; at least one sensor associated with the power system, wherein the at least one sensor is configured to monitor a state of the power system; a location module configured to determine a geographical location or position of the vehicle; and a vehicle control system, comprising: a microprocessor; and a computer readable medium coupled to the microprocessor and comprising instructions stored thereon that cause the microprocessor to: receive output from the at least one sensor associated with the power system; determine, based on at least one output from the at least one sensor exceeding a predetermined threshold value, that the state of the power system includes a power system fault; determine, based at least partially on information received from the location module, whether a current location of the vehicle is in a safe destruction location; and autonomously drive the vehicle to an identified safe vehicle destruction location when the vehicle is determined not to be in a safe destruction location.

Aspects of the above vehicle include at least one imaging sensor configured to detect objects in a viewing zone of the at least one imaging sensor and in an environment around the vehicle.

Embodiments include a vehicle control system, comprising: a microprocessor; and a computer readable medium coupled to the microprocessor and comprising instructions stored thereon that cause the microprocessor to: detect, based on output received from one or more sensors associated with a power system of a vehicle, a power system fault; determine, based on the output received from the one or more sensors, information about the power system fault, wherein the information about the power system fault includes a location of the power system fault in the vehicle; determine a state of the vehicle; determine that an occupant is inside the vehicle; determine an escape route from the vehicle for the occupant; and render the escape route to at least one display device associated with the vehicle.

Aspects of the above vehicle control system include wherein prior to determining an escape route from the vehicle for the occupant, the instructions further cause the microprocessor to: receive sensor data from one or more environment sensors associated with the vehicle, wherein the environment sensors monitor an environment around at least a portion of the vehicle. Aspects of the above vehicle control system include wherein the instructions further cause the microprocessor to: determine, based on the sensor data, whether the environment includes a threat to a safety of the occupant. Aspects of the above vehicle control system include wherein the instructions further cause the microprocessor to: determine a severity level of the power system fault, wherein the severity level defines whether the power system fault poses a safety hazard to the occupant inside the vehicle. Aspects of the above vehicle control system include wherein the instructions further cause the microprocessor to: determine a position of the occupant inside the vehicle. Aspects of the above vehicle control system include wherein determining the escape route from the vehicle for the occupant further comprises instructions to cause the microprocessor to: determine an exit point from the vehicle based on at least one area in the environment including at least one threat to the safety of the occupant; and determine the escape route from the position of the occupant inside the vehicle to the exit point. Aspects of the above vehicle control system include wherein the escape route avoids the location of the power system fault. Aspects of the above vehicle control system include wherein the instructions further cause the microprocessor to: determine a different occupant is inside the vehicle; and determine the different occupant is in a different position inside the vehicle. Aspects of the above vehicle control system include wherein the instructions further cause the microprocessor to: determine a different escape route from the vehicle for the different occupant; and render the different escape route to at least one display device associated with the vehicle. Aspects of the above vehicle control system include wherein the different escape route is rendered to a graphical user interface associated with the different occupant. Aspects of the above vehicle control system include wherein a smart phone comprises the graphical user interface.

Embodiments include a method, comprising: detecting, via a processor and based on output received from one or more sensors associated with a power system of a vehicle, a power system fault; determining, via the processor and based on the output received from the one or more sensors, information about the power system fault, wherein the information about the power system fault includes a location of the power system fault in the vehicle; determining, via the processor, a state of the vehicle; determining, via the processor, that an occupant is inside the vehicle; determining, via the processor, an escape route from the vehicle for the occupant; and rendering, via the processor, the escape route to at least one display device associated with the vehicle.

Aspects of the above method further comprise: receiving, via the processor, sensor data from one or more environment sensors associated with the vehicle, wherein the environment sensors monitor an environment around at least a portion of the vehicle; and determining, via the processor and based on the sensor data, whether the environment includes a threat to a safety of the occupant. Aspects of the above method further comprise: determining, via the processor, a severity level of the power system fault, wherein the severity level defines whether the power system fault poses a safety hazard to the occupant inside the vehicle. Aspects of the above method further comprise: determining, via the processor and based on interior space information received from one or more interior vehicle sensors, a position of the occupant inside the vehicle. Aspects of the above method further comprise: determining, via the processor, an exit point from the vehicle based on at least one area in the environment including at least one threat to the safety of the occupant; determining, via the processor, the escape route from the position of the occupant inside the vehicle to the exit point, wherein the escape route avoids the location of the power system fault.

Embodiments include a vehicle, comprising: a power system comprising one or more electrical components; one or more sensors associated with the power system, wherein the one or more sensors monitor a state of the power system; at least one display device; and a vehicle control system, comprising: a microprocessor; and a computer readable medium coupled to the microprocessor and comprising instructions stored thereon that cause the microprocessor to: detect, based on output received from the one or more sensors, a power system fault; determine, based on the output received from the one or more sensors, information about the power system fault, wherein the information about the power system fault includes a location of the power system fault in the vehicle; determine a state of the vehicle; determine that an occupant is inside the vehicle; determine an escape route from the vehicle for the occupant; and render the escape route to the at least one display device associated with the vehicle.

Aspects of the above vehicle include wherein determining the state of the vehicle includes determining whether the vehicle is stationary or moving at a particular rate of speed. Aspects of the above vehicle include wherein determining the escape route from the vehicle for the occupant further comprises instructions to cause the microprocessor to: receive sensor data from one or more environment sensors associated with the vehicle, wherein the environment sensors monitor an environment around at least a portion of the vehicle; determine, based on the sensor data, whether the environment includes a threat to a safety of the occupant; determine a severity level of the power system fault, wherein the severity level defines whether the power system fault poses a safety hazard to the occupant inside the vehicle; determine a position of the occupant inside the vehicle; determine an exit point from the vehicle based on at least one area in the environment including at least one threat to the safety of the occupant; and determine the escape route from the position of the occupant inside the vehicle to the exit point, wherein the escape route avoids the location of the power system fault. Aspects of the above vehicle include wherein the instructions further cause the microprocessor to: actuate, based on rules stored in the computer readable medium, a locking mechanism associated with at least one door of the vehicle, wherein the rules include instructions for actuating a locking state of the at least one door based on the exit point and the at least one area in the environment including the at least one threat to the safety of the occupant, wherein a door adjacent to the at least one area in the environment including the at least one threat to the safety of the occupant is actuated into a locked condition, and wherein a door associated with the exit point is actuated into an unlocked state; and automatically open the door associated with the exit point.

Embodiments include a vehicle, comprising: a power storage system; a charging receptacle including at least one connector electrically coupled to the power storage system and configured to selectively interconnect with a charging connector of an external vehicle charging system; a charging connection separation mechanism, comprising: an ejection actuator configured to provide a separation force between the charging receptacle and a connected charging connector; a microprocessor; and a computer readable medium coupled to the microprocessor and comprising instructions stored thereon that cause the microprocessor to: detect an interconnection between the charging receptacle and charging connector; receive a signal to automatically disconnect the interconnection between the charging receptacle and the charging connector; and actuate the charging connection separation mechanism to disconnect the interconnection between the charging receptacle and the charging connector.

Aspects of the above vehicle include wherein the charging receptacle includes the charging connection separation mechanism. Aspects of the above vehicle include wherein the charging receptacle further comprises: a housing surrounding the at least one connector; and a latch retaining feature having at least one latch contact and retaining surface. Aspects of the above vehicle include wherein the charging receptacle further comprises: an annulus disposed between the housing and the at least one connector, wherein the annulus is moveable along an axis of the charging receptacle; and a spring in contact with the annulus, wherein the spring compresses as the annulus is moved along the axis of the charging receptacle in a direction toward the vehicle. Aspects of the above vehicle include wherein the charging receptacle further comprises: a latch actuator having a retracted state and an extended state, wherein in the retracted state a latch of the charging connector engages the latch retaining feature and in the extended state the latch actuator disengages the latch of the charging connector from the latch retaining feature. Aspects of the above vehicle include wherein a connection of the charging connector to the charging receptacle moves the annulus of the charging receptacle in a direction toward the vehicle and compresses the spring. Aspects of the above vehicle include wherein the instructions that cause the microprocessor to actuate the charging connection separation mechanism to disconnect the interconnection between the charging receptacle and the charging connector actuate the latch actuator from the retracted state to the extended state.

Embodiments include a method, comprising: detecting, via a processor, an interconnection between a charging receptacle of a vehicle and charging connector of an external vehicle charging system; receiving, via the processor, a signal to automatically disconnect the interconnection between the charging receptacle and the charging connector; and actuating, via the processor, a charging connection separation mechanism disconnecting the interconnection between the charging receptacle and the charging connector.

Aspects of the above method include wherein the signal to automatically disconnect the interconnection between the charging receptacle and the charging connector is received in response to the processor detecting a fault with the power system of the vehicle. Aspects of the above method further comprise determining, via the processor, information about the fault with the power system; and sending, via the processor, a message from a communication system of with the vehicle to a communication device of the external vehicle charging system, wherein the message includes at least a portion of the information about the fault. Aspects of the above method include wherein the signal to automatically disconnect the interconnection between the charging receptacle and the charging connector is sent from the vehicle to the external vehicle charging system. Aspects of the above method include wherein the signal to automatically disconnect the interconnection between the charging receptacle and the charging connector is sent from the external vehicle charging system to the vehicle. Aspects of the above method include wherein the message is sent across a wired communication connection that is associated with the interconnection between the charging receptacle and the charging connector. Aspects of the above method include wherein the charging connection separation mechanism is integral with a portion of the vehicle. Aspects of the above method include wherein the charging connection separation mechanism is integral with a portion of the external vehicle charging system.

Embodiments include a charging connection separation mechanism, comprising: an ejection actuator configured to provide a separation force between a charger of an external vehicle charging system and a charging receptacle of an electric vehicle; a microprocessor; and a computer readable medium coupled to the microprocessor and comprising instructions stored thereon that cause the microprocessor to: detect a connection between the charger and the charging receptacle; receive a signal to automatically eject the charger from the charging receptacle; and actuate the ejection actuator to disconnect and physically separate the charger from the charging receptacle.

Aspects of the above charging connection separation mechanism include wherein the ejection actuator includes a spring-loaded member that when actuated releases from a compressed state to an extended state ejecting the charger from the charging receptacle. Aspects of the above charging connection separation mechanism include wherein the ejection actuator is a compressed gas canister, and wherein actuation of the compressed gas canister expels gas from a nozzle having an exit port in an area between the charger and the charging receptacle providing a pressure ejecting the charger from the charging receptacle. Aspects of the above charging connection separation mechanism include wherein the ejection actuator is integral with the charging receptacle of the electric vehicle. Aspects of the above charging connection separation mechanism include wherein the ejection actuator is integral with the charger of the external vehicle charging system.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle control system, comprising:
    a microprocessor; and
    a computer readable medium coupled to the microprocessor and comprising instructions stored thereon that cause the microprocessor to:
        receive output from sensors associated with a power system in a vehicle monitoring a state of the power system while the vehicle is in a connected charging state with an external charging system at a parked location, wherein the vehicle is in park and a charging connector of the external charging system is physically connected with a charging receptacle of the vehicle in the connected charging state;
        determine, based on at least one output from the sensors exceeding a predetermined threshold value, that the state of the power system includes a power system fault;
        determine that a user of the vehicle is outside of the vehicle;
        eject, in response to determining that the state of the power system includes the power system fault, the charging connector of the external charging system from the charging receptacle of the vehicle physically separating the vehicle from the external charging system;
        determine whether the parked location of the vehicle is in a safe destruction location; and
        autonomously drive the vehicle from the parked location to an identified safe vehicle destruction location when the parked location of the vehicle is determined not to be in a safe destruction location.

2. The vehicle control system of claim 1, wherein prior to determining whether the parked location of the vehicle is in a safe destruction location, the instructions further cause the microprocessor to:
    determine a severity level associated with the power system fault from a plurality of predetermined severity levels, wherein a first severity level indicates the power system fault is capable of only damaging the vehicle and a second severity level indicates the power system fault is capable of harming one or more objects other than the vehicle.

3. The vehicle control system of claim 2, wherein the parked location of the vehicle is determined not to be in a safe destruction location when the severity level is the second severity level and the one or more objects include a structure associated with the user that is in proximity to the vehicle.

4. The vehicle control system of claim 2, wherein the parked location of the vehicle is determined to be in a safe destruction location when the severity level is the second severity level and the one or more objects are not in proximity to the vehicle.

5. The vehicle control system of claim 2, wherein the power system fault is associated with the external charging system.

6. The vehicle control system of claim 3, wherein the user is sleeping and the second severity level indicates a fire resulting from the power system fault is capable of spreading to a home of the user causing damage.

7. The vehicle control system of claim 2, wherein prior to autonomously driving the vehicle from the parked location to the identified safe vehicle destruction location, the instructions further cause the microprocessor to:
    refer to a computer readable memory of the vehicle having one or more possible safe vehicle destruction locations stored thereon; and
    identify a safe vehicle destruction location from the one or more possible safe vehicle destruction locations.

8. The vehicle control system of claim 7, wherein prior to identifying the safe vehicle destruction location, the instructions further cause the microprocessor to:
    determine a range of travel for the vehicle; and
    filter the one or more possible safe vehicle destruction locations to include only those within the range of travel for the vehicle, wherein identifying the safe vehicle destruction location includes selecting the safe vehicle destruction location from the filtered one or more possible safe vehicle destruction locations.

9. The vehicle control system of claim 8, wherein the safe vehicle destruction location includes a water source, such as a pool, pond, lake, river, stream, ocean, or sea, that is capable of extinguishing the fire.

10. The vehicle control system of claim 8, wherein there is no safe vehicle destruction location within the range of travel for the vehicle.

11. The vehicle control system of claim 10, wherein the vehicle autonomously drives from the parked location to an alternative location other than the current location of the vehicle and the safe vehicle destruction location.

12. The vehicle control system of claim 11, wherein prior to the vehicle destructing the instructions further cause the microprocessor to:
    provide a vehicle destruction warning via an output from one or more devices associated with the vehicle, wherein the vehicle destruction warning is configured to notify one or more people of the destruction.

13. The vehicle control system of claim 12, wherein the vehicle destruction warning includes information about the power system fault.

14. A method, comprising:
    receiving, via a processor, output from sensors associated with a power system in a vehicle monitoring a state of the power system while the vehicle is in a connected charging state with an external charging system at a parked location, wherein the vehicle is in park and a charging connector of the external charging system is physically connected with a charging receptacle of the vehicle in the connected charging state;
    determining, via the processor and based on at least one output from the sensors exceeding a predetermined threshold value, that the state of the power system includes a power system fault;
    determining, via the processor, that a user of the vehicle is outside of the vehicle;

ejecting, in response to determining that the state of the power system includes the power system fault, the charging connector of the external charging system from the charging receptacle of the vehicle physically separating the vehicle from the external charging system;

determining, via the processor, whether the parked location of the vehicle is in a safe destruction location; and autonomously driving the vehicle from the parked location to an identified safe vehicle destruction location when the parked location of the vehicle is determined not to be in a safe destruction location.

15. The method of claim 14, wherein prior to determining whether the parked location of the vehicle is in a safe destruction location, the method further comprises:

determining, via the processor, a severity level associated with the power system fault from a plurality of predetermined severity levels, wherein a first severity level indicates the power system fault is capable of only damaging the vehicle and a second severity level indicates the power system fault is capable of harming one or more objects other than the vehicle.

16. The method of claim 15, wherein the parked location of the vehicle is determined not to be in a safe destruction location when the severity level is the second severity level and the one or more objects include a structure associated with the user that is in proximity to the vehicle.

17. The method of claim 15, wherein the power system fault is associated with the external charging system.

18. The method of claim 15, wherein the severity level is the second severity level and the one or more objects are in proximity to the vehicle, wherein the vehicle autonomously drives to the identified safe vehicle destruction location and wherein the method further comprises:

determining, via the processor and based on an output from one or more imaging sensors of the vehicle, that the identified safe vehicle destruction location is unsafe;

referring, via the processor, to a computer readable memory of the vehicle having one or more possible alternate safe vehicle destruction locations stored thereon;

identifying, via the processor, an alternate safe vehicle destruction location from the one or more possible safe vehicle destruction locations including a water source, such as a pool, pond, lake, river, stream, ocean, or sea; and autonomously driving the vehicle to the identified alternate safe vehicle destruction location and into the water source drowning the vehicle.

19. A vehicle, comprising:

a power system comprising one or more electrical components;

at least one sensor associated with the power system, wherein the at least one sensor is configured to monitor a state of the power system while charging;

a location module configured to determine a geographical location or position of the vehicle; and a vehicle control system, comprising:

a microprocessor; and a computer readable medium coupled to the microprocessor and comprising instructions stored thereon that cause the microprocessor to:

receive output from the at least one sensor associated with the power system while the vehicle is in a connected charging state with an external charging system at a parked location, wherein the vehicle is in park and a charging connector of the external charging system is physically connected with a charging receptacle of the vehicle in the connected charging state;

determine, based on at least one output from the at least one sensor exceeding a predetermined threshold value, that the state of the power system includes a power system fault;

determine that a user of the vehicle is outside of the vehicle;

eject, in response to determining that the state of the power system includes the power system fault, the charging connector of the external charging system from the charging receptacle of the vehicle physically separating the vehicle from the external charging system;

determine, based at least partially on information received from the location module, whether the parked location of the vehicle is in a safe destruction location; and autonomously drive the vehicle from the parked location to an identified safe vehicle destruction location when the parked location of the vehicle is determined not to be in a safe destruction location.

20. The vehicle of claim 19, further comprising:

at least one imaging sensor configured to detect objects in a viewing zone of the at least one imaging sensor and in an environment around the vehicle.

* * * * *